(12) United States Patent
Madan et al.

(10) Patent No.: US 9,839,035 B2
(45) Date of Patent: Dec. 5, 2017

(54) SYSTEM AND METHOD FOR PROVIDING UPLINK INTER CELL INTERFERENCE COORDINATION IN A NETWORK ENVIRONMENT

(71) Applicant: CISCO TECHNOLOGY, INC., San Jose, CA (US)

(72) Inventors: Ritesh K. Madan, Berkeley, CA (US); Rohit Umesh Nabar, Sunnyvale, CA (US); Vikram Chandrasekhar, Mountain View, CA (US); Kedar Durgadas Shirali, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 141 days.

(21) Appl. No.: 14/691,260

(22) Filed: Apr. 20, 2015

(65) Prior Publication Data

US 2016/0309476 A1    Oct. 20, 2016

Related U.S. Application Data

(63) Continuation of application No. 14/686,598, filed on Apr. 14, 2015.

(51) Int. Cl.
*H04W 72/04* (2009.01)
*H04W 72/08* (2009.01)
(Continued)

(52) U.S. Cl.
CPC ....... *H04W 72/0453* (2013.01); *H04W 16/14* (2013.01); *H04W 24/02* (2013.01);
(Continued)

(58) Field of Classification Search
CPC ........... H04W 72/0453; H04W 72/082; H04W 72/0493
See application file for complete search history.

(56) References Cited

U.S. PATENT DOCUMENTS 6,141,565 A   10/2000  Feuerstein et al.
6,456,848 B1  9/2002   Freeman
(Continued)

FOREIGN PATENT DOCUMENTS

CN    1334999 A    2/2002
CN  101444125 A    5/2009
(Continued)

OTHER PUBLICATIONS

"ETSI TR 136 902 V9.3.1 (May 2011) Technical Report: LTE; Evolved Universal Terrestrial Radio Access Network 9E-UTRAN); Self-configuring and self-optimizing network (SON) use cases and solutions (3GPP TR 36.902 version 9.3.1 Release 9)," ETSI, European Telecommunications Standards Institute, 650 Route des Lucioles F-06921 Sophia Antipolis Cedex—France, May 2011; 23 pages.
(Continued)

*Primary Examiner* — Rasheed Gidado
(74) *Attorney, Agent, or Firm* — Patterson + Sheridan, LLP

(57) ABSTRACT

A method is provided in one example embodiment and may include determining one or more uplink inter cell interference coordination (ICIC) parameters for a plurality of cells based, at least in part, on feedback information associated with the plurality of cells; exchanging interference information between neighboring cells; and scheduling uplink transmissions for user equipment served by the neighboring cells based, at least in part, on the uplink ICIC parameters and the interference information exchanged between neighboring cells. A method is provided in another example embodiment and may include determining a ratio relating a first portion of a frequency spectrum for assigning fractional frequency re-use resources to a second portion of the frequency spectrum for assigning re-use one resources; and updating the
(Continued)

ratio relating the first portion and the second portion of the frequency spectrum to optimize throughput rates for the plurality of user equipment across the plurality of cells.

20 Claims, 15 Drawing Sheets

(51) Int. Cl.
*H04W 24/10* (2009.01)
*H04W 28/02* (2009.01)
*H04W 16/14* (2009.01)
*H04W 24/02* (2009.01)
*H04W 72/12* (2009.01)
H04W 28/16 (2009.01)

(52) U.S. Cl.
CPC ....... *H04W 24/10* (2013.01); *H04W 28/0236* (2013.01); *H04W 72/082* (2013.01); *H04W 72/1268* (2013.01); *H04W 28/16* (2013.01)

(56) References Cited

U.S. PATENT DOCUMENTS

| | | | |
|---|---|---|---|
| 6,463,296 B1 | 10/2002 | Esmailzadeh | |
| 6,600,924 B1 | 7/2003 | Sinivaara | |
| 6,771,934 B2 | 8/2004 | Demers | |
| 7,151,937 B2 | 12/2006 | Jin et al. | |
| 7,158,474 B1 | 1/2007 | Gerakoulis | |
| 7,379,739 B2 | 5/2008 | Rajkotia et al. | |
| 7,884,763 B2 | 2/2011 | Na et al. | |
| 7,974,652 B2 | 7/2011 | Gerlach | |
| 7,983,667 B2 | 7/2011 | Hart et al. | |
| 8,045,996 B2 | 10/2011 | Brunner et al. | |
| 8,078,185 B2 | 12/2011 | Sun | |
| 8,107,950 B2 | 1/2012 | Amerijoo et al. | |
| 8,126,495 B2* | 2/2012 | Wu | H04W 16/10 370/252 |
| 8,145,223 B2 | 3/2012 | Guey | |
| 8,145,252 B2 | 3/2012 | Sung et al. | |
| 8,170,544 B1 | 5/2012 | Satapathy et al. | |
| 8,194,630 B2 | 6/2012 | Qvarfordt | |
| 8,208,937 B2* | 6/2012 | Zhang | H04W 16/04 455/449 |
| 8,229,451 B2 | 7/2012 | Frenger et al. | |
| 8,270,976 B2 | 9/2012 | Simonsson et al. | |
| 8,275,376 B2 | 9/2012 | Vikberg | |
| 8,320,965 B2 | 11/2012 | Kwun | |
| 8,340,711 B1 | 12/2012 | Glass et al. | |
| 8,400,921 B2 | 3/2013 | Grayson et al. | |
| 8,538,337 B2 | 9/2013 | Damnjanovic | |
| 8,588,698 B2 | 11/2013 | Brisebois | |
| 8,611,299 B2 | 12/2013 | Yang et al. | |
| 8,619,563 B2 | 12/2013 | Madan et al. | |
| 8,639,243 B2 | 1/2014 | Radulescu et al. | |
| 8,687,585 B2 | 4/2014 | Marks et al. | |
| 8,694,044 B2 | 4/2014 | Hiltunen et al. | |
| 8,712,459 B2 | 4/2014 | Lim et al. | |
| 8,731,567 B2* | 5/2014 | Zhang | H04W 16/14 370/336 |
| 8,743,772 B2 | 6/2014 | Garavaglia et al. | |
| 8,755,791 B2 | 6/2014 | Bontu et al. | |
| 8,761,826 B2 | 6/2014 | Brown et al. | |
| 8,792,886 B2 | 7/2014 | Meshkati | |
| 8,797,983 B2 | 8/2014 | Sun | |
| 8,805,373 B2* | 8/2014 | Chayat | H04W 16/12 370/331 |
| 8,805,385 B2 | 8/2014 | Hunukumbure | |
| 8,830,936 B2 | 9/2014 | Ren | |
| 8,838,125 B2 | 9/2014 | Dalsgaard et al. | |
| 8,854,998 B2 | 10/2014 | Johansson et al. | |
| 8,862,134 B1 | 10/2014 | Zhou | |
| 8,874,126 B2 | 10/2014 | Jeong et al. | |
| 8,879,441 B2* | 11/2014 | Hunukumbure | H04W 16/10 370/310 |
| 8,983,470 B1 | 3/2015 | Ryan | |
| 9,014,004 B2 | 4/2015 | Nuss et al. | |
| 9,031,591 B2 | 5/2015 | Ma et al. | |
| 9,094,831 B2 | 7/2015 | Borran | |
| 9,143,995 B2 | 9/2015 | Okmyanskiy et al. | |
| 9,148,838 B2 | 9/2015 | Yanover et al. | |
| 9,167,444 B2 | 10/2015 | Nuss et al. | |
| 9,197,358 B2* | 11/2015 | Hejazi | H04L 1/00 |
| 9,219,816 B2 | 12/2015 | Grayson | |
| 9,313,004 B2 | 4/2016 | Yanover et al. | |
| 9,332,458 B2 | 5/2016 | Nuss et al. | |
| 9,344,970 B2 | 5/2016 | Uplenchwar et al. | |
| 9,414,310 B2 | 8/2016 | Grayson | |
| 9,490,953 B2 | 11/2016 | Yanover et al. | |
| 9,497,708 B2 | 11/2016 | Uplenchwar et al. | |
| 9,544,857 B2 | 1/2017 | Carter et al. | |
| 9,559,798 B2 | 1/2017 | Nuss et al. | |
| 9,648,569 B2 | 5/2017 | Madan et al. | |
| 9,655,102 B2 | 5/2017 | Uplenchwar et al. | |
| 2002/0019245 A1 | 2/2002 | Longoni | |
| 2002/0061742 A1 | 5/2002 | Lapaille | |
| 2004/0085909 A1 | 5/2004 | Soliman | |
| 2004/0132486 A1 | 7/2004 | Halonen | |
| 2004/0213170 A1 | 10/2004 | Bremer | |
| 2005/0063389 A1 | 3/2005 | Elliott | |
| 2005/0064820 A1 | 3/2005 | Park et al. | |
| 2005/0215251 A1 | 9/2005 | Krishnan | |
| 2005/0282572 A1 | 12/2005 | Wigard et al. | |
| 2006/0068712 A1 | 3/2006 | Kroboth et al. | |
| 2006/0073791 A1 | 4/2006 | Senarath | |
| 2006/0229087 A1 | 10/2006 | Davis et al. | |
| 2006/0292989 A1 | 12/2006 | Gerlach | |
| 2007/0008885 A1 | 1/2007 | Bonner | |
| 2007/0082620 A1 | 4/2007 | Zhang et al. | |
| 2007/0086406 A1 | 4/2007 | Papasakellariou | |
| 2007/0115874 A1 | 5/2007 | Usuda | |
| 2007/0177501 A1* | 8/2007 | Papasakellariou | H04W 24/00 370/229 |
| 2007/0253372 A1 | 11/2007 | Nakayasu | |
| 2007/0280170 A1 | 12/2007 | Kawasaki | |
| 2008/0004028 A1 | 1/2008 | Vincent | |
| 2008/0043623 A1 | 2/2008 | Franceschini | |
| 2008/0045227 A1 | 2/2008 | Nagai | |
| 2008/0084844 A1 | 4/2008 | Reznik | |
| 2008/0107074 A1 | 5/2008 | Salmenkaita et al. | |
| 2008/0139197 A1 | 6/2008 | Misra et al. | |
| 2008/0188234 A1 | 8/2008 | Gorokhov | |
| 2008/0188265 A1 | 8/2008 | Carter et al. | |
| 2008/0268833 A1 | 10/2008 | Huang | |
| 2009/0005030 A1 | 1/2009 | Han | |
| 2009/0054047 A1 | 2/2009 | Kylvaja | |
| 2009/0061778 A1 | 3/2009 | Vrzic | |
| 2009/0067370 A1 | 3/2009 | Kim | |
| 2009/0081955 A1 | 3/2009 | Necker | |
| 2009/0092080 A1 | 4/2009 | Balasubramanian | |
| 2009/0092088 A1 | 4/2009 | Kokku | |
| 2009/0129284 A1 | 5/2009 | Jung et al. | |
| 2009/0129291 A1 | 5/2009 | Gupta | |
| 2009/0197632 A1 | 8/2009 | Ghosh | |
| 2009/0232074 A1 | 9/2009 | Yang et al. | |
| 2009/0270109 A1 | 10/2009 | Wang | |
| 2009/0323530 A1 | 12/2009 | Trigui et al. | |
| 2010/0009634 A1 | 1/2010 | Budianu | |
| 2010/0029282 A1 | 2/2010 | Stamoulis et al. | |
| 2010/0034157 A1 | 2/2010 | Stolyar et al. | |
| 2010/0056184 A1 | 3/2010 | Vakil | |
| 2010/0093358 A1 | 4/2010 | Cheong et al. | |
| 2010/0099424 A1 | 4/2010 | Centonza | |
| 2010/0105406 A1 | 4/2010 | Luo et al. | |
| 2010/0110989 A1 | 5/2010 | Wu | |
| 2010/0112982 A1 | 5/2010 | Singh et al. | |
| 2010/0124930 A1 | 5/2010 | Andrews | |
| 2010/0177722 A1 | 7/2010 | Guvenc | |
| 2010/0227611 A1 | 9/2010 | Schmidt et al. | |
| 2010/0233962 A1 | 9/2010 | Johansson | |
| 2010/0240314 A1 | 9/2010 | Chang | |
| 2010/0248737 A1 | 9/2010 | Smith | |
| 2010/0260036 A1 | 10/2010 | Molnar et al. | |
| 2010/0260068 A1 | 10/2010 | Bhatt et al. | |

(56) References Cited

U.S. PATENT DOCUMENTS

| | | |
|---|---|---|
| 2010/0267338 A1 | 10/2010 | Chiu |
| 2010/0267408 A1 | 10/2010 | Lee et al. |
| 2010/0275083 A1 | 10/2010 | Nam et al. |
| 2010/0279628 A1 | 11/2010 | Love et al. |
| 2010/0285795 A1 | 11/2010 | Whinnett |
| 2010/0309864 A1 | 12/2010 | Tamaki |
| 2010/0311449 A1 | 12/2010 | Whinnett |
| 2010/0317351 A1 | 12/2010 | Gerstenberger |
| 2010/0322109 A1 | 12/2010 | Ahn |
| 2011/0034174 A1 | 2/2011 | Xu |
| 2011/0039539 A1 | 2/2011 | Maida et al. |
| 2011/0039570 A1 | 2/2011 | Maida et al. |
| 2011/0070911 A1 | 3/2011 | Zhang |
| 2011/0077016 A1 | 3/2011 | Stolyar et al. |
| 2011/0081865 A1 | 4/2011 | Xiao |
| 2011/0086614 A1 | 4/2011 | Brisebois |
| 2011/0092209 A1* | 4/2011 | Gaal ............... H04W 16/12 455/436 |
| 2011/0098072 A1 | 4/2011 | Kim |
| 2011/0110316 A1 | 5/2011 | Chen et al. |
| 2011/0128862 A1 | 6/2011 | Kallin |
| 2011/0136478 A1 | 6/2011 | Trigui |
| 2011/0151877 A1 | 6/2011 | Tafreshi |
| 2011/0151881 A1* | 6/2011 | Chou ............... H04W 16/12 455/447 |
| 2011/0171911 A1 | 7/2011 | Liu |
| 2011/0176497 A1 | 7/2011 | Gopalakrishnan |
| 2011/0182375 A1 | 7/2011 | Kim et al. |
| 2011/0188441 A1 | 8/2011 | Kim |
| 2011/0194423 A1* | 8/2011 | Cho ............... H04W 52/04 370/252 |
| 2011/0195730 A1 | 8/2011 | Chami |
| 2011/0195732 A1 | 8/2011 | Kim |
| 2011/0201277 A1 | 8/2011 | Eguchi |
| 2011/0211514 A1 | 9/2011 | Hamalainen |
| 2011/0223964 A1 | 9/2011 | Ebiko |
| 2011/0235598 A1 | 9/2011 | Hilborn |
| 2011/0250881 A1 | 10/2011 | Michel et al. |
| 2011/0287755 A1 | 11/2011 | Cho |
| 2011/0306347 A1 | 12/2011 | Choi |
| 2011/0310879 A1 | 12/2011 | Wu |
| 2011/0317742 A1 | 12/2011 | Kawahatsu |
| 2012/0004003 A1 | 1/2012 | Shaheen et al. |
| 2012/0015655 A1 | 1/2012 | Lee |
| 2012/0028584 A1 | 2/2012 | Zhang |
| 2012/0046026 A1 | 2/2012 | Chande |
| 2012/0046028 A1 | 2/2012 | Damnjanovic |
| 2012/0046063 A1 | 2/2012 | Chande |
| 2012/0083201 A1 | 4/2012 | Truong |
| 2012/0087247 A1 | 4/2012 | Min et al. |
| 2012/0087266 A1 | 4/2012 | Vajapeyam |
| 2012/0100849 A1 | 4/2012 | Marsico |
| 2012/0115534 A1 | 5/2012 | Luo |
| 2012/0129537 A1 | 5/2012 | Liu et al. |
| 2012/0157155 A1 | 6/2012 | Cho |
| 2012/0176980 A1 | 7/2012 | Moon et al. |
| 2012/0178451 A1 | 7/2012 | Kubota |
| 2012/0231797 A1 | 9/2012 | Van Phan et al. |
| 2012/0236774 A1 | 9/2012 | Guey et al. |
| 2012/0238263 A1 | 9/2012 | Caretti et al. |
| 2012/0243431 A1 | 9/2012 | Chen et al. |
| 2012/0258720 A1 | 10/2012 | Tinnakornsurisphap et al. |
| 2012/0265888 A1 | 10/2012 | Roeland et al. |
| 2012/0270536 A1 | 10/2012 | Ratasuk |
| 2012/0282964 A1 | 11/2012 | Xiao et al. |
| 2013/0003697 A1 | 1/2013 | Adjakple et al. |
| 2013/0005388 A1 | 1/2013 | Naka |
| 2013/0021962 A1 | 1/2013 | Hu et al. |
| 2013/0029669 A1 | 1/2013 | Boudreau et al. |
| 2013/0044704 A1 | 2/2013 | Pang |
| 2013/0077482 A1 | 3/2013 | Krishna et al. |
| 2013/0079007 A1 | 3/2013 | Nagaraja et al. |
| 2013/0107798 A1 | 5/2013 | Gao et al. |
| 2013/0109380 A1 | 5/2013 | Centonza |
| 2013/0121257 A1 | 5/2013 | He et al. |
| 2013/0136072 A1 | 5/2013 | Bachmann et al. |
| 2013/0137447 A1 | 5/2013 | Zhang et al. |
| 2013/0142116 A1 | 6/2013 | Prakash |
| 2013/0157680 A1 | 6/2013 | Morita |
| 2013/0163543 A1 | 6/2013 | Freda et al. |
| 2013/0182680 A1 | 7/2013 | Choi et al. |
| 2013/0229945 A1 | 9/2013 | Cha et al. |
| 2013/0242748 A1 | 9/2013 | Mangalvedhe et al. |
| 2013/0250875 A1 | 9/2013 | Chen et al. |
| 2013/0279403 A1 | 10/2013 | Takaoka |
| 2013/0294356 A1 | 11/2013 | Bala et al. |
| 2013/0308531 A1 | 11/2013 | So et al. |
| 2013/0310019 A1 | 11/2013 | Visotsky |
| 2013/0310103 A1 | 11/2013 | Madan et al. |
| 2013/0326001 A1 | 12/2013 | Jorgensen et al. |
| 2013/0331079 A1 | 12/2013 | Racz et al. |
| 2013/0337821 A1 | 12/2013 | Clegg |
| 2013/0339783 A1 | 12/2013 | Alonso et al. |
| 2013/0343304 A1 | 12/2013 | Kaippallimalil et al. |
| 2013/0343755 A1 | 12/2013 | Cvijetic et al. |
| 2014/0003225 A1 | 1/2014 | Mann et al. |
| 2014/0010086 A1 | 1/2014 | Etemad et al. |
| 2014/0011505 A1 | 1/2014 | Liao |
| 2014/0018073 A1 | 1/2014 | Frenger |
| 2014/0029524 A1 | 1/2014 | Dimou et al. |
| 2014/0056220 A1 | 2/2014 | Poitau et al. |
| 2014/0056278 A1 | 2/2014 | Marinier et al. |
| 2014/0073304 A1 | 3/2014 | Brisebois |
| 2014/0078986 A1 | 3/2014 | Kaippallimalil et al. |
| 2014/0086226 A1 | 3/2014 | Zhao et al. |
| 2014/0087747 A1 | 3/2014 | Kronestedt |
| 2014/0092765 A1 | 4/2014 | Agarwal et al. |
| 2014/0098757 A1 | 4/2014 | Khandekar |
| 2014/0112251 A1 | 4/2014 | Kim et al. |
| 2014/0113643 A1 | 4/2014 | Ma et al. |
| 2014/0126537 A1 | 5/2014 | Chen et al. |
| 2014/0146732 A1 | 5/2014 | Olufunmilola et al. |
| 2014/0148149 A1 | 5/2014 | Kwan |
| 2014/0148179 A1 | 5/2014 | Das et al. |
| 2014/0153439 A1 | 6/2014 | Nuss et al. |
| 2014/0155081 A1 | 6/2014 | Nuss |
| 2014/0155109 A1 | 6/2014 | Vaidya et al. |
| 2014/0169409 A1 | 6/2014 | Ma et al. |
| 2014/0170965 A1 | 6/2014 | Li |
| 2014/0171143 A1 | 6/2014 | Liu |
| 2014/0185467 A1 | 7/2014 | Heo |
| 2014/0198678 A1 | 7/2014 | Kim et al. |
| 2014/0200001 A1 | 7/2014 | Song |
| 2014/0211739 A1 | 7/2014 | Kim et al. |
| 2014/0213274 A1 | 7/2014 | Weber et al. |
| 2014/0219117 A1 | 8/2014 | Meshkati et al. |
| 2014/0219197 A1 | 8/2014 | Chaudhuri |
| 2014/0220990 A1 | 8/2014 | Lorca Hernando |
| 2014/0226736 A1 | 8/2014 | Niu et al. |
| 2014/0233468 A1 | 8/2014 | Hejazi |
| 2014/0233530 A1 | 8/2014 | Damnjanovic |
| 2014/0241316 A1 | 8/2014 | Okmyanskiy et al. |
| 2014/0243005 A1 | 8/2014 | Yanover et al. |
| 2014/0269355 A1 | 9/2014 | Monogioudis et al. |
| 2014/0273852 A1 | 9/2014 | McCormack et al. |
| 2014/0274195 A1 | 9/2014 | Singh |
| 2014/0293906 A1 | 10/2014 | Chang et al. |
| 2014/0302851 A1 | 10/2014 | Yiu |
| 2014/0302859 A1* | 10/2014 | Nama ............... H04W 16/10 455/447 |
| 2014/0307685 A1 | 10/2014 | Takano |
| 2014/0321304 A1 | 10/2014 | Yu |
| 2014/0328277 A1 | 11/2014 | Xiao et al. |
| 2014/0328327 A1 | 11/2014 | Xiao et al. |
| 2014/0335909 A1 | 11/2014 | Czerepinski |
| 2014/0378145 A1 | 12/2014 | Legg |
| 2015/0004975 A1 | 1/2015 | Yamamoto |
| 2015/0011222 A1 | 1/2015 | Brisebois et al. |
| 2015/0011229 A1 | 1/2015 | Morita et al. |
| 2015/0018028 A1 | 1/2015 | Uplenchwar et al. |
| 2015/0038190 A1 | 2/2015 | Carter et al. |
| 2015/0055479 A1 | 2/2015 | Reider |
| 2015/0063223 A1 | 3/2015 | Shen |
| 2015/0063225 A1 | 3/2015 | Kanamarlapudi |

(56) References Cited

U.S. PATENT DOCUMENTS

| | | |
|---|---|---|
| 2015/0063231 A1 | 3/2015 | Seo et al. |
| 2015/0087325 A1 | 3/2015 | Nuss et al. |
| 2015/0105025 A1 | 4/2015 | Zhang |
| 2015/0138981 A1 | 5/2015 | Nuss et al. |
| 2015/0141027 A1 | 5/2015 | Tsui et al. |
| 2015/0146594 A1 | 5/2015 | Grayson et al. |
| 2015/0148036 A1 | 5/2015 | Grayson et al. |
| 2015/0208425 A1 | 7/2015 | Caretti et al. |
| 2015/0237588 A1 | 8/2015 | Zhao et al. |
| 2015/0237637 A1 | 8/2015 | Venkatraman |
| 2015/0256314 A1 | 9/2015 | Gauvreau et al. |
| 2015/0282033 A1 | 10/2015 | Lunden |
| 2015/0282104 A1 | 10/2015 | Damnjanovic |
| 2015/0312778 A1 | 10/2015 | Chandrasekhar et al. |
| 2015/0318994 A1 | 11/2015 | Walsh et al. |
| 2015/0351072 A1 | 12/2015 | Okmyanskiy et al. |
| 2015/0365855 A1 | 12/2015 | Nuss et al. |
| 2015/0365865 A1 | 12/2015 | Bakker |
| 2015/0373698 A1 | 12/2015 | Uplenchwar et al. |
| 2015/0382367 A1 | 12/2015 | Yanover et al. |
| 2016/0094319 A1 | 3/2016 | Chaudhuri |
| 2016/0127069 A1 | 5/2016 | Nuss et al. |
| 2016/0150442 A1 | 5/2016 | Kwan |
| 2016/0157126 A1 | 6/2016 | Nuss et al. |
| 2016/0165485 A1 | 6/2016 | Kwan |
| 2016/0198412 A1 | 7/2016 | Uplenchwar et al. |
| 2016/0211955 A1 | 7/2016 | Wu |
| 2016/0219596 A1 | 7/2016 | Yanover et al. |
| 2016/0242122 A1 | 8/2016 | Yue |
| 2016/0309356 A1 | 10/2016 | Madan et al. |
| 2016/0315728 A1 | 10/2016 | Palenius |
| 2016/0373202 A1 | 12/2016 | Nuss et al. |
| 2017/0034795 A1 | 2/2017 | Madan |
| 2017/0041938 A1 | 2/2017 | Nabar |
| 2017/0055225 A1 | 2/2017 | Uplenchwar et al. |
| 2017/0064707 A1 | 3/2017 | Xiao |
| 2017/0094611 A1 | 3/2017 | Carter et al. |
| 2017/0150384 A1 | 5/2017 | Rune |

FOREIGN PATENT DOCUMENTS

| | | |
|---|---|---|
| CN | 102 271 414 | 12/2011 |
| CN | 104684052 A | 6/2015 |
| EP | 1322048 | 6/2003 |
| EP | 1718090 | 11/2006 |
| EP | 1895801 | 3/2008 |
| EP | 2166714 | 3/2010 |
| EP | 2296394 | 3/2011 |
| EP | 2337395 | 6/2011 |
| EP | 2395701 | 12/2011 |
| EP | 2445265 | 4/2012 |
| EP | 2466972 | 6/2012 |
| EP | 2533595 | 12/2012 |
| EP | 2566261 | 3/2013 |
| EP | 2018781 | 4/2013 |
| EP | 2632072 | 8/2013 |
| EP | 2728926 | 5/2014 |
| EP | 2741533 | 6/2014 |
| EP | 2306761 | 7/2014 |
| EP | 2770773 | 8/2014 |
| EP | 2832150 | 2/2015 |
| EP | 2879444 | 6/2015 |
| GB | 2496908 | 5/2013 |
| GB | 2518584 | 4/2015 |
| WO | WO98/24199 | 6/1998 |
| WO | WO00/38351 | 6/2000 |
| WO | WO2000/038351 | 6/2000 |
| WO | WO2007/074373 | 7/2007 |
| WO | WO2007/133135 | 11/2007 |
| WO | WO2010/006909 | 1/2010 |
| WO | WO2010/018929 | 2/2010 |
| WO | WO2010/064110 | 6/2010 |
| WO | WO2010/125151 | 11/2010 |
| WO | WO2011/085238 | 7/2011 |
| WO | WO2011/088465 | 7/2011 |
| WO | WO2011/090908 | 7/2011 |
| WO | WO2011/137345 | 11/2011 |
| WO | WO2012/148009 | 1/2012 |
| WO | WO2012/055984 | 5/2012 |
| WO | WO2012/079604 | 6/2012 |
| WO | WO2013/005016 | 1/2013 |
| WO | WO2013/041574 | 3/2013 |
| WO | WO2013/082245 | 6/2013 |
| WO | WO2013/086659 | 6/2013 |
| WO | WO2013/112082 | 8/2013 |
| WO | WO2013/144950 | 10/2013 |
| WO | WO2013/169991 | 11/2013 |
| WO | WO2014/001025 | 3/2014 |
| WO | WO2014/059935 | 4/2014 |
| WO | WO2014/064674 | 5/2014 |
| WO | WO2014/071308 | 5/2014 |
| WO | WO2014/087392 | 6/2014 |
| WO | WO2014/087393 | 6/2014 |

OTHER PUBLICATIONS

"ETSI TS 123 007 V12.6.0 (Oct. 2014) Technical Specification: Digital Cellular Telecommunications System (Phase 2+); Universal Mobile Telecommunications System (UMTS); LTE; Restoration procedures (EGPP TS 23.007 version 12.6.0 Release 12)," ETSI, 650 Route des Lucioles, F-06921, Sophia Antipolis Cedex—France, Oct. 2014; 93 pages.

"ETSI TS 123 401 V9.5.0 (Jun. 2010) Technical Specification: LTE; General Packet Radio Service (GPRS) enhancements for Evolved Universal Terrestrial Radio Access Network (E-UTRAN) access (3GPP TS 23.401 version 9.5.0 Release 9)," ETSI, 650 Route des Lucioles, F-06921, Sophia Antipolis Cedex—France, Jun. 2010; See Section 4, pp. 15-46.

"ETSI TS 123 401 V11.10.0 (Jul. 2014) Technical Specification: LTE; General Packet Radio Service (GPRS) enhancements for Evolved Universal Terrestrial Radio Access Network (E-UTRAN) access (3GPP TS 23.401 version 11.10.0 Release 11)," [Relevant Sections 5.3.1.2 and 5.3.4.3 only]; ETSI, 650 Route des Lucioles, F-06921, Sophia Antipolis Cedex—France, Jul. 2014.

"ETSI TS 123 401 V12.6.0 (Sep. 2014) Technical Specification: LTE; General Packet Radio Service (GPRS) enhancements for Evolved Universal Terrestrial Radio Access Network (E-UTRAN) access (3GPP TS 23.401 version 12.6.0 Release 12)," ETSI, 650 Route des Lucioles, F-06921, Sophia Antipolis Cedex—France, Sep. 2014; 308 pages.

"ETSI TS 123 401 V12.70 (Jan. 2015) Technical Specification: LTE; General Packet Radio Service (GPRS) enhancements for Evolved Universal Terrestrial Radio Access Network (E-UTRAN) access (EGPP TS 23.401 version 12.7.0 Release 12)," Section 4 only, European Telecommunications Standards Institute, 650 Route des Lucioles, F-06921 Sophia Antipolis Cedex, France; Jan. 2015; 77 pages.

"ETSI TS 125 133 V12.6.0 (Jan. 2013) Technical Specification: Universal Mobile Telecommunications System 9UMTS); Requirements for support of radio resource management (FDD) (3GPP TS 25.133 version 12.6.0 Release 12);" ETSI, European Telecommunications Standards Institute 2012, 650 Route des Lucioles, F-06921 Sophia Antipolis Cedex—France, Jan. 2015; 368 pages.

"ETSI TS 125 211 V11.5.0 (Jul. 2014) Technical Specification: Universal Mobile Telecommunications System (UMTS); Physical channels and mapping of transport channels onto physical channels (FDD) (3GPP TS 25.211 version 11.5.0 Release 11)," [Relevant Section 7 only]; ETSI, 650 Route des Lucioles, F-06921, Sophia Antipolis Cedex—France, Jul. 2014.

"ETSI TS 125 215 V 12.0.0 (Sep. 2014) Technical Specification: Universal Mobile Telecommunications System (UMTS); Physical layer; Measurements (FDD) (3GPP TS 25.215 version 12.0.0 Release 12);" ETSI, European Telecommunications Standards Institute 2012, 650 Route des Lucioles, F-06921 Sophia Antipolis Cedex—France, Sep. 2014; 26 pages.

"ETSI TS 125 224 V12.0.0 (Sep. 2014) Technical Specification: Universal Mobile Telecommunications System (UMTS); Physical layer procedures (TDD) (3GPP TS 25.224 version 12.0.0 Release

(56) References Cited

OTHER PUBLICATIONS

12);" ETSI, European Telecommunications Standards Institute 2012, 650 Route des Lucioles, F-06921 Sophia Antipolis Cedex—France, Sep. 2014; 86 pages.
"ETSI TS 125 331 V11.10.0 (Jul. 2014) Technical Specification: Universal Mobile Telecommunications System (UMTS); Radio Resource Control (RRC); Protocol Specification," ETSI, 650 Route des Lucioles, F-06921, Sophia Antipolis Cedex—France, Jul. 2014, © European Telecommunications Standards Institute 2014. All Rights Reserved. [Relevant Portions: §7.2.2 pp. 55-58; §8.1.2 pp. 105-108; §8.1.4 pp. 126-129; §8.3.1 pp. 215-260; §8.3.8-8.3.9 pp. 289-292; §8.5.21 pp. 357-365; §10.2.7 pp. 620-623; Annex B.3 pp. 2045-2052].
"ETSI TS 125 367 V9.4.0, Universal Mobile Telecommunications System (UMTS); Mobility procedures for Home Node B (HNB); Overall description; Stage 2 (3GPP T525.367 version 9.4.0 Release 9)", European Telecommunications Standards Institute, 650 Route des Lucioles, F-06921 Sophia Antipolis Cedex, France, Jun. 2010; 17 pages.
"ETSI TS-125-469 V9.3.0 (Oct. 2010) Technical Specification: Universal Mobile Telecommunications System (UMTS); UTRAN Iuh interface Home Node B (HNG) Application Part (HNBAP) signaling (3GPP TS 25.469 version 9.3.0 Release 9)," ©European Telecommunications Standards Institute 2010; Oct. 2010; 64 pages.
"ETSI TS 125 469 v11.2.0, Universal Mobile Telecommunications System (UMTS); UTRAN Iuh interface Home Node B (HNB); Application Part (HNBAP) signalling (3GPP TS25.469 version 11.2.0 Release 11)," European Telecommunications Standards Institute, 650 Route des Lucioles, F-06921 Sophia Antipolis Cedex, France, Apr. 2013, 78 pages.
"ETSI TS 129 061 V12.7.0 (Oct. 2014) Technical Specification: Digital cellular telecommunications system (Phase 2+); Universal Mobile Telecommunications System (UMTS); LTE; Interworking between the Public Land Mobile Network (PLMN) supporting packet based services and Packet Data Networks (PDN) (3GPP TS 29.061 version 12.7.0 Release 12)," ETSI, 650 Route des Lucioles, F-06921, Sophia Antipolis Cedex—France, Oct. 2014; 170 pages.
"ETSI TS 129 212 V12.6.0 (Oct. 2014) Technical Specification: Universal Mobile Telecommunications System (UMTS); LTE; Policy and Charging Control (PCC); Reference Points (EGPP TS 29.212 version 12.6.0 Release 12)," ETSI, 650 Route des Lucioles, F-06921, Sophia Antipolis Cedex—France, Oct. 2014, 232 pages.
"ETSI TS 129 213 V12.5.0 (Oct. 2014) Technical Specification: Digital Cellular Telecommunications System (Phase 2+); Universal Mobile Telecommunications System (UMTS); LTE; Policy and charging control signalling flows and Quality of Service (QoS) parameter mapping (3GPP TS 29.213 version 12.5.0 Release 12),"[Relevant Sections 3, 4, 8 and 8 only], ETSI, 650 Route des Lucioles, F-06921, Sophia Antipolis Cedex—France, Oct. 2014.
"ETSI TS 129 214 V12.5.0 (Oct. 2014) Technical Specification: Universal Mobile Telecommunications System (UMTS); LTE; Policy and charging control over Rx reference point (3GPP TS 29.214 version 12.5.0 Release 12)," ETSI, 650 Route des Lucioles, F-06921, Sophia Antipolis Cedex—France, Oct. 2014; 64 pages.
"ETSI TS 136 111 V12.0.0 (Oct. 2014) Technical Specification: LTE; Location Measurement Unit (LMU) performance specification; Network based positioning systems in Evolved Universal Terrestrial Radio Access Network (E-UTRAN) (3GPP TS 36.111 version 12.0.0 Release 12);" ETSI, European Telecommunications Standards Institute 2012, 650 Route des Lucioles, F-06921 Sophia Antipolis Cedex—France; Oct. 2014.
"ETSI TS 136 133 V12.5.0 (Nov. 2014) Technical Specification: LTE; Evolved Universal Terrestrial Radio Access (E-UTRA); Requirements for support of radio resource management (3GPP TS 36.133 version 12.5.0 Release 12)," [Relevant Sections 8-10 only]; ETSI, 650 Route des Lucioles, F-06921, Sophia Antipolis Cedex—France, Nov. 2014.
"ETSI TS 136 133 V12-9-0 (Oct. 2015) Technical Specification: LTE; Evolved Universal Terrestrial Radio Access (E-UTRA); Requirements for support of Radio Resource management (3GPP TS 36.133 version 12.9.0 Release 12)," ETSI, European Telecommunications Standards Institute, 650 Route des Lucioles F-06921 Sophia Antipolis Cedex—France, Oct. 2015 Sections 1 thru 9 only; 252 pages.
"ETSI TS 136 201 V12.1.0 (Feb. 2015) Technical Specificaton: LTE; Evolved Universal Terrestrial Radio Access (E-UTRA); LTE physical layer; General description (3GPP TS 36.201 version 12.1.0 Release 12);" ETSI, European Telecommunications Standards Institute 2012, 650 Route des Lucioles, F-06921 Sophia Antipolis Cedex—France, Feb. 2015; 15 pages.
"ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0 Release 12);" ETSI, European Telecommunications Standards Institute, 650 Route des Lucioles F-06921 Sophia Antipolis Cedex—France; Apr. 2015.
"ETSI TS 136 213 V12.4.0 (Feb. 2015) Technical Specification: LTE; Evolved Universal Terrestrial Radio Access (E-UTRA); Physical layer procedures (3GPP TS 36.213 version 12.4.0 Release 12);" ETSI, European Telecommunications Standards Institute 2012, 650 Route des Lucioles, F-06921 Sophia Antipolis Cedex—France, Feb. 2015; 227 pages.
"ETSI TS 136 213 V12.7.0 (Oct. 2015) Technical Specification: LTE; Evolved Universal Terrestrial Radio Access (E-UTRA); Physical layer procedures (3GPP TS 36.213 version 12.7.0 Release 12);" ETSI, European Telecommunications Standards Institute, 650 Route des Lucioles F-06921 Sophia Antipolis Cedex—France, Oct. 2015; 243 pages.
"ETSI TS 136 213 V9.3.0 (Oct. 2010) Technical Specification: LTE; Evolved Universal Terrestrial Radio Access (E-UTRA); Physical layer procedures (3GPP TS 36.213 version 9.3.0 Release 9);" ETSI, European Telecommunications Standards Institute 2012, 650 Route des Lucioles, F-06921 Sophia Antipolis Cedex—France; Oct. 2010.
"ETSI TS 136 214 V9.2.0 (Jun. 2010) Technical Specification: LTE; Evolved Universal Terrestrial Radio Access (E-UTRA); Physical layer; Measurements (3GPP TS 36.214 version 9.2.0 Release 9);" ETSI, European Telecommunications Standards Institute 2012, 650 Route des Lucioles, F-06921 Sophia Antipolis Cedex—France; Jun. 2010.
"ETSI TS 136 300 V12-7-0 (Oct. 2015) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 12.7.0 Release 12);" ETSI, European Telecommunications Standards Institute, 650 Route des Lucioles F-06921 Sophia Antipolis Cedex—France, Oct. 2015; 264 pages.
"ETSI TS 136 304 V12-6-0 (Nov. 2015) Technical Specification: LTE; Evolved Universal Terrestrial Radio Access (E-UTRA); User Equipment (UE) procedures in idle mode (3GPP TS 36.304 version 12.6.0 Release 12);" ETSI, European Telecommunications Standards Institute, 650 Route des Lucioles F-06921 Sophia Antipolis Cedex—France, Nov. 2015; 40 pages.
"ETSI TS 136 321 V12.7.0 (Oct. 2015) Technical Specification: LTE; Evolved Universal Terrestrial Radio Access (E-UTRA); Medium Access Control (MAC) protocol specification (3GPP TS 36.321 version 12.7.0 Release 12);" ETSI, European Telecommunications Standards Institute, 650 Route des Lucioles F-06921 Sophia Antipolis Cedex—France, Oct. 2015; 79 pages.
"ETSI TS 136 331 V12.3.0 (Sep. 2014) Technical Specificaton: LTE; Evolved Universal Terrestrial Radio Access (E-UTRA); Radio Resource Control (RRC); Protocol specification (3GPP TS 36.311 version 12.3.0 Release 12)," [Relevant Section 5.3.2 only]; ETSI, 650 Route des Lucioles, F-06921, Sophia Antipolis Cedex—France, Sep. 2014.
"ETSI TS 136 331 V12.7.0 (Oct. 2015) Technical Specification: LTE; Evolved Universal Terrestrial Radio Access (E-UTRA); Radio Resource Control (RRC); Protocol Specification (3GPP TS 36.331 version 12.7.0 Release 12);" ETSI, European Telecommunications Standards Institute, 650 Route des Lucioles F-06921 Sophia Antipolis Cedex—France, Oct. 2015; 455 pages.
"ETSI TS 136 423 V8.3.0 (Nov. 2008) Technical Specification: LTE; Evolved Universal Terrestrial Radio Access Network (E-UTRAN); X2 Application Protocol (X2AP) (3GPP TS 36.423

(56) References Cited

OTHER PUBLICATIONS version 8.3.0 Release 8);" ETSI, European Telecommunications Standards Institute 2012, 650 Route des Lucioles, F-06921 Sophia Antipolis Cedex—France; Nov. 2008.
"ETSI TS 136 211 V12.4.0 (Feb. 2015) Technical Specification: LTE; Evolved Universal Terrestrial Radio Access (E-UTRA); Physical channels and modulation (3GPP TS 36.211 version 12.4.0 Release 12);" ETSI, European Telecommunications Standards Institute 2012, 650 Route des Lucioles, F-06921 Sophia Antipolis Cedex—France, Feb. 2015; 126 pages.
"ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0 Release 12)," ETSI, European Telecommunications Standards Institute 2012, 650 Route des Lucioles, F-06921 Sophia Antipolis Cedex—France, Apr. 2015; 139 pages.
"ETSI TS 136 212 V12.3.0 (Feb. 2015) Technical Specification: LTE; Evolved Universal Terrestrial Radio Access (E-UTRA); Multiplexing and channel coding (3GPP TS 36.212 version 12.3.0 Release 12);" ETSI, European Telecommunications Standards Institute 2012, 650 Route des Lucioles, F-06921 Sophia Antipolis Cedex—France, Feb. 2015; 91 pages.
"ETSI TS 136 213 V 12.4.0 (Feb. 2015) Technical Specification: LTE; Evolved Universal Terrestrial Radio Access (E-UTRA); Physical layer procedures (3GPP TS 36.213 version 12.4.0 Release 12);" ETSI, European Telecommunications Standards Institute 2012, 650 Route des Lucioles, F-06921 Sophia Antipolis Cedex—France, Feb. 2015; 227 pages.
"ETSI TS 136 212 V12.6.0 (Oct. 2015) Technical Specification: LTE; Evolved Universal Terrestrial Radio Access (E-UTRA); Multiplexing and channel coding (3GPP TS 36.212 version 12.6.0 Release 12);" ETSI, European Telecommunications Standards Institute, 650 Route des Lucioles F-06921 Sophia Antipolis Cedex—France, Oct. 2015; 96 pages.
"ETSI TS 136 214 V10.1.0 (Apr. 2011) Technical Specification: LTE; Evolved Universal Terrestrial Radio Access (E-UTRA); Physical layer; Measurements (3GPP TS 36.214 version 10.1.0 Release 10);" ETSI, European Telecommunications Standards Institute 2012, 650 Route des Lucioles, F-06921 Sophia Antipolis Cedex—France, Apr. 2011; 15 pages.
"ETSI TS 136 300 V12.4.0 (Feb. 2015) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 12.4.0 Release 12);" ETSI, European Telecommunications Standards Institute 2012, 650 Route des Lucioles, F-06921 Sophia Antipolis Cedex—France, Feb. 2015; 266 pages.
"ETSI TS 136 423 V12.4.2 (Feb. 2015) Technical Specification: LTE; Evolved Universal Terrestrial Radio Access Network (E-UTRAN); X2 Application Protocol (X2AP) (3GPP TS 36.423 version 12.4.2 Release 12);" ETSI, European Telecommunications Standards Institute 2012, 650 Route des Lucioles, F-06921 Sophia Antipolis Cedex—France, Feb. 2015; 205 pages.
"ETSI TS-136-423 V9.4.0 (Oct. 2010) Technical Specification: LTE; Evolved Universal Terrestrial Radio Access Network (E-UTRAN); X2 Application Protocol (X2AP) (3GPP TS 36.423 version 9.4.0 Release 9)," ETSI, European Telecommunications Standards Institute, 650 Route des Lucioles F-06921 Sophia Antipolis Cedex—France, Oct. 2010, Section 8.3.8.
"ETSI GS NFV 002 V1.1.1 (Oct. 2013) Group Specification: Network Functions Virtualisation (NFV); Architectural Framework," ETSI, European Telecommunications Standards Institute, 650 Route des Lucioles F-06921 Sophia Antipolis Cedex—France, Oct. 2013; 21 pages.
"3GPP LTE Packet Data Convergence Protocol (PDCP) Sub Layer," EventHelix.com Inc., first published on or about Jan. 1, 2010; 20 pages.
"3GPP TR23.705 V0.11.0 (May 2014) Technical Report: 3rd Generation Partnership Project; Technical Specification Group Services and System Aspects; Study on system enhancements for user plane congestion management (Release 13)," 3GPP, 650 Route des Lucioles, F-06921, Sophia Antipolis Cedex—France, May 2014, 64 pages.
"3GPP TR 36.814 V9.0.0 (Mar. 2010) Technical Report: 3rd Generation Partnership Project; Technical Specification Group Radio Access Network; Evolved Universal Terrestrial Radio Access (E-UTRA); Further advancements for E-UTRA physical layer aspects (Release 9);" 3rd Generation Partnership Project (3GPP), Mar. 2010.
"3GPP TR 23.852 (V12.0.0 (Sep. 2013) Technical Report: 3rd Generational Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12);" 3rd Generation Partnership Project (3GPP), Sep. 2013, 157 pages.
"3GPP TS 22.368 V13.0.0 (Jun. 2014) Technical Specification: 3rd Generation Partnership Project; Technical Specification Group Services and System Aspects; Service requirements for Machine-Type Communications (MTC); Stage 1 (Release 13)," 3rd Generation Partnership Project; Jun. 2014.
"3GPP TS23.002 V12.5.0 (Jun. 2014) Technical Specification: 3rd Generation Partnership Project; Technical Specification Group Services and System Aspects; Network architecture (Release 12)," 3GPP, 650 Route des Lucioles, F-06921, Sophia Antipolis Cedex—France, Jun. 2014; See Sections 1-5, pp. 11-76.
"3GPP TS 23.060 V13.0.0 (Sep. 2014) Technical Specification: 3rd Generation Partnership Project; Technical Specification Group Services and System Aspects; General Packet Radio Service (GPRS); Service description; Stage 2 (Release 13)," [Relevant Sections 5.3.20 and 6.2.3 only]; 3rd Generation Partnership Project; Sep. 2014.
"3GPP TS 23.203 V13.1.0 (Sep. 2014) Technical Specification: 3rd Generation Partnership Project; Technical Specification Group Services and System Aspects; Policy and charging control architecture (Release 13)," [Relevant Sections 1-6 only]; 3rd Generation Partnership Project, Sep. 2014.
"3GPP TS 23.401 V13.3.0 (Jun. 2015) Technical Specification: 3rd Generation Partnership Project; Technical Specification Group Services and System Aspects;General Packet Radio Service (GPRS) enhancements for Evolved Universal Terrestrial Radio Access Network (E-UTRAN) access (Release 13)," 3rd Generation Partnership Project, 650 Route des Lucioles Sophia Antipolis Valbonne—France, Jun. 2015; Sections 4 and 5 only.
"3GPP TS 23.682 V12.2.0 (Jun. 2014) Technical Specification: 3rd Generation Partnership Project; Technical Specification Group Services and System Aspects; Architecture enhancements to facilitate communications with packet data networks and applications (Release 12)," 3rd Generation Partnership Project; Jun. 2014.
"3GPP TS 23.887 V12.0.0 (Dec. 2013) Technical Report: 3rd Generation Partnership Project; Technical Specification Group Services and System Aspects; Study on Machine-Type Communications (MTC) and other mobile data applications communications enhancements (Release 12)," 3rd Generation Partnership Project; Dec. 2013.
"3GPP TS 25.367 V11.0.0 (Jun. 2012) Technical Specification: Group Radio Access Network; Mobility procedures for Home Node B (HNG); Overall description; Stage 2 (Release 11)," 3rd Generation Partnership Project, Mobile Competence Centre; 650, Route Des Lucioles; F-06921 Sophia-Antipolis Cedex; France; Jun. 2012, 14 pages.
"3GPP TS 29.212 V12.5.2 (Jul. 2014) Technical Specification: 3rd Generation Partnership Project; Technical Specification Group Core Network and Terminals; Policy and Charging Control (PCC); Reference Points (Release 12)," 3GPP, 650 Route des Lucioles, F-06921, Sophia Antipolis Cedex—France, Jul. 2014; Section 4, pp. 17-88.
"3GPP TS 29-272 V12-6-0 (Sep. 2014) Technical Specification: 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol

(56) References Cited

OTHER PUBLICATIONS (Release12)," [Relevant Sections 5 and 7.3.1-7.3.21 only]; 3rd Generation Partnership Project; Sep. 2014.
"3GPP TS 29-274 V12-6-0 (Sep. 2014) Technical Specification: 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," [Relevant Sections 4-6; 7.1-7.2.15; and 8.1-8.21.6 only]; 3rd Generation Partnership Project; Sep. 2014.
"3GPP TS 32.522 v11.2.0, 3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11)," 3GPP, 650 Route des Lucioles, F-06921 Sophia Antipolis Valbonne, France, Jun. 2012, 35 pages.
"3GPP TS 36.300 V12.3.0 (Sep. 2014) Technical Specification: 3rd Generation Partnership Project; Technical Specification Group Radio Access Network; Evolved Universal Terrestrial Radio Access (E-UTRA) and Evolved Universal Terrestrial Radio Access Network 9E-UTRAN); Overall description; Stage 2 (Release 12)," [Relevant Sections 15 and 23 only]; 3rd Generation Partnership Project; Sep. 2014.
"3GPP TS 36.300 V11.3.0 (Sep. 2012) Technical Specification: Group Radio Access Network; Evolved Universal Terrestrial Radio Access (E-UTRA) and Evolved Universal Terrestrial Radio Access Network (E-UTRAN); Overall Description; Stage 2 (Release 11)," 3rd Generation Partnership Project, Mobile Competence Centre; 650, Route Des Lucioles; F-06921 Sophia-Antipolis Cedex; Sep. 2012, 205 pages.
"3GPP TS 36.413 V9.5.1 (Jan. 2011)Technical Specification: 3rd Generation Partnership Project; Technical Specification Group Radio Access Network; Evolved Universal Terrestrial Radio Access Network (E-UTRAN); S1 Application Protocol (S1AP) (Release 9);" 3rd Generation Partnership Project, Jan. 2011.
"3GPP TS 36.413 V12.3.0 (Sep. 2014) Technical Specification: 3rd Generation Partnership Project; Technical Specification Group Radio Access Network; Evolved Universal Terrestrial Radio Access Network (E-UTRAN); S1 Application Protocol (S1AP) (Release 12)," [Relevant Sections 9.1.6 and 9.2.3.13 only]; 3rd Generation Partnership Project, Sep. 2014.
"3GPP TS 37.320 V11.1.0 (Sep. 2012) Technical Specification: Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11)," 3rd Generation Partnership Project, Mobile Competence Centre; 650, Route Des Lucioles; F-06921 Sophia-Antipolis Cedex; France; Sep. 2012, 21 pages.
"3GPP TS 48.008 V8.8.0 (Dec. 2009) Technical Specification: 3rd Generation Partnership Project; Technical Specification Group GSM/EDGE Radio Access Network; Mobile Switching Centre—Base Station System (MSC-BSS) interface; Layer 3 specification (Release 8);" 3rd Generation Partnership Project, Mobile Competence Centre; 650, Route Des Lucioles; F-06921 Sophia-Antipolis Cedex; France; Dec. 2009; 208 pages.
"3GPP Draft TR_R3018_V_100 (Oct. 2007) Technical Specification: Group Radio Access Network; Evolved UTRA and UTRAN; Radio Access Architecture and Interfaces (Release 7)," 3rd Generation Partnership Project, Mobile Competence Centre; 650, Route Des Lucioles; F-06921 Sophia-Antipolis Cedex; France; Oct. 2007, XP050423659.
3GPP Draft R1-124276, Research in Motion UK Limited, "Scoping the UMTS HetNet Study," 3rd Generation Partnership Project (3GPP), Mobile Competence Centre; 650; Route Des Lucioles; F-06921 Sophia-Antipolis; Sep. 2012; XP050662177.
3GPP Draft R3-071432, Telecom Italia, et al., "Self-optimization use case: self-tuning of cell reselction parameters for load balancing," 3rd Generation Partnership Project (3GPP), Mobile Competence Centre; 650; Route Des Lucioles; F-06921 Sophia-Antipolis; Aug. 2007; XP050162260.
3GPP TSG-RAN WG3 #61bis, R3-081174, "Solution for interference reduction SON use case," Orange, Alcatel-Lucent, Agenda Item 10.1.1c; Kansas City, MO, USA, May 5-9, 2008; 6 pages.
3GPP-TSG-RAN WG3 Meeting #60, R3-081123, "Dynamic Setup of HNBs for Energy Savings and Interference Reduction," Mitsubishi Electric, Agenda Item 10.1.1c; Kansas City, MO USA, May 5-9, 2008; 6 pages.
3GPP-TSG-RAN3 #59, R3-080082, "Capacity and Coverage SON Use Case," Alcatel-Lucent, Agenda Item 10.1.1.c; Sorrento, Italy, Feb. 11-15, 2008; 4 pages.
"4G++: Advanced Performance Boosting Techniques in 4th Generation Wireless Systems; A National Telecommunication Regulatory Authority Funded Project; Deliverable D4.1, Work Package 4, Inter-Cell Interference Coordination," 4G++ Project, Funded by the Egyptian National Telecommunications Regulatory Authority (NTRA); 75 pages First Published on or about Sep. 15, 2015.
Adrangi, F., et al., "Chargeable User Identity," Network Working Group RFC 4372, Jan. 2006, 10 pages.
Andrews, Matthew, et al., "Optimal Utility Based Multi-User Throughput Allocation Subject to Throughput Constraints," IEEE INFOCOM 2005, Mar. 13-17, 2005, Miami, FL; 10 pages.
Ashraf, Imran, "Distributed Radio Coverage Optimization in Enterprise Femtocell Networks," International Conference on Communications ICC 2010, May 23-27, 2010, Cape Town, South Africa; 6 pages.
Baid, Akash, et al., "Delay Estimation and Fast Iterative Scheduling Policies for LTE Uplink," HAL archives-ouvertes; HAL Id: hal-00763374, Submitted on Dec. 10, 2012; 9 pages https://hal.inria.fr/hal-00763374.
Basir, Adnan, "3GPP Long Term Evolution (LTE), ICIC and eICIC," posted Jun. 11, 2012; 5 pages; http://4g-lte-world-blogspot.com/2012/06/icic-and-eicic.html.
Bernardos, Carlos J., et al., "Challenges of Designing Jointly the Backhaul and Radio Access Network in a Cloud-based Mobile Network," Future Network & Mobile Summit 2013 Conference Proceedings, Jul. 2013; 10 pages.
"Bisection Method," Wikipedia, the free encyclopedia, Aug. 26, 2015; 5 pages.
"Block Error Ratio (BLER) Measurement Description," Keysight Technologies, Feb. 28, 2014; 3 pages http://rfmw.em.keysight.com/rfcomms/refdocs/wcdma/wcdma_meas_wblerror_desc.html.
"Broadband Forum Technical Report: TR-069 CPE WAN Management Protocol," Issue: 1, Amendment 4, Issue Date: Jul. 2011 Protocol Version 1.3; © The Broadband Forum; 190 pages.
"Broadband Forum Technical Report: TR-069 CPE WAN Management Protocol," Issue: 1, Amendment 5, Issue Date: Nov. 2013 CWMP Version 1.4; © The Broadband Forum; 228 pages.
"Broadband Forum Technical Report: TR-196 Frmto Access Point Service Data Model," Issue: 2, Issue Date: Nov. 2011; 46 pages.
Calhoun, P., "Diameter Base Protocol," Network Working Group RFC 3488, Sep. 2003; 147 pages.
"Cisco ASR 5000 Series Small Cell Gateway," Cisco White Paper, C11-711704-00, Jul. 2012, Cisco Systems, Inc., Printed in USA, © 2012 Cisco and/or its affiliates. All Rights Reserved. 6 pages.
"Cisco EnergyWise Management Suite—Data Sheet," Cisco Systems, Inc., C78-729774-00, Oct. 2013 © 2013 Cisco and/or its affiliates. All Rights Reserved. Printed in USA, 4 pages.
"Cisco Licensed Small Cell Solution: Reduce Costs, Improve Coverage and Capacity—Solution Overview," Cisco Systems, Inc., C22-726686-00, Feb. 2013, © 2013 Cisco and/or its affiliates. All Rights Reserved. Printed in USA, 13 pages.
"Cisco's One Platform Kit (onePK)," Networking Software (IOS & NX-OS), Cisco Systems, Inc., First published on or about Mar. 3, 2014; 2 pages.
Claussen, Holger, et al., "Self-optimization of Coverage for Femtocell Deployments," DOI 10:10.1109/WTS2008 Wireless Telecommunications Symposium, Apr. 26-28, 2008; Pomona, CA; 8 pages.
Do, Dr. Michelle M., et al., "Interference Coordination in LTE/LTE-A (2): eICIC (enhanced ICIC)," Netmanias Tech Blog, Aug. 6,

(56) References Cited

OTHER PUBLICATIONS

2014; 6 pages http://www.netmanias.com/en/post/blog/6551/lte-lte-a-eicic/interference-coordination-in-lte-lte-a-2-eicic-enhanced-icic.
Droms, R., "Dynamic Host Configuration Protocol," Network Working Group RFC 2131, Mar. 1997; 45 pages.
"E Band," from Wikipedia, the free encyclopedia, Dec. 24, 2013; 3 pages.
"EEM Configuration for Cisco Integrated Services Router Platforms," Configuration Guide for Cisco IOS® Embedded Event Manager (EEM), Cisco Systems, Inc., Feb. 2008; 17 pages.
"Extensible Authentication Protocol," Wikipedia, the free encyclopedia, 10 pages [Retrieved and printed Oct. 11, 2013] http://en.wikipedia.org/wiki/Extensible_Authentication_Protocol#EAP-FAST.
Ericsson, "R4-153549: Agenda Item 7.9.3.1—SFN and subframe offset reporting for dual connectivity," 3GPP TSG RAN WG4 Meeting #75, Fukuoka, Japan, May 25-29, 2015.
Ericsson, et al., "LPN Range Expansion in Co-Channel Deployment in Heterogeneous Networks," 3GPP Draft R1-125219, , 3rd Generation Partnership Project (3GPP), Mobile Competence Centre; 650; Route Des Lucioles; F-06921 Sophia-Antipolis; Nov. 2012, 7pages.
Ericsson, et al., "On the Feasibility of Operational Carrier Selection," 3GPP Draft R-3112991 , 3rd Generation Partnership Project (3GPP), Mobile Competence Centre; 650; Route Des Lucioles; F-06921 Sophia-Antipolis; Nov. 2011, 7 pages.
"Fading," from Wikipedia, the free encyclopedia, Apr. 10, 2015; 6 pages.
"Frame Structure—Downlink," Share Technote, first published on or about Jul. 9, 2012; 13 pages. http://www.sharetechnote.com/html/FrameStructure_DL_.html.
"Fuzzy Logic," from Wikipedia, the free encyclopedia, Dec. 3, 2015; 12 pages.
Freescale Semiconductor, "Long Term Evolution Protocol Overview," White Paper, Document No. LTEPTCLOVWWP, Oct. 2008; 21 pages.
Goldsmith, A.J., et al., "Variable Rate Variable-Power MQAM for Fading Channels," IEEE Trans. on Comm. vol. 45, No. 10, Oct. 1997.
"GSMA LTE Roaming Guidelines, Version 9.0," GSM Association, Official Document IR88, Jan. 24, 2013; 53 pages.
Guttman, E., et al., "Service Location Protocol, Version 2," Network Working Group RFC 2608, Jun. 1999, 57 pages.
Haverinen, H., "Extensible Authentication Protocol Method for Global System for Mobile Communications (GSM) Subscriber Identity Modules (EAP-SIM)," Network Working Group RFC 4186, Jan. 2006, 93 pages.
Holappa, Mikko, "Performance Comparison of LTE ENODEB OSI Layer 2 Implementations; Preemptive Partitioned Scheduling vs. Non-Preemptive Global Scheduling," Master's Thesis, Degree Programme in Information Networks; Oulun Yliopisto , University of OULU, Department of Computer Science and Engineering; Oct. 2013, 66 pages.
Holbrook, H., et al., "Source-Specific-Multicast for IP," Network Working Group RFC 4607, Aug. 2006.
Horn, Gavin, "3GPP Femtocells: Architecture and Protocols," Qualcomm Incorporated, 5775 Morehouse Drive, San Diego, CA, Sep. 2010; 64 pages.
"Hysteresis," from Wikipedia, the free encyclopedia; Oct. 1, 2015.
"Hybrid Automatic Repeat Request," from Wikipedia, the free encyclopedia, Jun. 8, 2015; 4 pages.
Ku, Gwanmo, "Resource Allocation in LTE," Adaptive Signal Processing and Information Theory Research Group, Nov. 11, 2011; 33 pages.
Kwan, R., et al., "A Survey of Scheduling and Interference Mitiation in LTE," vol. 2010, Article ID 273486, May 30, 2010.
Kwan, R., et al., "On Radio Admission Control for LTE Systems," Proc. of IEEE VTC-fail, Sep. 6-9, 2010.
Leung, K., et al., "WiMAX Forum/3GPP2 Proxy Mobile IPv4," Independent Submission RFC 5563, Feb. 2010; 41 pages.
Lopez-Perez, D., et al., "Interference Avoidance and Dynamic Frequency Planning for WiMAX Femtocells Networks," Proceedings of ICCS, Jun. 23-25, 2008.
LteWorld, "Packet Data Convergence Protocol (PDCP)," Information Page, LteWorld.org, published on or about Jan. 2, 2013; 2 pages.
"Link Layer Discovery Protocol," Wikipedia, the free encyclopedia, 4 pp., [Retrieved and printed Nov. 17, 2013] http://en.wikipedia.org/wiki/Link_Layer_Discovery_Protocol.
"LTE Physical Layer Overview," Keysight Technologies, First published on or about Aug. 24, 2014; 11 pages http://rfmw.em.keysight.com/wireless/helpfiles/89600B/webhelp/subsystems/lte/content/lte_overview.htm.
"LTE Frame and Subframe Structure," Cellular/Mobile Telecommunications, Tutorial, Radio-Electronics.com; first published on or about Aug. 6, 2009 http://www.radio-electronics.com/info/cellulartelecomms/lte-long-term-evolution/lte-frame-subframe-structure.php.
"LTE Layers Data Flow," LTE Tutorial, tutorialspoint; first published on or about Jan. 17, 2013; 3 pages http://www.tutorialspoint.com/lte/lte_layers_data_flow.htm.
"LTE Protocol Stack Layers," LTE Tutorial, tutorialspoint; first published on or about Jan. 16, 2013 http://www.tutorialspoint.com/lte/lte_protocol_stack_layers.htm.
"LTE Quick Reference," from Share Technote; first published on or about Nov. 28, 2012; http://www.sharetechnote.com/html/Handbook_LTE_RNTI.html.
"LTE Quick Reference: CCE Index Calculation," LTE Handbook, Share Technote, first published on or about Jul. 8, 2012 http://www.sharetechnote.com/html/Handbook_LTE_CCE_Index.html.
"LTE Quick Reference: Resource Allocation and Management Unit," LTE Handbook, Share Technote, first published on or about Jul. 13, 2012 http://www.sharetechnote.com/html/Handbook_LTE_ResourceAllocation_ManagementUnit.html.
"LTE TDD Overview," from ShareTechnote; first published on or about Jul. 2, 2014 http://www.sharetechnote.com/html/LTE_TDD_Overview.html.
Mehlfuhrer, M., et al., "Simulating the Long Term Evolution Physical Layer," Proc. of 17th European Signal Processing Conference (EUSIPCO), Aug. 24-28, 2009.
Narten T., et al., "Neighbor Discovery for IP version 6 (IPv6)," Network Working Group RFC 4861, Sep. 2007; 97 pages.
NGMN Alliance, "Further Study on Critical C-RAN Technologies," Next Generation Mobile Networks, Mar. 31, 2015; 93 pages.
Nivaggioli, Patrice, "Cisco Small Cell Architecture," Cisco Connect, Dubrovnik, Croatia, South East Europe, May 20-22, 2013, © 2012 Cisco and/or its affiliates. All Rights Reserved.; 40 pages.
Nokia Corporation, et al., "SON WI Status Overview," 3GPP Draft R2-093231, 3rd Generation Partnership Project (3GPP), Mobile Competence Centre; 650; Route Des Lucioles; F-06921 Sophia-Antipolis; Apr. 2009.
Novlan, Thomas David, et al., "Analytical Evaluation of Fractional Frequency Reuse for OFDMA Cellular Networks," arXiv: 1101.5130v1 [cs.IT]; arXiv.org, Cornell University Library; Jan. 26, 2011, 25 pages.
Okubo, Naoto, et al., "Overview of LTE Radio Interface and Radio Network Architecture for High Speed, High Capacity and Low Latency," Special Articles on "Xi" (Crossy) LTE Services—Toward Smart Innovation—Technology Reports; NTT DOCOMO Technical Journal vol. 13 No. 1, Jun. 2011.
"Paging Channel Selection," UMTS World; first published on or about Jun. 22, 2003; 3 pages; http://www.umtsworld.com/technology/paging.html.
"Paging Indicator Channel PICH Work in 3G," Teletopix.org, Telecom Techniques Guide, Feb. 13, 2014, 2 pages http://www.teletopix.org/3g-wcdma/paging-indicator-channel-pich-work-in-3g/.
"PDCCH Construction, Expert Opinion," posted by Hongyan on May 20, 2011; LTE University, 4 pages http://lteuniversity.com/get_trained/expert_opinion1/b/hongyanlei/archive/2011/05/20/pdcch-construction.aspx.
"PDCCH Processing," published by Gio Zakradze on Dec. 29, 2014; 56 pages.

(56) References Cited

OTHER PUBLICATIONS

"Plane (in networking)," Definition from WhatIs.com; Jan. 2013 http://whatis.techtarget.com/definition/plane-in-networking.
Piro, G., et al., "An LTE module for the ns-3 Network Simulator," in Proc. of Wns3 2011 (in conjunction with SimuTOOLS 2011), Mar. 2011, Barcelona Spain.
Qualcomm Incorporation: "Design Objectives and Deployment Scenarios for Hetnets," 3GPP Draft R1-124528, 3rd Generation Partnership Project (3GPP), Mobile Competence Centre; 650; Route Des Lucioles; F-06921 Sophia-Antipolis; Sep. 2012, XP050662404.
"Quadrature amplitude modulation," from Wikipedia, the free encyclopedia, Apr. 22, 2015; 11 pages.
"QoS Class Identifier," from Wikipedia, the free encyclopedia, Oct. 7, 2015.
"RADIUS," Wikipedia, the free encyclopedia, 12 pages [Retrieved and printed Oct. 11, 2013] http://en.wikipedia.org/wiki/RADIUS.
"RSRP, EPRE, Total Power," LTE Quick Reference from Sharetechnote.com; first published on or about Aug. 3, 2014; http://www.sharetechnote.com/html/Handbook_LTE_RSRP_EPRE_TotalPower.html.
Saad, Sawsan A., et al., "A Survey on Power Control Techniques in Femtocell Networks," Journal of Communications vol. 8, No. 12, Dec. 2013; 10 pages.
Sadiq, Bilal, et al., "Throughput Optimality of Delay-driven Max Weight Scheduler for a Wireless System with Flow Dynamics," 47th Annual Allerton Conference, Sep. 30-Oct. 2, 2009, University of Illinois at Urbana-Champaign, Champaign, Illinois; 6 pages.
Salim, Umer, et al., "State-of-the-art of and promising candidates for PHY layer approaches on access and backhaul network," INFSO-ICT-317941 iJOIN D 2.1, iJOIN GA, Nov. 4, 2013; 129 pages.
Seo, H., et al., "A proportional-fair power allocation scheme for fair and efficient multiuser OFDM systems," in Proc. of IEEE GLOBECOM, Dec. 2004, Dallas (USA).
Stefan Schwarz etal: "Low complexity approximate maximum throughput scheduling for LTE," 2010 44th Asilomar Conference on Signals, Systems and Computers, Nov. 7-10, 2010, XP031860825, DOI:10.1109/ACSSC.2010.5757800ISBN:978-1-4244-9722-5 p. 1563-p. 1565.
Stolyar A.L., et al., "Self-Organizing Dynamic Fractional Frequency Reuse for Best-Effort Traffic through Distributed Inter-Cell Coordination," IEEE INFOCOM 2009, Proceedings of 28th Conference on Computer Communications, Apr. 12, 2009, pp. 1287-1295, XP031468882, ISBN:978-1-4244-3512-8.
Tassiulas, L., et al., "Stability Properties of Constrained Queueing Systems and Scheduling Policies for Maximum Trhoughput in Multihop Radio Networks," Technical Research Report,CSHCN TR 92-3/ISR TR 92-129, Center for Satellite & Hybrid Communication Networks, A NASA Center for the Commercial Development of Space; University of Maryland Institute for Systems Research; Published in IEEE Transactions on Automatic Control, vol. 37, No. 12, Dec. 1992; 14 pages.
"Transmission Time Interval," from Wikipedia, the free encyclopedia, May 2, 2013.
UKIPO Mar. 27, 2012 Search Report from GB Patent Application Serial No. GB1120462.5.
UKIPO Jan. 19, 2013 Search Report from GB Patent Application Serial No. GB1120462.5.
UKIPO Dec. 20, 2013 Search Report from GB Application Serial No. GB1312321.1, 6 pages.
Velasco, Julio C., et al., "MEF Microwave Technologies for Carrier Ethernet," Metro Ethernet Forum (MEF), 6033 W. Century Boulevard, Suite 1107, Los Angeles CA 90045 USA Jan. 2011; 23 pages.
Wanda, Alex, "UMTS UTRAN Block Error Rate (BLER) Measurements," Telecom Insights, Jan. 2011; 3 pages http://trends-in-telecoms.blogspot.com/2011/01/umts-utrans-block-error-rate-rate-bler.html.
Weaver, Carl, "Self-Organizing Mobility Robustness Optimization in LTE Networks with eICIC," Draft V5.0, Submitted Oct. 23, 2013, Cornell University Library, 19 pages http://arxiv.org/abs/1310.6173.
"Whats is Uplink RSSI in LTE," TelecomSource thread, May 22, 2013; 5 pages http://www.telecomsource.net/howthread.php?5464-Whats-is-Uplink-RSSI-in-LTE.
Wubben, Dirk, et al., "Benefits and Impact of Cloud Computing on 5G Signal Processing," IEEE Signal Processing Magazine, Nov. 2014.
EPO Jul. 29, 2014 Extended Search Report from European Application Serial No. EP13195673, 12 pages.
EPO Aug. 12, 2014 Extended EPO Search Report and Opinion from European Application Serial No. 13195780.8.
EPO Nov. 19, 2015 Extended Search Report and Written Opinion from European Application EP13767700; 9 pages.
EPO Mar. 26, 2015 Extended Search Report and Opinion from European Application Serial No. EP14190541.
PCT Jul. 16, 2013 International Search Report and Written Opinion from International Application PCT/IL2013/050269, 3 pages.
PCT Oct. 1, 2014 International Preliminary Report on Patentability from International Application PCT/IL2013/050269, 4 pages.
PCT Mar. 17, 2014 International Search Report and Written Opinion from International Application Serial No. PCT/IL2013/000086, 12 pages.
PCT Jun. 16, 2014 International Search Report and Written Opinion of the International Searching Authority for International Application Serial No. PCT/IL2013/000085.
PCT—Feb. 13, 2013 International Search Report and Written Opinion from International Application PCT/GB2012/052511; 28 pages.
EPO Jan. 27, 2016 Extended Search Report and Written Opinion from European Application Serial No. 15183582.4; 6 pages.
Sabella, Dario, et al., "RAN as a Service: Challenges of Designing a Flexible RAN Architecture in a Cloud-based Heterogeneous Mobile Network," Future Network Summit Conference, Lisbon, Portugal, Jul. 3-5, 2013; 8 pages.
U.S. Appl. No. 15/002,187, filed Jan. 20, 2016, entitled "System and Method to Provide Small Cell Power Control and Load Balancing for High Mobility User Equipment in a Network Environment," Inventor: Ritesh K. Madan.
U.S. Appl. No. 15/013,844, filed Feb. 2, 2016, entitled "System and Method to Facilitate Subframe Scheduling in a Split Medium Access Control Radio Access Network Environment," Inventor: Ian Neville Bendle, et al.
U.S. Appl. No. 15/018,677, filed Febuary 8, 2016, entitled "Mitigation of Uplink Interference Within Heterogeneous Wireless Communications Networks," Inventor: Pankaj Uplenchwar, et al.
PCT Mar. 27, 2014 International Search Report and Written Opinion from International Application PCT/IL2013/000080, 10 pages.
PCT Apr. 28, 2015 International Preliminary Report on Patentability and Written Opinion from International Application PCT/IL2013/000080.
ILPO May 13, 2015 Search Report from Israel Application Serial No. IL222709 [Only partially translated].
Nokia Siemens Networks et al: "Enhanced ICIC considerations for HetNet scenarios", 3GPP Draft; R1-103822_EICIC_OVERVIEW, 3rd Generation Partnership Project (3GPP), Mobile Competence Centre; 650, Route Des Lucioles; F-06921 Sophia-Antipolis Cedex; France, vol. RAN WG1, no. Dresden, Germany; Jun. 28, 2010-Jul. 2, 2010, Jun. 22, 2010 (Jun. 22, 2010), XP050598481, [retrieved on Jun. 22, 2010] Section 3, 4 pages.
"ETSI TS 136 300 V10.2.0 (Jan. 2011) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 10.2.0 Release 10)," ETSI, European Telecommunications Standards Institute 2012, 650 Route des Lucioles, F-06921 Sophia Antipolis Cedex—France, Jan. 2011; 208 pages.
"ETSI TS 128 657 V11.0.0 (Feb. 2013) Technical Specification: Universal Mobile Telecommunications System 9UMTS); LTE; Telecommunication management; Evolved Universal Terrestrial Radio Access Network 9E-UTRAN) Network Resource Model

(56) References Cited

OTHER PUBLICATIONS (NRM); Integration Reference Point (IRP); Requirements (3GPP TS 28.657 version 11.0.0 Release 11)," ETSI, European Telecommunications Standards Institute 2012, 650 Route des Lucioles, F-06921 Sophia Antipolis Cedex—France, Feb. 2013; 9 pages.
"ETSI TS 128 658 V11.0.0 (Feb. 2013) Technical Specification: Universal Mobile Telecommunications System 9UMTS); LTE; Telecommunication management; Evolved Universal Terrestrial Radio Access Network (E-UTRAN) Network Resource Model (NRM) Integration Reference Point (IRP); Information Service (IS) (3GPP TS 28.658 version 11.0.0 Release 11)," ETSI, European Telecommunications Standards Institute 2012, 650 Route des Lucioles, F-06921 Sophia Antipolis Cedex—France, Feb. 2013; 53 pages.
"ETSI TS 128 659 V11.0.0 (Jan. 2013) Technical Specification: Universal Mobile Telecommunications Systems (UMTS); LTE; Telecommunications Management; Evolved Universal Terrestrial Radio Access Network (E-UTRAN) Network Resource Model (NRM) Integration Reference Point (IRP); Solution Set (SS) definitions (3GPP TS 28.659 version 11.0.0 Release 11)," ETSI, European Telecommunications Standards Institute 2012, 650 Route des Lucioles, F-06921 Sophia Antipolis Cedex—France, Jan. 2013; 48 pages.
"ETSI TS 136 423 V11.3.0 (Jan. 2013) Technical Specification: LTE; Evolved Universal Terrestrial Radio Access Network (E-UTRAN); X2 Application Protocol (X2AP) (3GPP TS 36.423 version 11.3.0 Release 11)," ETSI, European Telecommunications Standards Institute 2012, 650 Route des Lucioles, F-06921 Sophia Antipolis Cedex—France, Jan. 2013; 143 pages.
"Received signal strength indication," Wikipedia, the free encyclopedia, Dec. 22, 2014; 2 pages.
Chauhan, Himanshu, "UE Measurements and Reporting in UMTS," Wireless Technologies, Blog dated Apr. 26, 2013; 3 pages http://worldtechieumts.blogspot.com/2013/04/ue-measurements-and-reporting-in-umts.html.
Ghaffar, Rizwan, et al., "Fractional Frequency Reuse and Interference Suppression for OFDMA Networks," published in "WiOpt" 10: Modeling and Optimization in Mobile, Ad Hoc, and Wireless Networks (2010), Jul. 19, 2010, 5 pages.
La Rocca, Maurizio, "RSRP and RSRQ Measurement in LTE," laroccasolutions Technology & Services, Feb. 2, 2015; 9 pages http://www.laroccasolutions.com/training/78-rsrp-and-rsrq-measurement-in-lte.
Madan, Ritesh, et al., "Fast Algorithms for Resource Allocation in Wireless Cellular Networks," IEEE/ACM Transactions on Networking, vol. 18, No. 3, Jun. 2010; 12 pages.
Park, Jeongho, et al., "Interference Level Control in Mobile WiMAX Uplink System," 2009 IEEE Mobile WiMAX Symposium, Jul. 9-10, 2009; 5 pages.
Rengarajan, Balaji, "A Semi-autonomous Algorithm for Self-organizing Dynamic Fractional Frequency Reuse on the Uplink of OFDMA Systems," Dec. 14, 2009; 22 pages.
Ruby, Ruksana, et al., "Uplink Scheduling Solution for Enhancing Throughput and Fairness in Relayed Long-Term Evoluation Networks," IET Communications 2014, vol. 8, Issue 6, Apr. 2014; 13 pages.
Tayal, Nitin, "All About PDCCH and CCE Allocation," Tayal's Way to Learn LTE, Tutorial Blog dated May 2013, 14 pages http://nitintayal-lte-tutorials.blogspot.com/2013/05/all-about-pdcch-and-cce-allocation.html.
Thapa, Chandra, et al., "Comparative Evaluation of Fractional Frequency Reuse (FFR) and Traditional Frequency Reuse in 3GPP-LTE Downlink," International Journal of Mobile Netework Communications & Telematics (IJMNCT) vol. 2, No. 4, Aug. 2012; 8 pages.
Wang, Jiao, "Dynamic Centralized Interference Coordination in Femto Cell Network with QoS Provision," Latest Trends on Communications, Proceedings of the 18$^{th}$ International Conference on Communications (Part of CSCC '14), Jul. 17-21, 2014; 6 pages.
Xiong, Chao, "Enhanced ICIC for LTE-A HetNet," ZTE Corporation, LTE World Summit 2012, May 2012; 3 pages.
Zyren, Jim, "Overview of the 3GPP Long Term Evolution Physical Layer," White Paper, Freescale Semiconductor, Document Number: 3GPPEVOLUTIONWP; Jul. 2007; 27 pages.
U.S. Appl. No. 14/809,201, filed Jul. 25, 2015, entitled "System and Method to Facilitate Small Cell Uplink Power Control in a Network Environment," Inventors: Ritesh K. Madan, et al.
U.S. Appl. No. 14/833,519, filed Aug. 24, 2015, entitled "System and Method to Facilitate Small Cell Uplink Power Control in a Network Environment," Inventors: Ritesh K. Madan, et al.
U.S. Appl. No. 14/845,995, filed Sep. 4, 2015, entitled "Method and System for Dynamic Allocation of Resources in a Cellular Network," Inventors: Vladimir Yanover, et al.
U.S. Appl. No. 14/686,598, filed Apr. 14, 2015, entitled "System and Method for Providing Uplink Inter Cell Interference Coordination in a Network Environment," Inventors: Ritesh K. Madan, et al.
U.S. Appl. No. 14/479,343, filed Sep. 7, 2014, entitled "Operation of Base Station in a Celllular Communication Network, " Inventor: Simon Burley.
U.S. Appl. No. 14/818,084, filed Aug. 4, 2015 entitled "Resource Adaptation for Frequency Domain Downlink Inter-Cell Interference Coordination," Inventors: Ritesh K. Madan et al.
U.S. Appl. No. 14/848,026, filed Sep. 8, 2015 entitled "Serving Noise/Macro Interference Limited User Equipment for Downlink Inter-Cell Interference Coordination," Inventors: Ritesh K. Madan et al.
U.S. Appl. No. 14/811,580, filed Jul. 28, 2015 entitled "Determining Fractional Frequency Reuse Power Levels for Downlink Transmissions," Inventor: Ritesh K. Madan.
U.S. Appl. No. 14/816,957, filed Aug. 3, 2015 entitled "Selecting Cells for Downlink Inter-Cell Interference Coordination," Inventors: Rohit U. Nabar et al.
U.S. Appl. no. 14/816,990, filed Aug. 3, 2015 entitled "User Equipment Power Level Selection for Downlink Transmissions," Inventors: Vikram Chandrasekhar et al.
U.S. Appl. No. 14/679,868, filed Apr. 6, 2015, entitled "System and Method for Managing Interference in a Network Environment Based on User Presence," Inventors: Mark Grayson, et al.
U.S. Appl. No. 14/687,198, filed Apr. 15, 2015, entitled "System and Method for Managing Interference in a Network Environment Based on User Presence," Inventors: Mark Grayson, et al.
U.S. Appl. No. 14/918,420, filed Oct. 20, 2015, entitled "System and Method for Frequency and Time Domain Downlink Inter-Cell Interference Coordination," Inventors: Ritesh K. Madan, et al.
U.S. Appl. No. 14/951,987, filed Nov. 25, 2015, entitled "System and Method for Frequency and Time Domain Downlink Inter-Cell Interference Coordination," Inventors: Ritesh K. Madan, et al.
U.S. Appl. No. 14/803,475, filed Jul. 20, 2015, entitled "System and Method for Decoupling Long Term Evolution Media Access Control Scheduling from Subframe Rate Procedures," Inventors: Oliver James Bull et al.
U.S. Appl. No. 14/852,210, filed Sep. 11, 2015, entitled "System and Method for Providing Dynamic Radio Access Network Orchestration," Inventors: Virginia Rosa de Sousa Teixeira, et al.
U.S. Appl. No. 14/961,552, filed Dec. 7, 2015, entitled "System and Method to Provide Uplink Interference Coordination in a Network Environment," Inventor: Ritesh K. Madan.
U.S. Appl. No. 14/993,859, filed Jan. 12, 2016, entitled "System and Method to Facilitate Centralized Radio Resource Management in a Split Radio Access Network Environment," Inventor: Ritesh K. Madan.
EPO Nov. 21, 2016 Extended Search Report and Written Opinion from European Application Serial No. 16180195.6; 9 pages.
Liu, Jianquo, et al., "Uplink Power Control and Interference Foordination for Heterogeneous Network," 2012 IEEE 23rd International Symposium on Personal, Indoor and mobile Radio Communications, Sydney, Australia, Sep. 9-12, 2012; 5 pages.
U.S. Appl. No. 15/374,903, filed Dec. 9, 2016, entitled "Power Management in a Cellular System," Inventors: Alan James Auchmuty Carter, et al.

(56) References Cited

OTHER PUBLICATIONS

U.S. Appl. No. 15/335,931, filed Oct. 27, 2016, entitled "Power Setting," Inventor: Pankaj Uplenchwar, et al.
Qualcomm Incorporated: "Introduction of enhanced ICIC", 3GPP Draft; R2-106246, 3rd Generation Partnership Project (3GPP), Mobile Competence Center; 650, Route Des Lucioles; F-06921 Sophia-Antipolis Cedex; France, vol. RAN WG2, no. Jacksonville, USA; Nov. 15, 2010, Nov. 9, 2010 (Nov. 9, 2010), XP050492195, [retrieved on Nov. 9, 2010] Section 16.X.2, 5 pages.
"3GPP TS 36.300 V9.7.0 (Mar. 2011) Technical Specification: $3^{rd}$ Generation Partnership Project; Technical Specification Group Radio Access Network; Evolved Universal Terrestrial Radio access (E-UTRA) and Evolved Universal Terrestrial Radio Access Network (E-UTRAN); Overall description; Stage 2 (Release 9)," 3GPP, 650 Route des Lucioles—Sophia Antipolis Valbonne—France, Mar. 2011; 173 pages.
U.S. Appl. No. 15/089,252, filed Apr. 1, 2016, entitled "Method and System for Dynamic Allocation of Resources in a Cellular Network,".
U.S. Appl. No. 14/801,381, filed Jul. 16, 2015, entitled "System and Method to Manage Network Utilization According to Wireless Backhaul and Radio Access Network Conditions," Inventor: Ishwardutt Parulkar.
U.S. Appl. No. 15/251,471, filed Aug. 30, 2016, entitled "Method and Apparatus for Reducing Inter-Cell Interference," Inventor: Ziv Nuss, et al.
IPO Mar. 27, 2017 Intellectual Property Office Combined Search and Examination Report under Sections 17 and 18(3) from Application No. GB1703805.0; 5 pages.
PRC Apr. 7, 2017 SIPO First Office Action from Chinese Application No. 201280058324.X; 14 pages (English translation only).
U.S. Appl. No. 15/626,110, filed Jun. 17, 2017, entitled "System and Method to Facilitate Small Cell Uplink Power Control in a Network Environment," Inventors: Ritesh K. Madan, et al.
U.S. Appl. No. 15/630,696, filed Jun. 22, 2017, entitled System and Method to Provide Uplink Interference Coordination in a Network Environment, Inventor: Ritesh K. Madan, et al.

\* cited by examiner

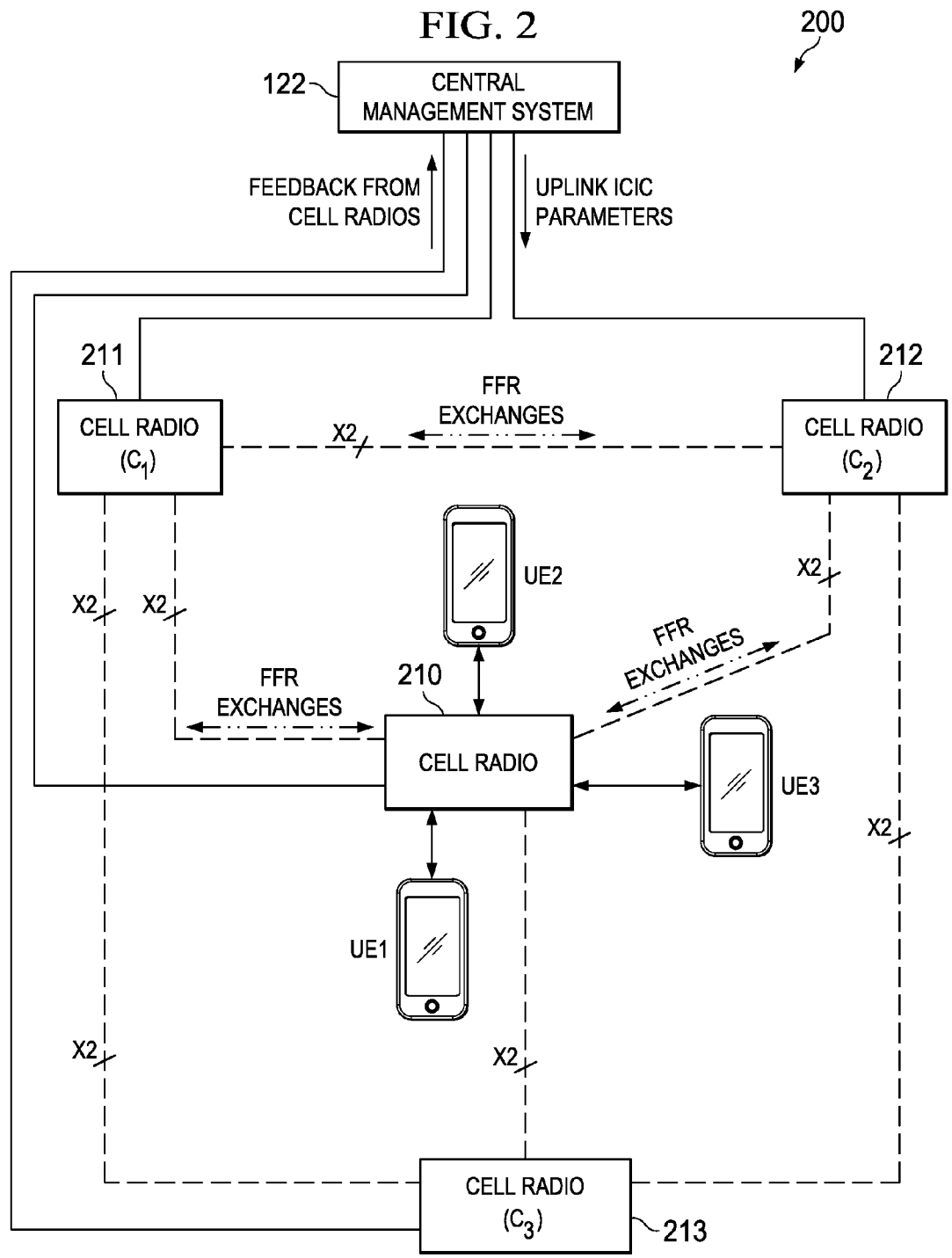

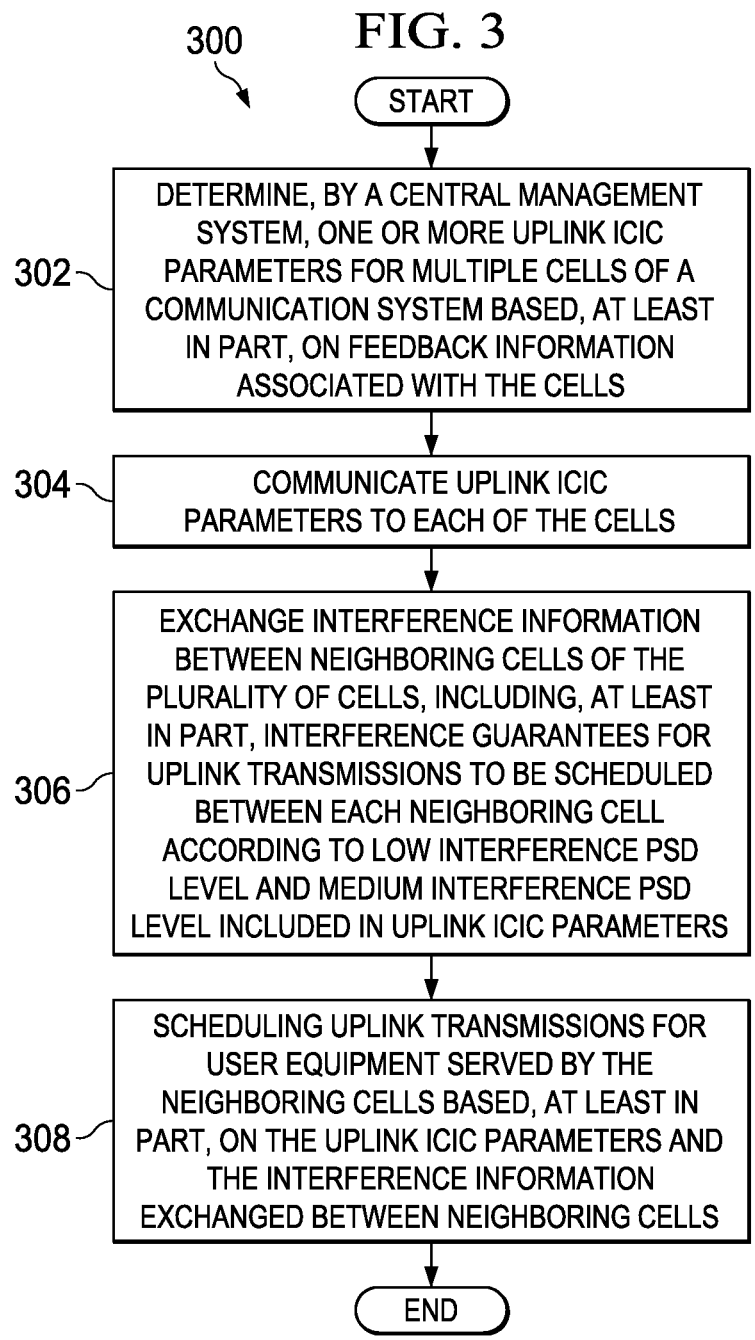

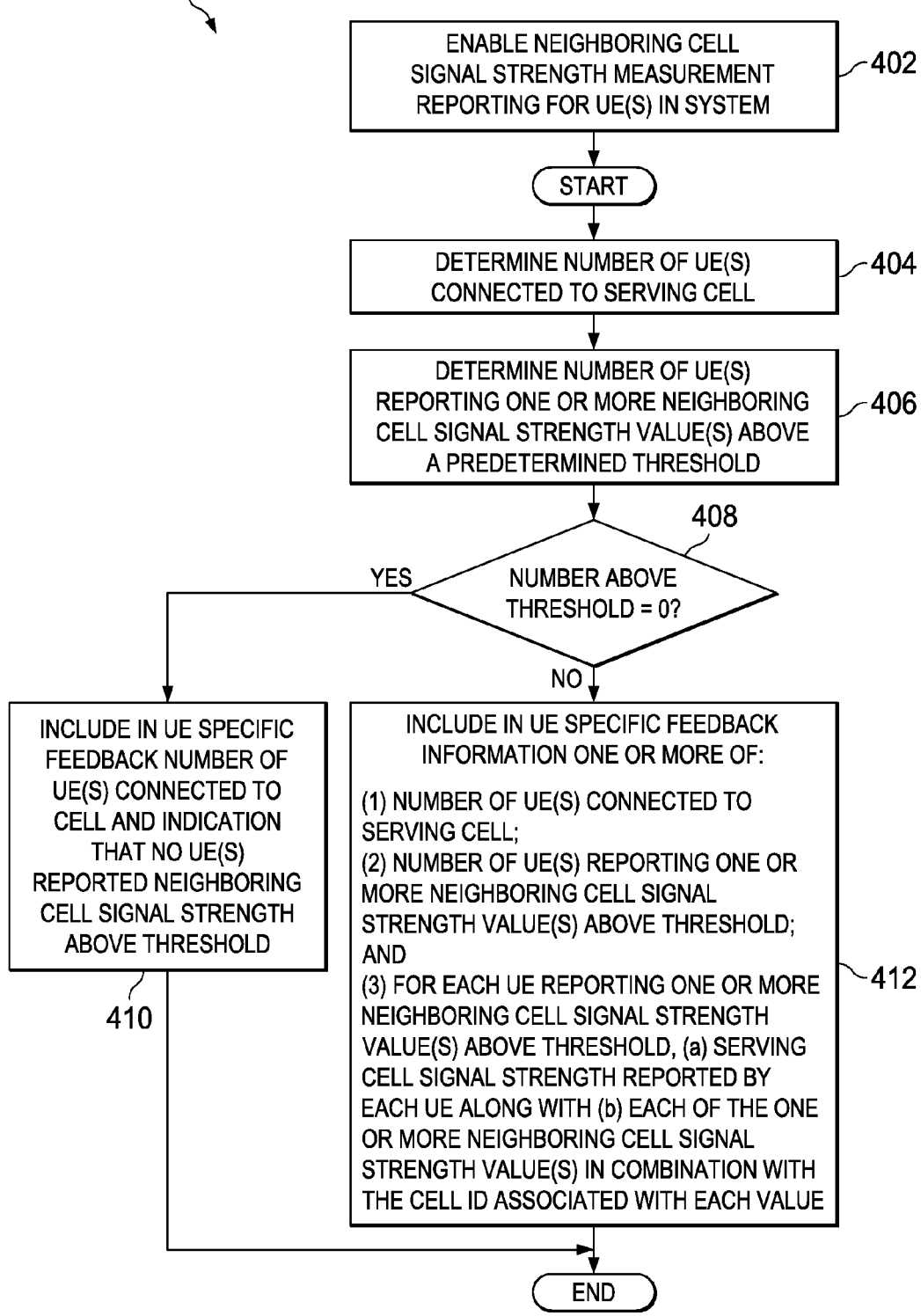

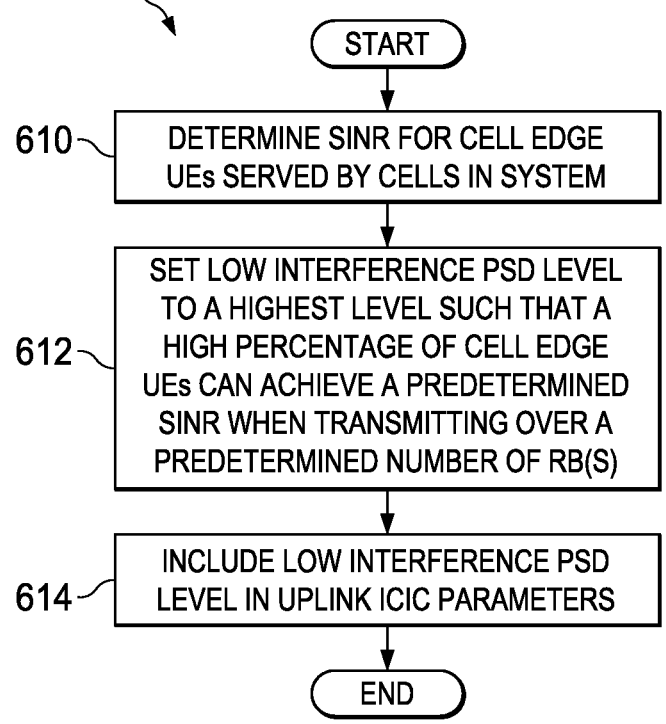

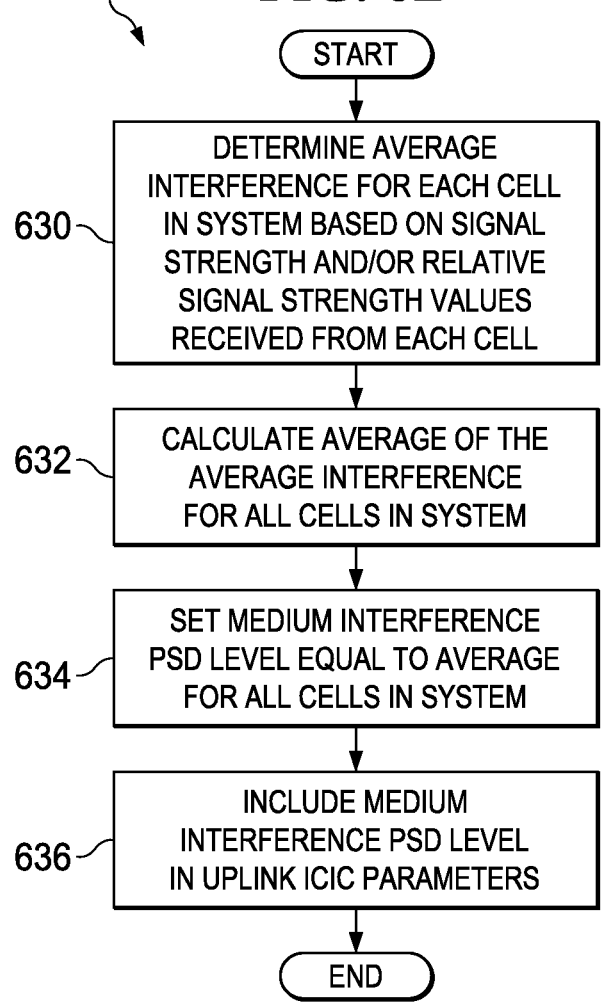

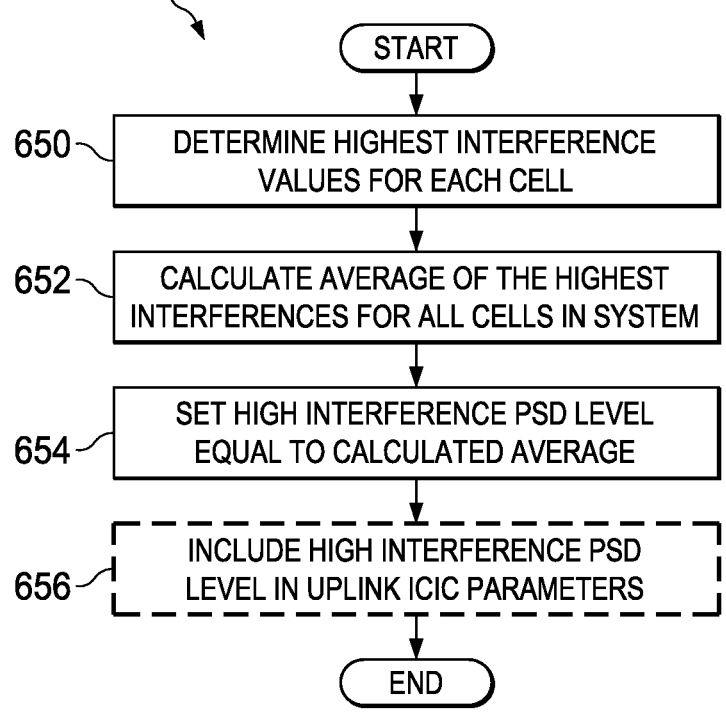

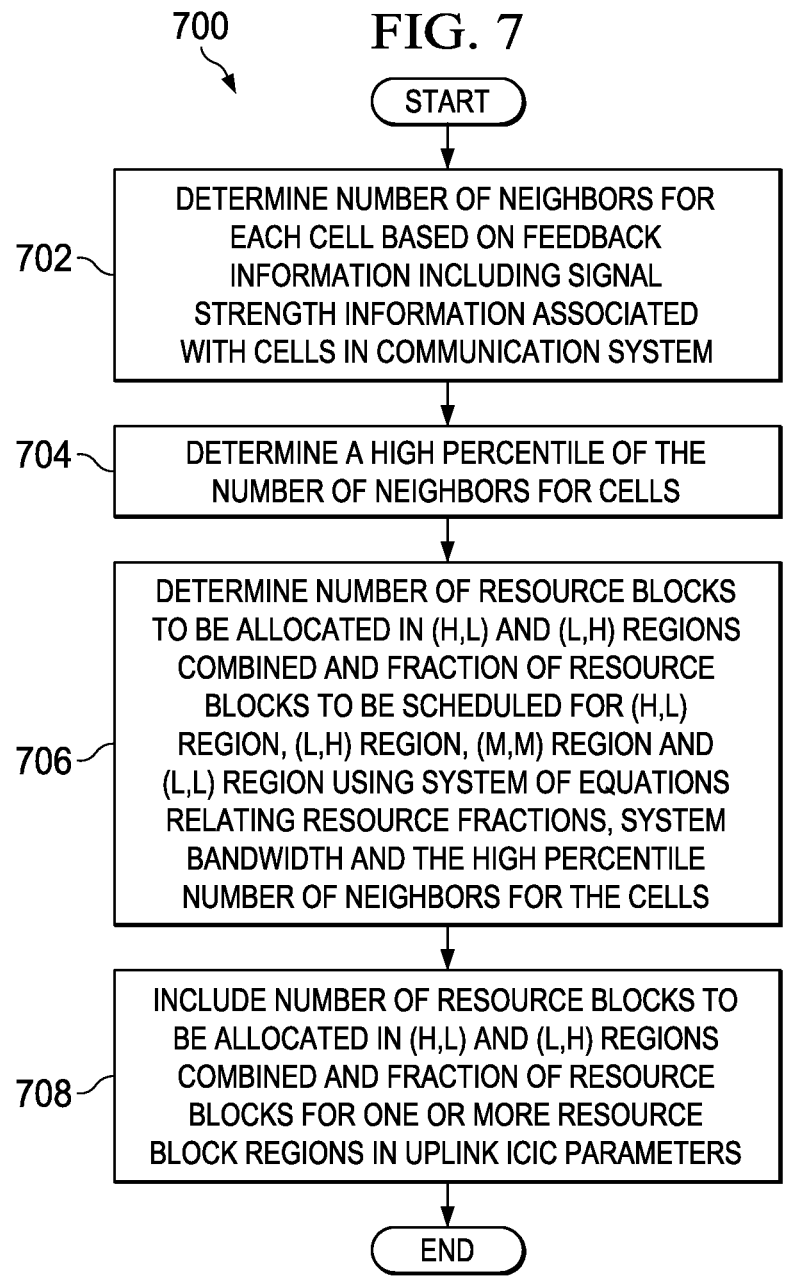

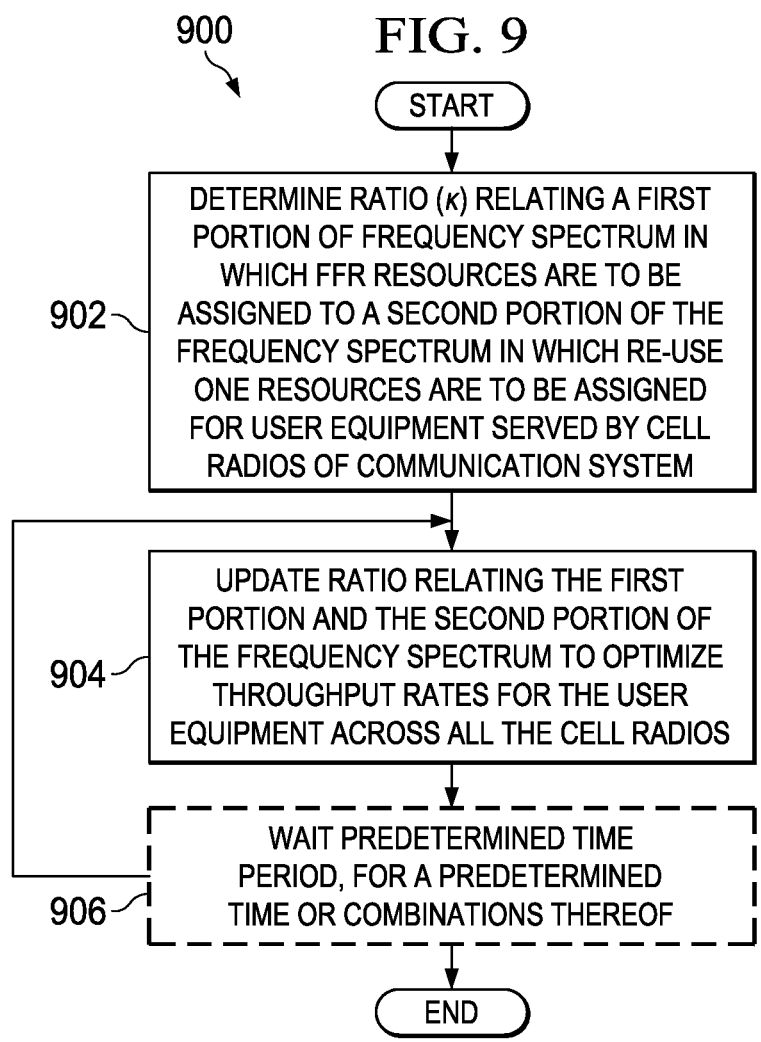

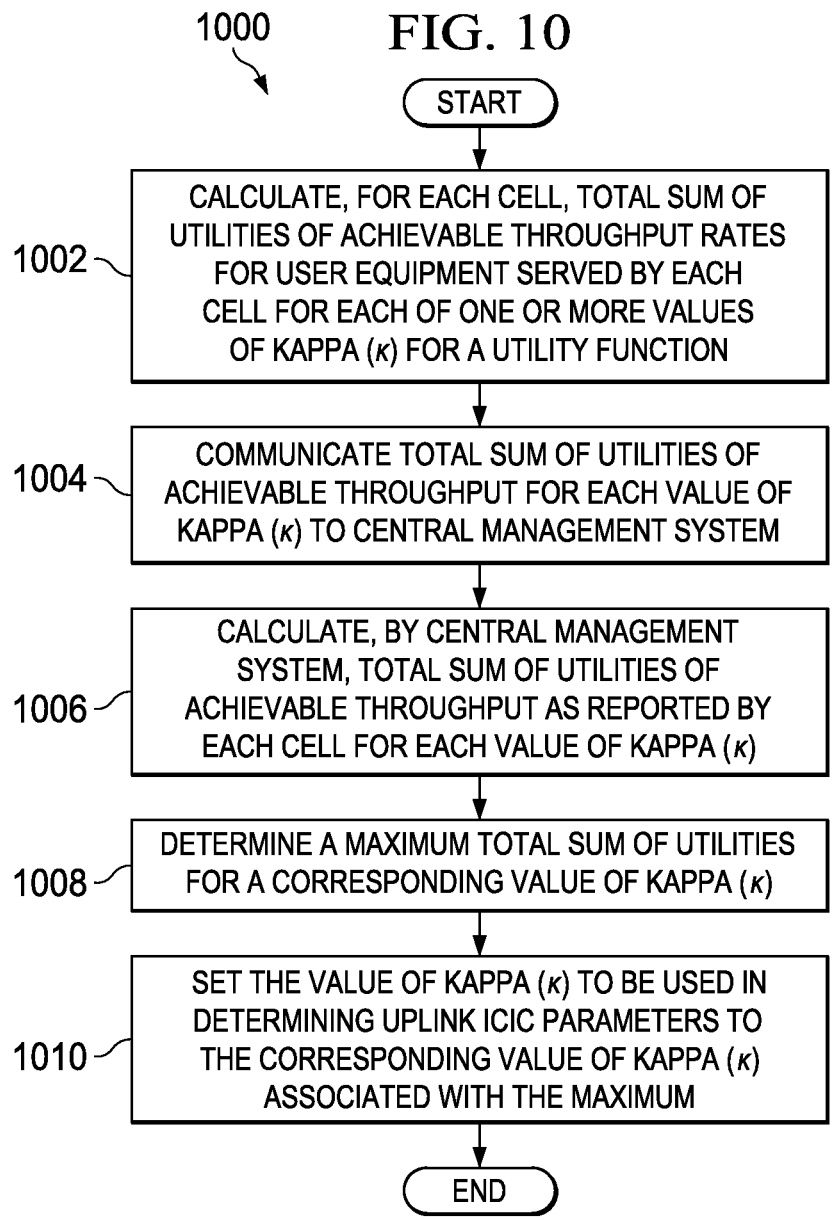

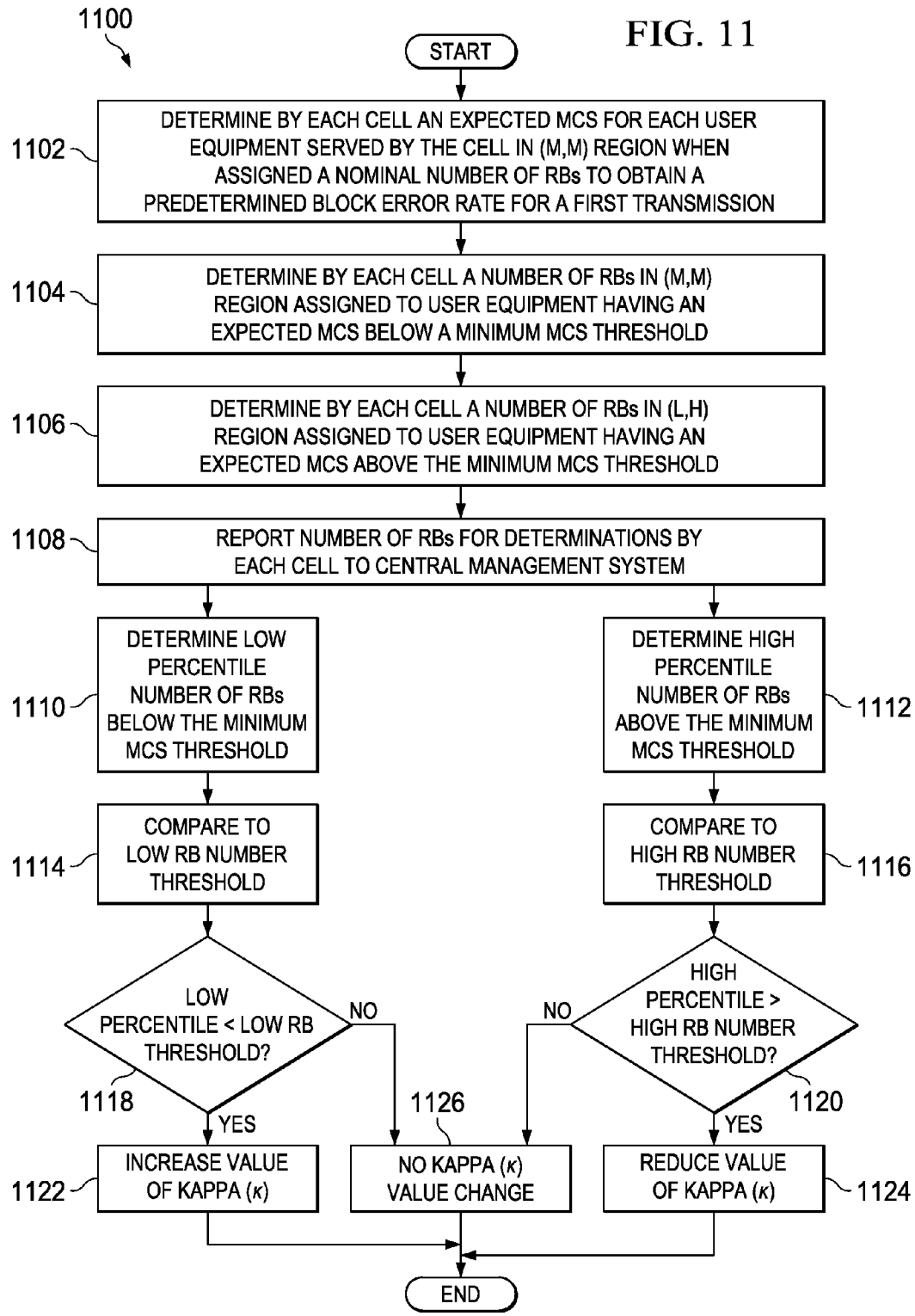

SYSTEM AND METHOD FOR PROVIDING UPLINK INTER CELL INTERFERENCE COORDINATION IN A NETWORK ENVIRONMENT

RELATED APPLICATION

This application is a continuation (and claims the benefit of priority under 35 U.S.C. §120) of U.S. application Ser. No. 14/686,598, filed Apr. 14, 2015, entitled "SYSTEM AND METHOD FOR PROVIDING UPLINK INTER CELL INTERFERENCE COORDINATION IN A NETWORK ENVIRONMENT," Inventors Ritesh K. Madan, et al. The disclosure of the prior application is considered part of (and is incorporated in its entirety by reference in) the disclosure of this application.

TECHNICAL FIELD

This disclosure relates in general to the field of communications and, more particularly, to a system and method for providing uplink (UL) inter cell interference coordination (ICIC) in a network environment.

BACKGROUND

Networking architectures have grown increasingly complex in communications environments, particularly mobile wireless environments. Mobile communication networks have grown substantially in subscriber base as end users become increasingly connected to mobile wireless environments. As the number of mobile subscribers increases, efficient management of communication resources becomes more critical. In some instances, resources are allocated for uplink transmission by user equipment served by a particular cell radio. Uplink transmissions are typically scheduled for user equipment served by the particular cell radio. As the number of user equipment (e.g., the number of subscribers) increases, the possibility of inter cell interference also increases, which can lead to inefficient performance of the user equipment and for the network. Accordingly, there are significant challenges in providing uplink ICIC for mobile communication networks, particularly with respect to small cell networks, which often include multiple small cell radios provided in close proximity to each other.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2 is a simplified block diagram illustrating an example use case of cell radios associated with the communication system in accordance with one potential embodiment of the present disclosure;

FIG. 3 is a simplified flow diagram illustrating example operations associated with providing uplink ICIC in a network environment in accordance with one potential embodiment of the communication system;

FIG. 4 is a simplified flow diagram illustrating example operations associated with determining user equipment specific feedback for uplink ICIC in accordance with one potential embodiment of the communication system;

FIGS. 6A-6C are simplified flow diagrams illustrating example operations associated with setting interference power spectral density (PSD) levels for interference mitigation in accordance with one potential embodiment of the communication system;

FIG. 7 is a simplified flow diagram illustrating example operations associated with determining one or more uplink ICIC parameters that can be used to provide uplink ICIC in accordance with one potential embodiment of the communication system;

FIG. 9 is a simplified flow diagram illustrating example operations associated with providing resource adaptation for interference mitigation in accordance with one potential embodiment of the communication system;

FIG. 10 is a flow diagram illustrating other example operations associated with providing resource adaptation for interference mitigation in accordance with one potential embodiment of the communication system;

FIG. 11 is a flow diagram illustrating yet other example operations associated with providing resource adaptation for interference mitigation in accordance with one potential embodiment of the communication system.

DETAILED DESCRIPTION OF EXAMPLE EMBODIMENTS

Overview

Figure 1A:
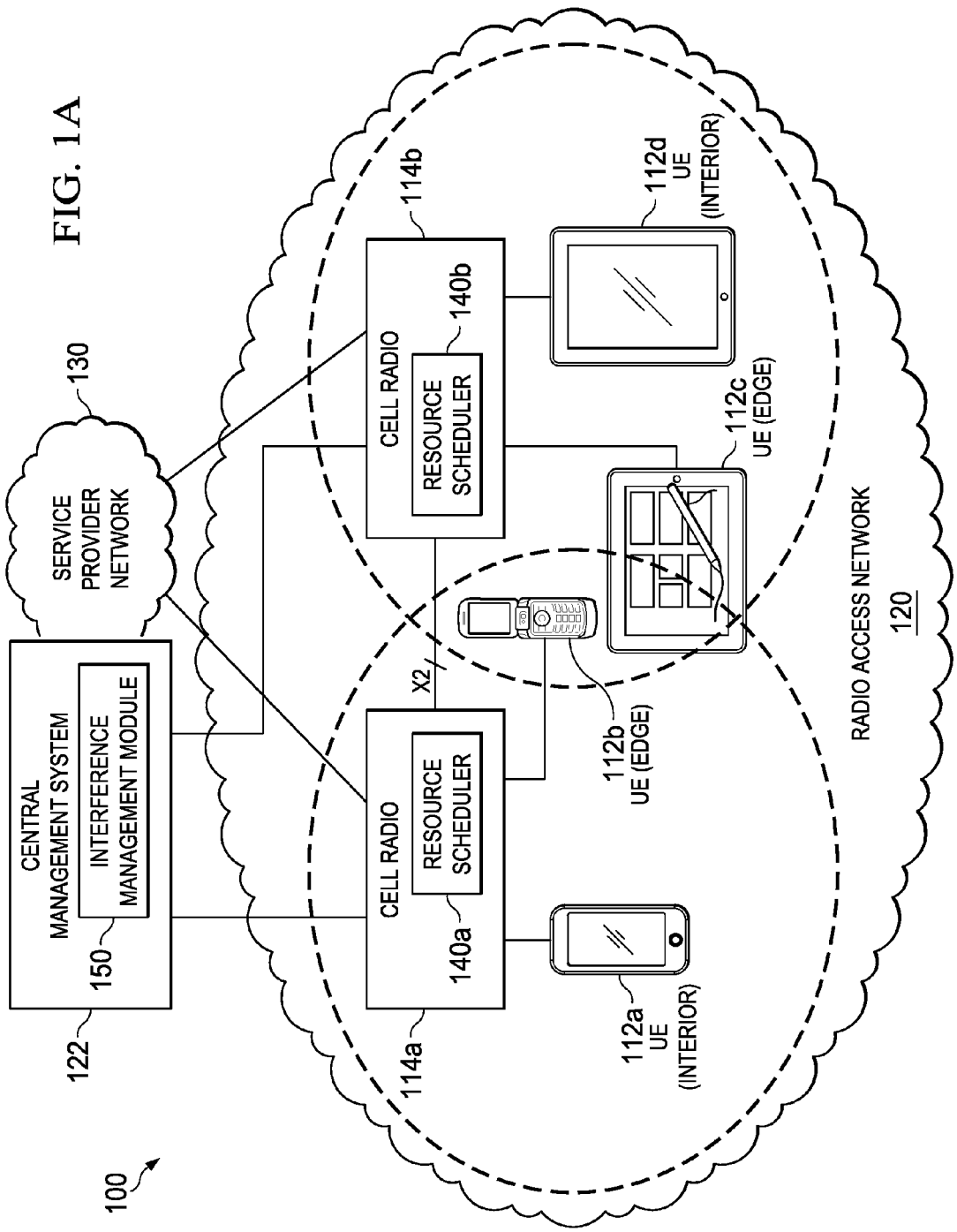
FIG. 1A is a simplified block diagram illustrating a communication system to facilitate providing uplink ICIC in a network environment according to one embodiment of the present disclosure.

A method is provided in one example embodiment and may include determining by a central management entity one or more uplink inter cell interference coordination (ICIC) parameters for a plurality of cells based, at least in part, on feedback information associated with the plurality of cells, wherein the feedback information is associated, at least in part, with signal strength information associated with the plurality of cells and wherein the uplink ICIC parameters include, at least in part, a low interference power spectral density (PSD) level and a medium interference PSD level; communicating the uplink ICIC parameters to each of the plurality of cells; exchanging interference information between neighboring cells of the plurality of cells wherein the interference information includes, at least in part, interference guarantees for certain transmissions between each neighboring cell of the plurality of cells based on the low interference PSD level and the medium interference PSD level; and scheduling uplink transmissions for user equipment served by the neighboring cells based, at least in part, on the uplink ICIC parameters and the interference information exchanged between neighboring cells. In some instances, the uplink transmissions can be scheduled in at least one of a re-use one portion and a fractional frequency re-use (FFR) portion of a frequency spectrum available for the uplink transmissions.

In some instances, determining the one or more uplink ICIC parameters can further include setting the low interference PSD level, wherein the low interference PSD level is set to allow a certain percentage of cell edge user equipment served by each of the neighboring cells to achieve a Signal-to-Interference-plus-Noise Ratio of approximately 7 decibels (dB). In other instances, determining the one or more uplink ICIC parameters can additionally include setting the medium interference PSD level, wherein the medium interference PSD level is based on an average interference level determined for the plurality of cells for all user equipment served by each of the plurality of cells.

In yet other instances, determining the one or more uplink ICIC parameters can additionally include determining a number of neighboring cells for each of the plurality of cells based, at least in part, on the signal strength information, wherein one or more cells are determined to be neighboring another cell if their signal strength is above a certain threshold; determining a number of resources for uplink transmissions for the FFR portion of the frequency spectrum, wherein the number of resources for the uplink transmissions for the FFR portion of the frequency spectrum is inversely proportional to the number of neighboring cells for each of the plurality of cells; and determining fractions of total resources for uplink transmissions for resource block regions of the re-use one portion and the FFR portion of the frequency spectrum.

In some cases, exchanging interference information between neighboring cells can include distributing High Interference Information (HII) messages over X2 interfaces between neighboring cells to coordinate high interference resource block (RB) guarantees and low interference RB guarantees for the FFR portion of the frequency spectrum based, at least in part, on the number of resources determined for uplink transmission for the FFR portion, the fractions of total resources for uplink transmissions, the low interference PSD level and the medium interference PSD level.

In some cases, the signal strength information can include Reference Signal Received Power (RSRP) information and the method can include receiving by a particular cell of the plurality of cells RSRP information from each of a plurality of user equipment (UE) served by the particular cell, wherein the RSRP information received from each UE includes, at least in part, a serving cell RSRP value for the particular cell and one or more neighboring cell RSRP values for one or more neighboring cells of the particular cell. In some instances, the method can further include determining a number of UEs connected to the particular cell; determining a number of UEs for which one or more neighboring cell RSRP values are above an RSRP threshold; and including in the feedback information: the number of UEs connected to the particular cell; the number of UEs having one or more neighboring cell RSRP values above the RSRP threshold; the serving cell RSRP value for each of the number of UEs having one or more neighboring cell RSRP values above the RSRP threshold; and a cell identifier and a corresponding RSRP value for each of the one or neighboring cell RSRP values above the RSRP threshold. In other instances, the method can include determining one or more relative interference values for each of one or more neighboring cells of the particular cell for each of one or more UEs connected to the particular cell, wherein the each relative interference value is based on the serving cell RSRP value and a neighboring cell RSRP value for each of the one or more neighboring cells as received from each of the one or more UEs; determining whether each relative interference value is above a relative interference threshold; ordering each relative interference value that is above the relative interference threshold in a predetermined order; determining a highest relative interference value for each of the one or more neighboring cells that is above the relative interference threshold; and including in the feedback information the highest relative interference value and a cell identifier for each of the one or more neighboring cells that is above the relative interference threshold according to the predetermined order.

Another method is provided in another example embodiment and may include determining a ratio relating a first portion of a frequency spectrum in which fractional frequency re-use (FFR) resources are to be assigned to a second portion of the frequency spectrum in which re-use one resources are to be assigned, wherein the FFR resources and the re-use one resources are associated with uplink transmissions for a plurality of user equipment across a plurality of cells in a communication system; and updating the ratio relating the first portion and the second portion of the frequency spectrum to optimize throughput rates for the plurality of user equipment across the plurality of cells. In some cases, at least one of determining the ratio or updating the ratio can include maximizing a total sum of utilities of throughput rates for the user equipment across the plurality of cells for a utility function to determine an optimum value for the ratio based, at least in part, on one or more interference power spectral density (PSD) levels associated with neighboring cells of the plurality of cells and wherein the total sum of utilities of throughput rates for the user equipment can vary based, at least in part, a plurality of temporary values of the ratio. In various instances, the utility function can be associated with a total sum of a logarithmic function (LOG) of average throughput rates for the user equipment; a total sum of a weighted exponential function of average throughput rates for the user equipment; or a total sum of average throughput rates for the user equipment.

In some instances, maximizing the total sum of utilities as a function of throughput rates for the user equipment can further include: calculating, by each cell of the plurality of cells, a per cell total sum of utilities for achievable throughput rates for a plurality of user equipment served by each cell for each the plurality of temporary values of the ratio; communicating, by each cell of the plurality of cells, the per cell total sum of utilities for achievable throughput rates to a central management system for each of the plurality of temporary values of the ratio; calculating a total sum of utilities across the plurality of cells based on the per cell total sum of utilities for each of the plurality of temporary values of the ratio; determining, by the central management system, a maximum total sum of utilities and a particular temporary value of the ratio associated with the maximum total sum of utilities; and setting the ratio equal to the particular temporary value of the ratio associated with the maximum total sum of utilities.

In some instances, calculating the per cell total sum of utilities for achievable throughput rates for the plurality of user equipment served by a particular cell can further include: calculating a weighted sum of throughput rates achievable for each user equipment served by the particular cell in relation to a number of resource blocks that can be allocated in a plurality of resource block regions of the frequency spectrum and wherein the number of resource blocks that can be allocated in one or more of the resource block regions is varied according to each of the plurality of temporary values of the ratio; and accumulating weighted sums of throughput rates achievable for all user equipment served by the particular cell according to each of the plurality of temporary values of the ratio to determine a total sum of utility of throughput rates for all user equipment served by the cell for each of the plurality of temporary values of the ratio.

In some cases, updating the ratio can further include: determining, by each cell of the plurality of cells, a first modulation and coding scheme (MSC) for each of a plurality of user equipment served by each cell in a first resource block region of the frequency spectrum. In some cases, the updating can further include determining, by each cell of the plurality of cells, a first number of resource blocks in the first resource block region assigned to user equipment that have a corresponding first MCS below a predetermined MCS threshold; and determining, by each cell of the plurality of cells, a second number of resource blocks in a second resource block region assigned to user equipment that have a corresponding first MCS above the predetermined MCS threshold. In still other cases, updating the ratio can additionally include communicating, by each cell of the plurality of cells, the first number of resource blocks and the second number of resource blocks to a central management system; increasing the ratio if a low percentile of the first number of resource blocks communicated by each of the plurality of cells is below a first predetermined resource block threshold; and reducing the ratio if a high percentile of the second number of resource blocks communicated by each of the plurality of cells is above a second predetermined resource block threshold. In some instances, the predetermined MCS threshold is associated with a predetermined signal-to-interference-noise ratio (SINR) associated with interference between neighboring cells of the plurality of cells in the communication system.

EXAMPLE EMBODIMENTS

Figure 1B:
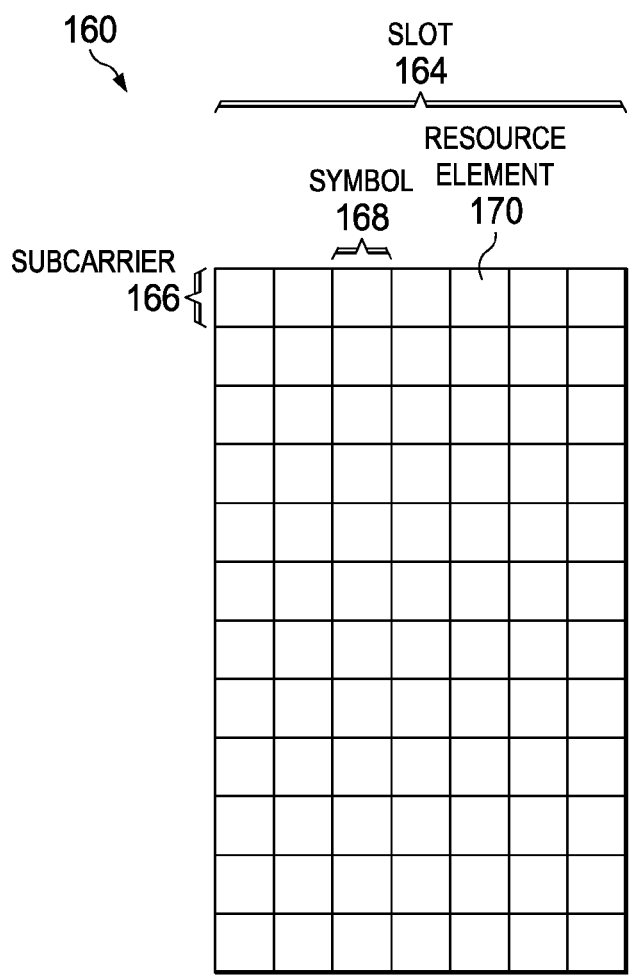
FIG. 1B is a simplified schematic diagram illustrating example details associated with an example resource block that can be associated with uplink transmissions in accordance with one potential embodiment of the communication system.
Figure 1C:
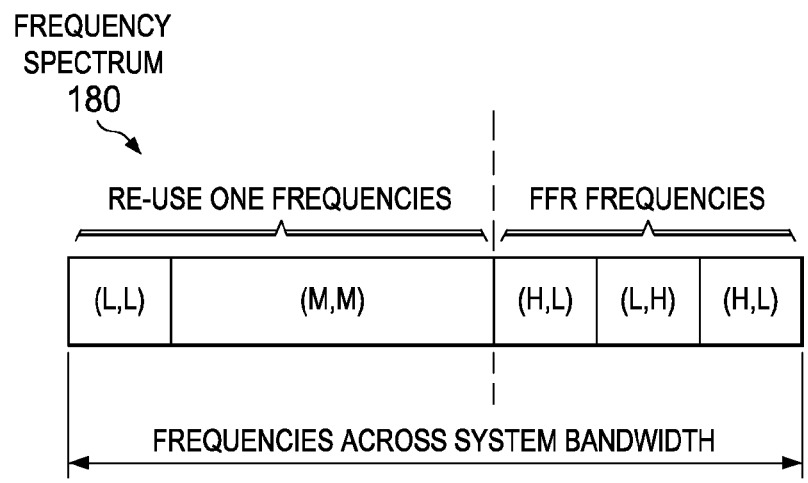
FIG. 1C is a simplified schematic diagram illustrating example details associated with an example frequency spectrum that can be associated with the communication system in accordance with one potential embodiment of the communication system.

Turning to FIG. 1A, FIG. 1A is a simplified block diagram illustrating a communication system 100 to facilitate providing uplink (UL) inter cell interference coordination (ICIC) in a network environment according to one embodiment of the present disclosure. This particular configuration may be tied to the 3rd Generation Partnership Project (3GPP) Evolved Packet System (EPS) architecture, also sometimes referred to as the Long Term Evolution (LTE) EPS architecture. Alternatively, the depicted architecture may be applicable to other environments equally. The example architecture of FIG. 1A can include users operating user equipment (UE) 112a-112d, one or more cell radio(s) 114a-114b, a radio access network (RAN) 120, a central management system 122 and a service provider network 130. As shown in FIG. 1A, each respective cell radio 114a, 114b can include a respective resource scheduler 140a, 140b and central management system 122 can include an interference management module 150. FIGS. 1B-1C are schematic diagrams illustrating various example details that can be associated with communication system 100 and will be discussed in conjunction with FIG. 1A.

Each cell radio 114a-114b can be associated with a corresponding coverage area, as indicated by the dashed-line circle surrounding each cell radio 114a-114b. It should be understood that the coverage areas shown in FIG. 1A are provided for illustrative purposes only, and are not meant to limit the broad scope of the teachings of the present disclosure. Any other coverage areas can be provided for cell radios within the scope of the present disclosure.

In various embodiments, UE 112a-112d can be associated with users, employees, clients, customers, etc. wishing to initiate a flow in communication system 100 via some network. The terms 'user equipment', 'mobile node', 'end user', 'user', and 'subscriber' are inclusive of devices used to initiate a communication, such as a computer, a personal digital assistant (PDA), a laptop or electronic notebook, a cellular telephone, an i-Phone™, iPad™, a Google Droid™ phone, an IP phone, or any other device, component, element, or object capable of initiating voice, audio, video, media, or data exchanges within communication system 100. UE 112a-112d may also be inclusive of a suitable interface to a human user such as a microphone, a display, a keyboard, or other terminal equipment.

UE 112a-112d may also be any device that seeks to initiate a communication on behalf of another entity or element such as a program, a database, or any other component, device, element, or object capable of initiating an exchange within communication system 100. Data, as used herein in this document, refers to any type of numeric, voice, video, media, or script data, or any type of source or object code, or any other suitable information in any appropriate format that may be communicated from one point to another. In certain embodiments, UE 112a-112d may have a bundled subscription for network access and application services (e.g., voice), etc. Once the access session is established, the user can register for application services as well, without additional authentication requirements. UE IP addresses can be assigned using dynamic host configuration protocol (DHCP), Stateless Address Auto-configuration, default bearer activation, etc., or any suitable variation thereof. In various embodiments, each UE 112a-112d can include one or transmitters and/or receivers (e.g., transceivers) and one or more antenna(s) to facilitate over the air communications with one or more cell radios 114a-114b.

For FIG. 1A, cell radios 114a-114b are logically connected to service provider network 130 and can also be logically connected to adjacent cell radios via an X2 interface, as defined in 3GPP standards. In various embodiments, interfaces (e.g., the X2 interface) and/or a series of interfaces can be provided in communication system 100, which can offer mobility, policy control, interference mitigation functions, etc. for various elements of communication system 100. For example, interfaces can be used to exchange point of attachment, location, and/or access data for one or more end users, for example, users operating UE 112a-112d. In various embodiments, resource information, accounting information, location information, access network information, network address translation (NAT) control, etc. can be exchanged using a remote authentication dial in user service (RADIUS) protocol or any other suitable protocol where appropriate. Other protocols that can be used in communication system 100 can include DIAMETER protocol, service gateway interface (SGi), terminal access controller access-control system (TACACS), TACACS+, etc. to facilitate communications.

In various embodiments, cell radios 114a-114b can be deployed as evolved Node Bs (eNodeBs), which can provide cellular/mobile coverage for a macro cell network, or can be deployed as home eNodeBs (HeNBs), which can provide cellular/mobile coverage for a small cell network. In various embodiments, for example, in a macro cell network deployment, cell radios 114a-114b can be responsible for selecting a Mobility Management Entity (MME) within service provider network 130 for session establishment for each UE 112a-112d served by a corresponding cell radio, for managing radio resources for each UE 112a-112d, and making handover decisions for UEs, for example, handover to other cell radios (e.g., eNodeBs and/or HeNBs). In certain embodiments, for example, in a small cell network deployment, cell radios 114a-114b (e.g., deployed as HeNBs) can interface with service provider network 130 via one or more small cell gateways (not shown), which can be used to aggregate and/or manage sessions for UE connected to the small cell network as well as managing configurations of cell radios 114a-114b. In various embodiments, each cell radio 114a-114b can include one or transmitters and/or receivers (e.g., transceivers) and one or more antenna(s) to facilitate over the air communications with one or more UE 112a-112d.

In various embodiments, each cell radio 114a-114b may manage scheduling for uplink radio resources for uplink transmissions for each corresponding UE 112a-112d that the cell radios respectively serve via each respective resource scheduler 140a-140b. Uplink radio resources can be distinguished from downlink resources, as uplink resources may be those resources transmitted by over an air interface a particular UE (e.g., using one or more combinations of transmitters and/or antenna(s)) to be received by its serving cell radio (e.g., using one or more combinations of receivers and/or antenna(s)) whereas downlink resources may be those resources transmitted over an air interface by the serving cell radio (e.g., using one or more combinations of transmitters and/or antenna(s)) to be received by the particular UE (e.g., using one or more combinations of receivers and/or antenna(s)). For example, in certain embodiments, assuming UE 112a-112b are connected to and currently served by cell radio 114a, cell radio 114a, via resource scheduler 140a can schedule uplink resources for uplink transmissions that can be performed by UE 112a-112b. In turn, UE 112a-112b can perform uplink transmissions as scheduled by cell radio 114a. Typically, uplink transmissions are scheduled via uplink grants that can be communicated by a serving cell radio to a corresponding UE. Similar uplink transmissions can be scheduled for UE 112c-112d by cell radio 114b via resource scheduler 140b, assuming UE 112c-112d are connected to and served by cell radio 114b. Note the terms 'cell radio' and 'cell' can be used interchangeably herein in this Specification.

UEs 112a-112d are illustrated in FIG. 1A as being located in relative proximities within the coverage areas of their respective serving cells. For example, as shown in FIG. 1A, UE 112a can be considered an interior UE within the coverage area of cell radio 114a and UE 112b can be considered a cell edge UE within the coverage area of cell radio 114a. Similarly, UE 112d can be considered an interior UE within the coverage area of cell radio 114b and UE 112c can be considered a cell edge UE within the coverage area of cell radio 114b. The characterization of UEs 112a-112d is provided for illustrative purposes only and is not meant to limit the broad scope of the present disclosure. It should be understood that UEs can be distributed anywhere within the coverage areas of cell radios within the scope of the teachings of the present disclosure.

In various embodiments, determination of whether a given UE is a cell edge UE or a cell interior UE can be performed by the cell radio using, for example, the channel quality indicator (CQI) for the UE in the downlink, via the reference signal received quality (RSRQ) for the UE or by determining the received power for an uplink signal from the UE divided by the interference in the cell. In certain embodiments, a UE can be characterized as a cell edge UE if its CQI, RSRQ and/or uplink signal divided by interference is less than a predetermined threshold.

In certain embodiments, LTE architectures can support multi-user access using Orthogonal Frequency-Division Multiple Access (OFDMA), which is a multi-user version of the orthogonal frequency-division multiplexing (OFDM) digital modulation scheme. Multiple accesses are achieved in OFDMA by assigning subsets of subcarriers to individual users. OFDMA allows for simultaneous transmissions from several users served by a particular cell radio. In certain embodiments, LTE architectures can also support multi-user access using Single Carrier Frequency Division Multiple Access (SC-FDMA), which is similar to OFDMA, but includes additional precoding.

As a general notion, in LTE architectures, a given serving cell radio (e.g., cell radio 114a) can schedule uplink transmissions for a given UE (e.g., UE 112a) by scheduling physical resource blocks, generally referred to as resource blocks (RBs), that are to be transmitted by the UE according to one or more uplink grants, as noted above. For example, using one or more uplink grants, cell radio 114a can signal to the UE, when it can transmit uplink RBs or resources toward cell radio 114a. Uplink grants are typically communicated to the UE via a physical downlink control channel (PDCCH) maintained between the UE and the serving cell radio. Typically, the PDCCH can be used to communicate information related to information downlink (DL) grant(s), uplink (UL) grant(s), power control, system configuration, random access, paging, etc. for UE, as defined in 3GPP standards.

An RB, as defined in 3GPP technical specification (TS) 36.211, is typically represented by a number of resource elements, each of which can be allocated within a symbol, for each of a particular subcarrier (e.g., frequency) that can be associated with a particular UE. An RB can generally be referred to as a 'slot' spanning 0.5 milliseconds (msec) of a 1 msec subframe. Thus, there are typically two RBs in each 1 msec subframe. The smallest unit of an RB is a resource element, which represents one subcarrier by one symbol. Thus, a RB can be schematically represented as spanning a portion of frequencies of system bandwidth (e.g., depending on the number of subcarriers in the RB) across a span of time (e.g., 0.5 msec) for each symbol included in the RB. For 4G/LTE, the number of subcarriers for an RB is 12, each spanning a 15 kilohertz (15 KHz subcarrier bandwidth), thus each RB represents a 180 KHz portion of system bandwidth. As system bandwidth can vary, such as, for example, between 1.25 megahertz (MHz) and 20 MHz, the number of available RBs that can be scheduled or allocated across UEs can vary, respectively between 6 and 100. Typically, a 10 MHz bandwidth corresponds to 50 available RBs that can be allocated to UEs served by a particular cell. It should be understood that RBs can be uplink RBs or downlink RBs, depending on the device transmitting the RBs.

Referring to FIG. 1B, FIG. 1B is a simplified schematic diagram illustrating an example uplink RB 160 that can be used for uplink transmissions in accordance with one potential embodiment of the communication system. Uplink RB 160 can represents a 0.5 msec slot 164 of a 1 millisecond (msec) transmission time interval (TTI) for a number of symbols 168 spread across a number of subcarriers 166. In various embodiments, the number of subcarriers 166 is typically 12. In various embodiments, the number of symbols 168 can depend on the cyclic prefix type for uplink transmissions (e.g., 12 symbols for normal cyclic prefix or 14 for symbols for extended cyclic prefix). As noted, the smallest unit of a RB is a resource element, shown in FIG. 1B as resource element 170, which represents one subcarrier 166 by one symbol 168.

Returning to FIG. 1A, each resource element for each symbol of an RB can be represented using a number of bits, which can vary depending on modulation and coding scheme (MCS) selected for uplink transmissions for a given UE. In various embodiments, the MCS selected for uplink transmissions can be adjusted based on the uplink Signal-to-Interference-plus-Noise Ratio (SINR) for a given UE. For example, a higher SINR for a UE can result in a higher MCS being selected for the UE, which, in turn can provide for a higher throughput rate for the UE. As provided by 3GPP standards (e.g., TS 36.111), MCS for uplink transmissions can include Quadrature Phase Shift Keying (QPSK) and Quadrature Amplitude Modulation (QAM) including 16QAM, 64QAM and 256QAM with modulation order increasing from QPSK to 256QAM.

In various embodiments, SINR for a given UE (e.g., any of UE 112a-112d) can be determined based on Reference Signal Received Quality (RSRQ) as measured by the UE for the Evolved-Universal Terrestrial Radio Access (E-UTRA), the channel quality indicator (CQI) reported by the UE, relative Reference Signal Received Power (RSRP) and/or the received signal strength for an uplink transmission divided by the total interference in the cell. Typically, E-UTRA is described in reference to the air-interface for LTE radio access. As defined in 3GPP TS 36.214, RSRP is the linear average over the power contributions of resource elements (e.g., within RBs) that carry cell-specific reference signals (CRS) within a considered measurement frequency bandwidth. RSRQ is defined as the ratio of the number (N) of RBs of the E-UTRA carrier received signal strength indicator (RSSI) measurement bandwidth (e.g., system bandwidth) multiplied by the RSRP divided by the RSSI, generally expressed as 'N*RSRP/RSSI'. In general, UE can measure signal strength information such as, for example, RSRP and/or RSRQ for a serving cell and/or non-serving cells (e.g., neighboring cells), if enabled. In certain embodiments, RSRP and/or RSRQ measurements for neighboring cells be enabled for UE 112a-112d. As used herein the terms 'relative RSRP' and 'relative interference' can be used interchangeable and can refer to a serving cell RSRP as measured by a given UE subtracted from a neighboring cell RSRP as measured by the UE.

It should be noted that any UE signal strength information can be used within the scope of the present disclosure. In at least one embodiment, for example, for a 3G deployment, signal strength information can include Common Pilot Channel (CPICH) energy per chip to total PSD at the UE antenna (Ec/Io) and/or CPICH Received Signal Code Power (RSCP) as defined in 3GPP standards. In another embodiment, for example, for a WiFi deployment, signal strength information can include Received Signal Strength Indicator (RSSI), Received Channel Power Indicator (RCPT), combinations thereof, or other similar signal strength information. Accordingly, although many of the example embodiments discussed herein are described with reference to RSRP and/or RSRQ signal strength information, it should be understood that signal strength information as discussed for the various embodiments described herein can cover a multitude of access network types including both 3GPP and non-3GPP access networks.

In certain embodiments, channel quality indicator (CQI) reported by a UE can be used to determine downlink SINR by using the CQI reported for a given UE as a proxy for determining the downlink SINR. Generally, the CQI reported by a UE is essentially the MCS at which the cell radio to which the UE is connected needs to transmit packets to the UE such that the UE will receive packets at a 10% Block Error Rate (BLER). If an Average White Gaussian Noise (AWGN) channel is assumed for the UE, an SINR can be determined that will lead to a 10% BLER based on the MCS chosen by the cell radio for downlink transmissions to the UE via the Physical Downlink Shared Channel (PDSCH), which carries data transport blocks to the UE. Generally, each MCS from which the cell radio can choose for downlink transmissions can be mapped to one or more SINR values or a range of SINR values, thereby enabling SINR determinations using the MCS chosen for downlink transmissions. Although UE manufacturers often implement different receivers, etc. for their equipment, which can lead to non-one-to-one MCS to SINR mappings, CQI can be used to determine an approximate SINR for a given UE based on the assumption that, as SINR increases for a UE, CQI can also increase because the UE can decode higher order modulation schemes while staying within the 10% BLER threshold. It should be understood that, under an assumption of uplink and downlink symmetry for a given UE, uplink or downlink SINR can be used for various embodiments described herein.

Returning to FIG. 1A, central management system 122 can further include interference management module 150, which can, in various embodiments, aid in coordinating uplink resource scheduling between cell radios 114a-114b for UE 112a-112d. In various embodiments, central management system 122 can be deployed as any central management entity, such as, for example, an Operations, Administration and Maintenance (OAM) entity, a Radio Management System (RMS), a Radio Resource Manager (RRM), a Self-Organizing Network (SON) management system, combinations thereof or the like. In certain embodiments, an RMS can be used in conjunction with small cell deployments, for example, to configure cell radios 114a-114b according to a particular communications protocol (e.g., technical report (TR) 069) and data model (e.g., TR-196 version 2). In certain embodiments, a SON management system can have visibility of one or more parallel networks such as, for example, a macro cell network, a small cell network, a wireless local area network (WLAN) and can be used to coordinate radio resource for different UE among co-deployed parallel networks (e.g., having overlapping or neighboring coverage areas for different technologies). In essence, a SON management system may provide a system-wide view of communication system 100 and can therefore intelligently provision resources among different communication networks in the communication system. Accordingly, central management system 122 can be configured to interface with any element or node of communication system 100 via one or more logical interfaces. In various embodiments, central management system 122 can be deployed within service provider network 130, within cloud-based service (e.g., in a centralized SON (cSON) architecture) and/or can be deployed in a service network for a particular deployment, such as, for example, in an enterprise small cell deployment.

RAN 120 is a communications interface between UE 112a-112d and service provider network 130. In various embodiments, depending on deployment, one or more cell radio(s) 114a-114b can be deployed in RAN 120 to provide macro and/or small cell mobile/cellular coverage for UE 112a-112d. In general, small cell networks are comprised of multiple small cell radios, which can provide proximate coverage to users in an environment in which macro network coverage may be limited or interfered (e.g., within a building, structure, facility, etc.). Typically, small cell radios operate at lower radio power levels as compared to macro cell radios. Small cell radios can be connected using a standard broadband digital subscriber line (DSL), internet or cable service into service provider network 130 via one or more small cell gateways. Calls can be made and received, where the signals are sent (potentially encrypted) from a given small cell radio via the broadband Internet protocol (IP) network to one of the service provider's main switching centers.

Thus, RAN 120 may provide one or more coverage areas for servicing multiple end users and for managing their associated connectivity. The communications interface provided by RAN 120 may allow data to be exchanged between an end user and any number of selected elements within communication system 100. For example, RAN 120 may facilitate the delivery of a request packet (e.g., request for service(s)) generated by a given UE (e.g., UE 112a) and the reception of information sought by an end user. In various embodiments, RAN 120 may include 3GPP access networks such as, for example, Global System for Mobile Communications (GSM) Enhanced Data Rates for GSM Evolution (EDGE) Radio Access Network (GERAN), generally referred to as 2G, and Universal Mobile Telecommunications System (UMTS) Terrestrial Radio Access Network (UTRAN), generally referred to as 3G, and/or evolved UTRAN (E-UTRAN), generally referred to as 4G, Long Term Evolution (LTE) or LTE-Advanced (LTE-A). In various embodiments, RAN 120 may include non-3GPP IP access networks such as digital subscriber line (DSL), Cable, WLAN (e.g., Wireless Fidelity (WiFi), Worldwide Interoperability for Microwave Access (WiMAX)) or the Internet. RAN 120 is only one example of a communications interface between an end user and service provider network 130. Other suitable types of communications interfaces may be used for any appropriate network design and, further, be based on specific communications architectures in accordance with particular needs.

Service provider network 130 represents a series of points or nodes of interconnected communication paths for receiving and transmitting packets of information that propagate through communication system 100. In various embodiments, service provider network 130 can be configured according to 3GPP standards to include one or more elements of an Evolved Packet Core (EPC) in order to provide services (e.g., voice, data, multimedia, etc.) and interconnectivity to UE 112a-112d to one or more packet data networks (e.g., the Internet). Service provider network 130 may offer communicative interfaces between UE 112a-112d and selected nodes or elements in the network, and may be any local area network (LAN), wireless local area network (WLAN), metropolitan area network (MAN), wide area network (WAN), virtual private network (VPN), Intranet, extranet, or any other appropriate architecture or system that facilitates communications in a network environment. Communication system 100 may implement a user datagram protocol (UDP)/Internet protocol (UDP/IP) connection and use a transmission control protocol (TCP/IP) communication language protocol in particular embodiments of the present disclosure. However, communication network may alternatively implement any other suitable communication protocol for transmitting and receiving data packets within communication system 100.

Before detailing some of the operational aspects of FIG. 1A, it is important to understand common characteristics of uplink interference that can occur in mobile communications networks. The following foundation is offered earnestly for teaching purposes only and, therefore should not be construed in any way to limit the broad teachings of the present disclosure.

Uplink RBs can be transmitted by a given UE (e.g., UE 112a) using a Physical Uplink Shared Channel (PUSCH), a Physical Uplink Control Channel (PUCCH) or a Physical Random Access Chanel (PRACH). Uplink transmissions by UE can cause interference, typically referred to as power spectral density (PSD) interference or interference PSD, to a particular serving cell radio and/or to one or more neighboring cell radios. Interference, typically, represented using the symbol 'I', can be expressed as interference over thermal noise (IoT), which is the ratio of interference PSD to thermal noise PSD. Thermal noise PSD, as defined in 3GPP TS 26.214, is the white noise PSD on the uplink carrier frequency multiplied by the uplink system bandwidth.

The transmission of uplink RBs by a given UE can cause interference PSD to its particular serving cell and/or to one or more neighboring cells. For LTE, Release 9 of 3GPP specifications define different interference mitigation schemes such as, for example, interference reduction and inter cell interference coordination (ICIC). Interference reduction is typically associated with optimizing coverage and capacity for a network. ICIC is typically associated with the management of radio resources to mitigate inter cell interference. In the frequency domain, ICIC is used to manage the allocation of RBs between cells in order to coordinate the use of frequency domain resources.

In particular, frequency domain ICIC can be used to mitigate inter cell interference with neighboring cells for UEs located at the edge of a coverage area of a given serving cell (e.g., cell edge UEs) that may have resources allocated thereto, which can interfere with the neighboring cells. Solutions for ICIC often involve interference mitigation through either orthogonal transmissions, which are typically associated with fractional frequency re-use (FFR), or Multiple Input Multiple Output (MIMO) schemes, which are typically dependent on number of antennas configured for a UE.

Typically, semi-orthogonal transmissions associated with FFR can provide interference mitigation by partitioning the frequency spectrum (e.g., system bandwidth) available to each cell radio such that each cell uses a spectrum of frequency which does not overlap with a neighboring cell or such that RBs allocated to cell edge UEs for a particular serving cell do not overlap with RBs allocated to cell edge UEs for any neighboring cells. The term 'semi-orthogonal' indicates that on one RB, one cell lowers interference to a neighboring cell while the neighboring cell uses higher power. This differs from orthogonal transmissions, which can be a special case in which the first cell makes an interference of zero (e.g., does not use the RB at all).

Semi-orthogonal schemes typically involve a static partitioning of the frequency spectrum for FFR, which can be highly inefficient because there may be a large number of UEs on a cell edge but not enough resources are set aside for FFR where neighboring cells' cell edge UEs are scheduled on non-overlapping portions of the spectrum or in cases where no or a minimal number of cell edge UEs may be served by a given cell radio (e.g., in cases where the spectrum is partitioned for cell edge UEs). The spectrum allocated to FFR might be wasted or there may not be enough spectrum for FFR, which can lead to poor utilization of resources when cell edge UEs are served. In other cases, the number of interfering neighbors may change, which could also lead to inefficient use of system bandwidth for systems having static FFR configurations. FFR frequency allocation schemes can be distinguished from re-use one frequency allocation schemes in which the entire frequency spectrum can re-used by each cell for allocating resources to all UEs, which are served as the same transmit power per RB (e.g., having equivalently the same power spectral density). However, in deployments that rely only on re-use one schemes, interference is typically high at the edges of neighboring cells.

In accordance with various embodiments described herein, communication system 100 is configured to provide a system and method to facilitate interference mitigation for uplink ICIC in a network environment through the use of information exchanges between each cell radio 114a-114b and a central management entity (e.g., central management system 122) and between each cell radio 114a-114b via the X2 interface. The information exchanges may provide for adaptive resource allocation between neighboring cell radios in order to schedule uplink UE transmissions to mitigate interference between neighboring cells. In general, communication system 100 can provide a method to define and capture interference constraints using both centralized and distributed ICIC approaches that enable re-use one and FFR options for scheduling UE transmissions. In addition, in certain embodiments, communication system 100 can provide a method to enable resource adaptation for frequency domain uplink ICIC that enables dynamic allocation and re-allocation of system spectrum between re-use one and FFR frequencies for each cell radio in the system to optimize the sum of total utilities, as a function of UE throughput rates, across all cells in the system or in a given cluster.

In certain embodiments, the frequency spectrum for each cell can be divided into four types of RBs. Each RB division can be represented by a two-tuple representation indicating a maximum IoT caused by a neighboring cell to a given and a maximum IoT caused to a neighboring cell by the given cell. The division of frequency spectrum is best understood by a schematic diagram illustrating the two-tuple representation, which has been provided by FIG. 1B.

Referring to FIG. 1C, FIG. 1C is a simplified schematic diagram illustrating example details associated with an example frequency spectrum 180 that can be associated with communication system 100 in accordance with one potential embodiment of the communication system. Frequency spectrum 180 can represent the spectrum of frequencies across the system bandwidth. As shown, frequency spectrum 180 can be divided into four types of RBs represented by two-tuples (L,L), (M,M), (H,L) and (L,H), each of which can be referred to herein as divisions or regions of the frequency spectrum. In various embodiments, a fraction of the total resources (e.g., RBs) available for scheduling (e.g., based on system bandwidth) can be distributed among the RB divisions. A fraction of total resources that can be scheduled in the (L,L) region can be represented as '$\rho_{LL}$'; a fraction of total resources that can be scheduled in the (M,M) region can be represented as '$\rho_{MM}$'; a fraction of total resources that can be scheduled in the (H,L) region can be represented as '$\rho_{HL}$'; and a fraction of total resources that can be scheduled in the (L,H) region can be represented as '$\rho_{LH}$'.

It should be noted that the size and lay-out of the two-tuple divisions illustrated in FIG. 1C are provided for illustrative purposes only and are not meant to limit the broad scope of the present disclosure. It should be understood that the frequency spectrum of any cell radio can be divided into different RB regions, of varying size and/or order, depending on the deployment environment of a cell radio and/or any neighboring cell radio. More specifically and as discussed in further detail herein, the allocation and/or re-allocation of spectrum for one or more cell radios for scheduling RBs can be dynamically adjusted in certain embodiments to optimize network UE throughput across all cells in the network or in a given cluster.

The first indication in each two-tuple can represent the maximum IoT (generally, interference) caused by one or more neighboring cell radio(s) toward the given serving cell radio (e.g., interference caused by cell radio 114b toward cell radio 114a) and the second indication in each two-tuple can represent the maximum IoT caused by the given serving cell radio toward the one or more neighboring cell radio(s). It should be noted that the interference 'caused by' and 'caused to' between neighboring cells is typically the interference PSD caused by uplink transmissions of UEs, in particular cell edge UEs, intended for a given serving cell radio, which can cause interference between neighboring cells. For example, uplink transmissions of cell edge UE 112b intended for cell radio 114a can cause interference towards neighboring cell radio 114b and uplink transmissions of cell edge UE 112c intended for cell radio 114b can cause interference towards neighboring cell radio 114a.

Two-tuple (L,L) indicates a low interference caused by neighboring cell(s) for UEs (e.g., RBs for UEs) scheduled within the (L,L) region and also a low interference caused to neighboring cell(s). The low interference can be associated with a low interference PSD guarantee ($I_{LOW}$), which may be considered an interference guarantee per RB that may be provided between neighboring cells by central management system 122 such that each neighboring cell radio (e.g., cell radio 114a-114b) can schedule UE transmissions based, at least in part, on the low interference PSD guarantee ($I_{LOW}$). Thus, as referred to herein, $I_{LOW}$ can be used as an interference PSD constraint that should be met by a given serving cell when scheduling UE transmissions such that, for any RB scheduled in various RB regions, the interference PSD toward any neighboring cell(s) caused by a UE transmitting the associated RB should not exceed the low interference PSD guarantee $I_{LOW}$ as applicable for RBs having their own interference guarantees that are to be scheduled by any neighboring cell(s). In various embodiments, each cell radio 114a-114b may seek to schedule cell edge UEs (e.g., RBs associated with cell edge UEs) that don't cause much interference PSD to one or more neighboring cell(s) in the (L,L) region.

In certain embodiments, interference PSD caused to one or more neighboring cell(s) by transmissions for a given UE can be determined by a given serving cell based on the number of uplink RBs assigned to the UE, the UE power control policy and the channel gain from the UE to one or more neighboring cell(s). In certain embodiments, channel gain to one or more neighboring cells can be estimated using RSRP measurements of neighboring cell(s) reported by a given UE to its serving cell. Under an assumption of approximate uplink and downlink symmetry for transmissions and under an assumption that the cell-specific reference signal (CRS) power for each of one or more neighboring cell(s) is known by the serving cell, RSRP measurements can, in certain embodiments, be used to determine interference PSDs caused by UEs at neighboring cells Accordingly, in various embodiments, UE 112a-112d can be configured to report signal strength information, such as, for example, RSRP and/or RSRQ measurements for neighboring cells to a corresponding serving cell, which can be used to determine interference PSDs for each UE 112a-112d based on the number of RBs assigned to the UEs. It is assumed, in certain embodiments, that central management system 122 can be configured to distribute the CRS for each cell radio 114a-114b among the cell radios to be used in determining interference PSDs for each UE 112a-112d.

Moreover, under an assumption of uplink and downlink symmetry, the number of cell edge UEs for a particular serving cell that may be scheduled in the (L,L) can be determined using neighboring cell RSRP values reported by cell edge UEs for the serving cell. A further discussion of determining the number of cell edge UEs that can be scheduled in the (L,L) region is provided below with reference to discussions related to determining fractions of resources for each region.

Two-tuple (M,M) indicates a medium interference caused by one or more neighboring cell(s) for UEs scheduled within the (M,M) region and a medium interference caused to one or more neighboring cell(s). The medium interference can be associated with a medium interference PSD guarantee ($I_{MED}$). In certain embodiments the medium interference PSD level ($I_{MED}$), can also be used as a constraint that should be met by a given serving cell when scheduling UE transmissions such that, for any RB scheduled in various RB regions, the interference PSD toward any neighboring cell(s) caused by a UE transmitting an associated RB should not exceed the medium interference PSD $I_{MED}$ as applicable for RBs with interference guarantees that are to be scheduled by the neighboring cell(s). In certain embodiments, each cell radio 114a-114b may seek to schedule most UEs (e.g., the RBs associated with the UEs) in the (M,M) region.

Two-tuple (H,L) indicates a high interference caused by one or more neighboring cell(s) for UEs scheduled within the (H,L) region and a low interference caused to one or more neighboring cell(s). The high interference can by associated with a high interference PSD ($I_{HIGH}$). In certain embodiments, each cell radio 114a-114b may seek to schedule UEs that are close to it (e.g., interior UE 112a associated with serving cell radio 114a and interior UE 112d associated with serving cell radio 114b) in the (H,L) region.

Two-tuple (L,H) indicates a low interference caused by one or more neighboring cell(s) for UEs scheduled within the (L,H) region and a high interference caused to one or more neighboring cell(s). In certain embodiments, each cell radio 114a-114b may seek to schedule cell edge UEs (e.g., UE 112b and/or 112c) that may cause high interference to one or more neighboring cell(s) in the (L,H) region.

In various embodiments, the (L,L) and (M,M) regions can be associated with re-use one frequencies of the frequency spectrum and the re-use one frequencies can be re-used among neighboring cell radios for scheduling uplink UE transmissions. In various embodiments, the (H,L) and (L,H) regions can be associated with FFR frequencies of the frequency spectrum, and the FFR frequencies can be distributed between neighboring cells for scheduling uplink UE transmissions according to the various interference PSD constraints $I_{LOW}$ and $I_{MED}$ associated with between neighboring cells such that interference guarantees for uplink RB transmissions that are scheduled between neighboring cells do not violate the $I_{LOW}$ and $I_{MED}$ PSD levels as provided by central management system 122.

In certain embodiments, distributed coloring for scheduling FFR resources between neighboring cells can be accomplished via High Interference Indicator (HII) messages as defined in 3GPP standards, which can be exchanged between neighboring cells via the X2 interface to indicate which resources a given cell radio has scheduled or is seeking to schedule across certain frequencies. In various embodiments, HII messages can be associated with a bitmap having coloring indicative of the RB guarantees provided between neighboring cells. For the HII messages, in certain embodiments, only bits for RBs that are included in the set of resources to be scheduled in the FFR region are coordinated through HII, where bits for non-FFR RBs are ignored.

For example, in at least one embodiment, a convention can be adopted in which, if during operation a particular cell lowers its power and guarantees low interference on certain uplink RBs to be transmitted by UEs served by the particular cell, those RBs can be marked as '0' while others are marked as '1'. Then, if a cell gets a message from a neighboring cell where both have high power and high interference caused to neighbors, but expect lower interference on the same RBs (e.g., for uplink RBs in the (L,H) region), then both neighboring cells can select a new set of RBs with such characteristics from all sets of available RBs, which have not been selected by each of their neighbors in the past (e.g., standard coloring) and determine uplink transmissions which meet the $I_{LOW}$ and $I_{MED}$ guarantees in order to coordinate high interference resource block (RB) guarantees and low interference RB guarantees for the FFR portion of the frequency spectrum.

In various embodiments, transmission power for UE 112a-112d for RB divisions can be determined according to a power control algorithm that can be configured for cell radio 114a-114b. While the present disclosure addresses scheduling of resources and allocation of resources for the frequency spectrum of each of one or more neighboring cells, UE power control is not outside its broad and expansive scope. It is anticipated that this disclosure would indeed be applicable to determining UE transmission power and a myriad of other alternatives, which may be associated with mitigating interference between one or more neighboring cell(s), including macro cells and small cells, of a given communication system.

As noted previously, communication system 100 is configured to provide a system and method to facilitate uplink ICIC in a network environment through the use of information exchanges between each cell radio 114a-114b and a central management entity (e.g., central management system 122) and between each cell radio 114a-114b via the X2 interface. Thus, the system and method provided by communication system 100 can provide a framework of interference management in which coordination is partly centralized (e.g., via central management system 122) to determine a fraction of resources in the FFR region and interference PSD levels (e.g., interference guarantees $I_{LOW}$ and $I_{MED}$) and is partly distributed such that FFR patterns are determined in a distributed manner between neighboring cells (e.g., via X2 exchanges) to coordinate high interference RB guarantees and low interference RB guarantees for the FFR portion of the frequency spectrum. Accordingly, communication system 100 provides a hybrid framework for centralized and distributed interference mitigation coordination.

During operation, in various embodiments, each cell radio 114a-114b can provide feedback information to central management system 122 that can include UE specific feedback and/or cell specific feedback related to path loss and/or interference at each UE served by each particular cell radio. Based, at least in part, on the feedback information received from each cell radio 114a-114b, central management system 122 can optimize one or more ICIC parameters to facilitate interference mitigation between neighboring cell radios (e.g., cell radios 114a-114b) of communication system 100 and can distribute the one or more ICIC parameters to cell radios within the communication system. Upon receipt of the one or more ICIC parameters, each neighboring cell radio 114a-114b can schedule for uplink UE transmissions (e.g., can schedule RBs for UEs 112a-112d) for the re-use one portion of the spectrum based on the ICIC parameters and can exchange HII messages via the X2 interface to schedule uplink UE transmissions for the FFR portion of the spectrum also based on the ICIC parameters to provide uplink ICIC for communication system 100. Additional details related to the feedback information received from cell radios and the optimized uplink ICIC parameters provided to cell radios are provided in further detail below.

To begin, it should be noted that central management system 122 can optimize the one or more uplink ICIC parameters based on receiving any of: UE specific feedback alone from cell radios 114a-114b; cell specific feedback alone from the cell radios 114a-114b; or any combination of UE specific feedback and cell specific feedback from cell radios 114a-114b. In certain embodiments, a flag can be included in any feedback messages communicated to central management system 122 indicating whether the feedback information is formatted as UE specific feedback or cell specific feedback or both.

In various embodiments, UE specific feedback communicated to the central management system 122 from a given cell radio serving one or more UEs can include one or more of the following: the total number of UEs connected to the serving cell radio and the total number of UEs connected to the serving cell radio which have reported a neighboring cell radio signal strength (e.g., RSRP) above a particular threshold (e.g., a RSRP threshold); this number of UEs can generally identify the number of cell edge UEs for the serving cell radio. In at least one embodiment, the threshold can be set based on the RSRP at the edge of coverage of cells and the minimum SINR that a network operator or service provider desires to serve UEs. For example, the threshold could be set based on a formula such as 'RSRP_threshold=min_RSRP_at_coverage_edge−min_SINR'. For the set of UEs reporting neighboring cell signal strengths above the threshold, the serving cell can communicate to central management system 122 the signal strength for the serving cell and a cell identifier (ID) and corresponding signal strength for each neighboring cell determined to be above the signal strength threshold. In certain embodiments, the cell ID can be an evolved cell global identifier (ECGI) or a cell global identifier (CGI) as defined by 3GPP standards or can be a local cell ID.

During operation, central management system 122 can use the UE specific feedback to determine interference received by and caused to each of one or more cells neighboring each other and to determine a number of neighbors for each cell for purposes of determining uplink ICIC parameters that can be used in scheduling uplink UE transmissions between neighboring cells for FFR portions of the system bandwidth. [Note, although the example operations discussed below are described with respect to RSRP, it should be understood that any signal strength information could be used in a similar manner.] In general, the number of neighbors that are determined for each cell will impact the fraction of FFR resources for the (L,H) region for scheduling cell edge UE(s) for each cell such that the fraction of resources for this region may be inversely proportional to the number of neighbors that are considered to be interferers for each cell. In various embodiments, cells can schedule transmissions for the re-use one portion of the system bandwidth without interference coordination among neighboring cells.

While UE specific feedback can be used to determine uplink ICIC parameters, cell specific feedback can also be used, as described below. In certain embodiments, UE specific feedback may result in less operations being performed at each cell radio (e.g., cell radio 114a-114b), for example, performing comparisons to a predetermined signal strength threshold and including certain information in the UE specific feedback where other operations can be offloaded to central management system. Embodiments where UE specific feedback is provided may decrease the computational impact on cell radios in communication system 100. However, if cell specific feedback may be used for the feedback information, some of the processing for providing uplink ICIC can be absorbed by the cell radios thereby freeing up more resources for central management system 122 to perform other operations. In addition, using cell specific feedback can reduce the load on the communication link between cell radios and the central management system.

In various embodiments, cell specific feedback communicated to the central management system 122 from a given cell radio serving one or more UEs can include one or more ordered relative RSRP values (or other similar relative signal strength/interference values, determined in a similar manner as relative RSRP values) for one or more neighboring cell radios of the serving cell radio. As noted previously relative RSRP or relative interference can be determined by subtracting the serving cell RSRP as measured by a given UE a neighboring cell RSRP as measured by the UE. Relative RSRP values or relative interference values, as referred to interchangeably herein, can be used to determine neighboring cell radios for purposes of providing uplink ICIC for FFR portions of the system bandwidth. In certain embodiments, the one or more ordered relative interference values (or, equally, ordered relative RSRP values) included cell specific feedback can be ordered in a descending order according to a highest relative interference value determined for each of one or more neighbors of the serving cell radio that is above a predetermined relative interference threshold, referred to herein as 'relativeInterf'.

Before describing operations associated with determining cell specific feedback, it should be noted that although cell radios 114a-114b are illustrated in FIG. 1A as neighboring each other, it should be understood that any number of cell radios can be deployed in communication system 100. As the number of cell radios could vary from tens to hundreds to thousands, it is highly possible that not all cell radios would be considered neighbors of each other and resource allocation between non-neighboring cells could be handled accordingly. In certain embodiments, a given cell radio (e.g., cell radio 114a) can determine whether one or more neighbors exist for the cell radio for the purpose of mitigating interference between neighboring cells using RSRP and RSRQ measurements as reported by UEs served by the cell radio. For cell neighbors that are determined to have a relative interference above the relativeInterf threshold, interference can be mitigated between the neighboring cells through coordinated scheduling of FFR portions of the system bandwidth using the uplink ICIC parameters provided by central management system 122 and through FFR exchanges (e.g., HII messaging between neighboring cells to schedule uplink transmissions for the FFR portion of the system bandwidth).

Generally, operations for determining and communicating ordered relative interference or relative RSRP values (or other similar interference/signal strength information) for one or more neighboring cells can include: 1) at each of a given UE connected to a given serving cell radio, determining the RSRP for the serving cell and the RSRP for each of one or more neighboring cells; 2) for each UE connected to the serving cell radio, calculating a relative interference value for each reported neighbor, where the relative interference value (R) can generally be expressed as: R=neighboring cell RSRP—serving cell RSRP; 4) determining which of the relative interference values for each neighbor are above a predetermined relative interference threshold, referred to herein as 'relativeInterf'; 5) ordering the relative interference values above the relative interference threshold in a descending order from a largest relative interference value; 5) determining a highest relative interference value for each cell neighbor above the threshold (e.g., removing lower strength "duplicates" of cell neighbors) and 6) including ordered relative interference values for each highest cell neighbor value in cell specific feedback communicated to central management system 122.

In various embodiments, the ordered relative interference values can be communicated as one or more ordered two-tuple pairs of (cell ID, relative interference) to central management system 122. In various embodiments, the predetermined threshold relativeInterf can be set such that a cell can be determined as a neighboring cell for purposes of facilitating uplink ICIC between neighboring cells if it has an RSRP value that is at least equal to the serving cell RSRP plus some minimum relative interference value (e.g., the relativeInterf threshold), say, for example, −5 dB. Additional details related to the cell specific feedback and determining ordered sets of relative interference values for a given serving cell can be best understood through an example use case, which is provided below by FIG. 2.

As noted above, for the overall operation of communication system 100, central management system 122 can optimize one or more uplink ICIC parameters to facilitate interference mitigation between neighboring cell radios (e.g., cell radios 114a-114b) of communication system 100 based, at least in part, on the feedback information (e.g., UE specific feedback information or cell specific feedback information) received from each cell radio 114a-114b, and can distribute the one or more ICIC parameters to cell radios within the communication system. In various embodiments, the one or more ICIC parameters can be used by each cell radio 114a-114b as inputs for scheduling operations, link adaptation operations and/or measurement reporting operations in order to provide uplink ICIC for communication system 100 such that neighboring cell radios 114a-114b provide interference guarantees for certain uplink RBs for cell edge UEs served by each cell radio in order to meet the low interference PSD level ($I_{LOW}$) and the medium interference PSD level ($I_{MED}$) as set by central management system 122 for the FFR RB regions (H,L) and (L,H).

In various embodiments, the one or more ICIC parameters optimized by central management system 122 can include one or more of the following: the number of resources (e.g., RBs) that are to be scheduled in the FFR region of the frequency spectrum for neighboring cell radios; what fraction of resources that a cell radio can expect cause higher interference to and receive lower interference from neighboring cell(s) (e.g., fraction of resources $\rho_{LH}$ for scheduling cell edge UE(s); what fraction of resources $\Sigma_{LL}$, $\rho_{MM}$, $\rho_{HL}$ can be scheduled in the (L,L), (M,M) and (H,L) regions; a value for the low interference PSD level ($I_{LOW}$); and/or a value for the medium interference PSD level ($I_{MED}$).

In various embodiments, central management system 122 can determine the number of resources that are to be scheduled in the FFR region and the corresponding fraction of resources for each RB region by solving a system of equations. As noted, cell edge UEs which don't cause much interference PSD to neighboring cells can be scheduled in the (L,L) region. In certain embodiments, the fraction of resources $\rho_{LL}$ to be scheduled in the (L,L) region can be determined from power control parameters '$\rho_0$' and '$\alpha$', as defined in 3GPP TS 36.214, as well as the number of users that need to be supported such that they cause interference PSD less than $I_{LOW}$−3 dB or less at any neighboring cell but are required to be scheduled with low interference PSD in order to transmit voice packets on 3 RBs. More generally, in at least one embodiment, the fraction of resources $\rho_{LL}$ to be scheduled in the (L,L) region can be calculated by determining for each cell edge UE, the interference that the cell edge UE can tolerate on the uplink, and if this is less than $I_{LOW}$ then the UE is considered to be scheduled in the (L,L) region. The fraction of resources $\rho_{LL}$ to be scheduled in the (L,L) region can then be set based the number of cell edge UEs that can tolerate fit this characteristic and dividing by the total number of UEs in the system.

In at least one embodiment, a first equation (Equation 1, shown below) can be used to relate the fraction of resources in $\rho_{MM}$, $\rho_{HL}$, and $\Sigma_{LH}$ to the sum of the factions (e.g., 1, for the system bandwidth) and $\rho_{LL}$, such that:

$$\rho_{MM}+\rho_{HL}+\rho_{LH}=1-\rho_{LL} \quad \text{Equation 1}$$

In a similar manner, the number of resources per RB region can be related to the total number of RBs available based on the system bandwidth. The number of RBs for the (L,L), (M,M), (L,H) and (H,L) regions, respectively, can be expressed as $N_{RB}^{LL}$, $N_{RB}^{MM}$, $N_{RB}^{LH}$, and $N_{RB}^{HL}$, respectively, with the total number of RBs available for allocation being expressed as $N_{RB}^{TOT}$. The relationship for number of RBs per region to the total number of RBs based on system bandwidth can be expressed similar to Equation 1 and is shown in Equation 2, below such that:

$$N_{RB}^{MM}+N_{RB}^{LH}+N_{RB}^{HL}=N_{RB}^{TOT}-N_{RB}^{LL} \quad \text{Equation 2}$$

In at least one embodiment, a second equation (Equation 3, shown below) can be used to relate $\rho_{LH}$ and $\rho_{HL}$ according to the number of neighbors for each cell radio such that:

$$\rho_{LH}/(\rho_{HL}+\rho_{LH})=1/(1+90th\_percentile\_num\_neigh) \quad \text{Equation 3}$$

For equation 3, the '90th_percentile_num_neigh' can be set to a value corresponding to approximately the 90th percentile of the number of neighbors reported for each cell radio in communication system 100. In at least one embodiment, the 90th percentile of a set reflects a value such that 90 percent of the elements in the set are less than this value. For example, say a first cell reports eight (8) neighbors, a second cell reports six (6) neighbors, a third cell reports five (5) neighbors and a fourth cell reports (9) neighbors. In this example, the 90th percentile number of neighbors would be between the third highest value (75th percentile) and the fourth highest value (100th percentile). As noted, the fraction of resources FFR resources for the (L,H) FFR region may be inversely proportional to the number of neighbors considered as interferers for each cell.

In various embodiments, the number of neighbors for a given cell radio (e.g., cell radio 114a) can be determined using UE specific feedback and/or cell specific feedback. For example, in certain embodiments in which UE specific feedback is provided to central management system 122, the neighboring cell IDs and RSRPs reported by UEs above the neighboring cell RSRP threshold can be used to determine the number of neighbors for the cell radio. In certain embodiments in which cell specific feedback is provided to central management system 122, the number of neighbors reported for a given cell radio (e.g., cell radio 114a) can be determined using the ordered relative RSRP values determined by the cell radio via RSRP and/or RSRQ values (or other signal strength/interference values) reported by each UE served by the cell radio (e.g., UE 112a-112b served by cell radio 114a). In general, cell radios can be considered neighbors of each other if at least one UE's transmit PSD on one RB exceeds the low interference PSD guarantee $I_{LOW}$.

In at least one embodiment, a fourth equation (Equation 4, shown below) can be used to relate the FFR fraction of resources (e.g., $\rho_{HL}$ for the (H,L) region(s)+$\rho_{LH}$ for the (L,H) region(s)) to the fraction of resource $\rho_{MM}$ in the (M,M) re-use one region as a ratio of resources kappa 'κ' such that:

$$\kappa = (\rho_{HL} + \rho_{LH})/\rho_{MM} \qquad \text{Equation 4}$$

As described in further detail below, κ may depend on UE path loss (PL) to its serving cell and one or more interfering cells and can be optimized to maximize a total some of utilities for UE throughput rates for certain interference PSD levels (e.g., constraints) $I_{LOW}$, $I_{MED}$ and a high interference PSD level ($I_{HIGH}$). The high interference PSD level ($I_{HIGH}$) is discussed in further detail below in reference to optimization operations for κ. For purposes of the present discussion, κ can be assumed to be set to an initial nominal value based on the deployment scenario of the cell radios for which UL ICIC is sought. For example, for a macro cell deployment, κ can be initially set to be in a range of approximately 0.15-0.2, which would mean less resources (e.g., UEs) would be scheduled in the FFR region as there may likely be less cell edge UEs for neighboring macro cells, and for a small cell deployment, κ can be initially set to be approximately 0.70, which would mean more resources (e.g., UEs) would be scheduled in the FFR region as there may likely be more cell edge UEs for neighboring small cells.

Based on the determination of κ, the equations shown above, including any combination of Equations 1-4, manipulations, estimations, derivations and/or generalizations which can be deduced therefrom and the number of neighbors per cell radio, including any estimations, derivations and/or generalizations thereof (e.g., percentiles) can be used to determine the number of resources to be scheduled in the FFR region of system bandwidth as well as the fraction of resources to be scheduled in each RB region.

Turning to the interference PSD levels $I_{LOW}$ and $I_{MED}$, in various embodiments, central management system 122 can set the value for the low interference PSD level ($I_{LOW}$) to a highest value such that a high percentage of UEs (e.g., approximately 90% or so) at cell edges can achieve an SINR in a range of approximately 5-7 dB when each UE transmits over a predetermined number of RBs, for example one or two RBs, using the power control parameters assigned to the corresponding UE. In some embodiments, $I_{LOW}$ can be set at a level 5-10 dB lower than the downlink SINRs of cell edge UEs. In some embodiments, SINRs for cell edge UEs can be determined via relative RSRP values, either as reported in cell specific feedback to central management system or as determined by central management system 122 via UE specific feedback, which can be used to set $I_{LOW}$ such that a high percentage of cell edge UEs can achieve an SINR of approximately 5-7 dB for uplink transmissions.

In various embodiments, central management system 122 can set the medium interference PSD level ($I_{MED}$) to be the interference averaged over all cell radios for all UEs connected thereto transmitting on one (or some other low number) of RBs using their assigned power control. For example, the interference for all cell radios and all UEs served by the cell radios can be determined based on the relative RSRP values determined via UE specific or cell specific feedback. In certain embodiments, the high interference PSD level $I_{HIGH}$ can be set to be equal to the high interference averaged over the FFR region (e.g., (H,L) and (L,H)) for all cells for all UEs transmitting on one (or some other low number) of RBs using their assigned power control.

As noted above, upon receipt of the one or more ICIC parameters, each neighboring cell radio 114a-114b can begin to schedule uplink UE transmissions (e.g., can schedule RBs for UEs 112a-112d) for the re-use one and FFR regions of the system bandwidth (e.g., frequency spectrum) based, at least in part, on the ICIC parameters received from central management system 122 and/or through exchanges between neighboring cells (e.g., for FFR regions). In particular, in certain embodiments, neighboring cell radios can set higher or lower interference PSDs for RBs in order to meet the guarantees (e.g., the low interference PSD level $I_{LOW}$ and medium interference PSD level $I_{MED}$) as applicable for RBs with interference guarantees that are to be scheduled between neighboring cell radios.

In various embodiments, neighboring cell radios 114a-114b can exchange HII messages via the X2 interface to determine the specific resources that each cell radio may schedule at one or more corresponding FFR frequencies according to the ICIC parameters where only bits for RBs that are to be scheduled in the FFR region are coordinated via the HII messages with other bits being ignored. In general, the HII exchanges may facilitate coordination of FFR resources for the FFR region (e.g., (L,H) and (H,L)) such that each cell radio determined to be neighbors of each other for uplink ICIC purposes (e.g., cell radios 114a-114b) may use the interference guarantees for $I_{LOW}$ and $I_{MED}$ to set interference levels on certain RBs, communicate the guarantees for these certain RBs to neighboring cells, and receive similar guarantees for other RBs scheduled by neighboring cells in order for each neighboring cell to schedule resources for UE served by each corresponding cell.

In essence, the system and method provided by communication system 100 provides a hybrid combination of centralized and distributed interference mitigation techniques using centralized exchanges between each cell radio 114a-114b and central management system 122 and distributed exchanges between neighboring cell radios (e.g., cell radios 114a-114b) to provide uplink ICIC for the communication system. Accordingly, the system and method provided by communication system 100 may provide one or more advantages, including but not limited to: providing a computationally simple method for providing interference mitigation for uplink ICIC; requiring minimal overhead in informational exchanges between cell radios and a central management system; providing a solution that is implementable in 3GPP Release 9 deployments; and/or providing a solution to define and capture interference constraints to provide for both re-use one and FFR options for scheduling UE transmissions.

Additional features related to determining neighboring cells for a particular serving cell based on relative interference or relative RSRP values for purposes of mitigating interference between neighboring cells can best be understood through an example use case that includes multiple cell radios associated with communication system 100, which is provided below by FIG. 2.

Referring to FIG. 2, FIG. 2 is a simplified block diagram illustrating an example use case 200 for cell radios associated with communication system 100 in accordance with one potential embodiment of the present disclosure. FIG. 2 includes central management system 122, a number of cell radios 210-213, a number of UEs (UE1-UE3). Cell radios 210-213 can be logically interconnected to each other via one or more corresponding X2 interfaces, which can be used to facilitate exchanges between neighboring cells to determine scheduling for specific resources in the FFR region of the system bandwidth. For example use case 200, cell radio 210 is assumed to be serving and in communication with each of UE1-UE3 via one or more sessions and UE1-UE3 are assumed to be configured to report signal strength information, such as, for example, RSRP measurements for any serving or neighboring cells. Thus, cell radio 210 can be referred to interchangeably using the terms 'serving cell radio' or 'serving cell' for UE1-UE3 for purposes of describing features associated with use case 200. Further, each cell radio 211-213 are assumed to be neighboring cell radios of serving cell radio 210 in a geographical sense for purposes of FIG. 2. However, as discussed below for FIG. 2, determination of a neighboring cell radio for purposes of uplink ICIC in order to mitigate interference between neighboring cells can be determined in at least one embodiment using cell specific feedback that includes ordered relative interference values based on various UE measurements. Note, although the example operations for example use case 200 are described with respect to RSRP, it should be understood that any signal strength/interference information could be used in a similar manner.

For purposes of example use case 200, assume UE1, UE2 and UE3 can be referred to using the notation $u_1$, $u_2$ and $u_3$, respectively, and each neighboring cell 211-213 can be referred to using the notation $c_1$, $c_2$ and $c_3$, respectively. To begin, serving cell 210 may receive serving cell RSRP values from each of UE1, UE2 and UE3 via measurement reporting from each UE. The serving cell RSRP for UE1, UE2 and UE3, respectively, can be referred to using the notation $Su_1$, $Su_2$ and $Su_3$, respectively.

Serving cell 210 may also receive neighboring cell RSRP values from each of UE1, UE2 and UE3 via measurement reporting from each UE. Neighboring cell RSRP values can be referred to using the notation $Iu_1c_1$, for example, to indicate the neighboring cell RSRP as measured by UE1 from neighboring cell $c_1$. Accordingly, serving cell 210 may receive neighboring cell RSRP values: $Iu_1c_1$, $Iu_1c_2$, $Iu_1c_3$, $Iu_2c_1$, $Iu_2c_2$, $Iu_2c_3$, $Iu_3c_1$, $Iu_3c_2$, and $Iu_3c_3$ for each UE1-UE3 for each neighboring cell RSRP measurement value.

For each serving cell RSRP and each neighboring cell RSRP, serving cell 210 can compute relative interference values $Ru_ic_j = Iu_ic_j - Su_i$ for each UE $u_i$, where i=1, 2, 3 and each neighboring cell $c_j$, where j=1, 2, 3. Thus, in at least one embodiment, relative interference values can be thought of as UE-neighbor cell pairs, e.g., a neighbor cell strength relative to serving cell strength as measured by a given UE served by the serving cell.

Upon computing relative interference values for each UE-neighbor cell pair, serving cell 210 can compare the calculated relative interference values against a relative interference threshold (e.g., relativeInterf, as noted above) of say, for example, −5 dB. For all relative interference values above the threshold, serving cell 210 can order the relative interference values in descending order to determine the highest relative interference values for each cell neighboring the serving cell. Say, for purposes of the present example, that following the threshold comparison and the ordering that serving cell 210 determines that $Ru_3c_2 > Ru_2c_2 > Ru_2c_1 > Ru_2c_2 > -5$ dB.

From the ordering, serving cell 210 can determine that $c_2$ (cell radio 212) is the strongest cell among all UE-neighbor cell pairs and its signal strength is strongest at UE3 followed by UE2. Serving cell 210 can further determine that $c_1$ (cell radio 211) is the cell with the next strongest cell among the UE-neighbor cell pairs and its signal strength is strongest at UE2 followed by UE1. Serving cell 210 can further determine that all other relative interference values fall below the −5 dB threshold for the remaining UE-neighbor cell pairs (e.g., the relative interference for cell radio 213 falls below the threshold).

For each neighbor having a relative interference value above the relativeInterf threshold, serving cell 210 can communicate cell specific information to management system 122 including, but not limited to, the RSRP for serving cell 210 ordered relative interference information for each neighboring cell above the threshold. In certain embodiments, the reporting of ordered relative interference information can include communicating only the highest relative interference value as determined for each cell neighbor. For example, serving cell 210 may only communicate $Ru_3c_2$ for cell radio 212 followed by $Ru_2c_1$ for cell radio 211. In various embodiments, serving cell 210 can communicate the relative interference information as an ordered pair, including an identity of a cell and its highest relative interference value. For example, serving cell 210 can communicate (cell ID2, $Ru_3c_2$) followed by (cell ID 1, $Ru_2c_1$) where cell ID2 and cell ID1 each identify neighboring cell radios 212 and 211, respectively.

Thus, as shown in the present example, although cell radio 213 may neighbor cell radio 210, it may not be considered a neighboring cell for the purposes of uplink ICIC for scheduling uplink transmissions for UE1-UE3. However, cell radio could still be considered a neighboring cell for uplink ICIC purposes for any UEs that may be served by cell radios 211 or 212.

Upon receiving the cell specific information, central management system 122 can determine uplink ICIC parameters such as, for example, number of resources in FFR, $I_{LOW}$, $I_{MED}$, and fractions including one or more of $\rho_{LL}$, $\rho_{MM}$, $\rho_{LH}$, and/or $\rho_{HL}$, and can communicate the uplink ICIC parameters among all cell radios in the system. Each cell radio can schedule UEs (e.g., resources) according the parameters for both re-use one and FFR portions of the system bandwidth. For FFR scheduling, FFR exchanges (dash-dot lines) between neighboring cell radios 210, 211 and 212 (e.g., neighboring for the purposes of mitigating uplink interference) can occur using one or more HII messages exchanged via the X2 interface to determine which UEs will be allocated to which frequencies using the uplink ICIC parameters received from central management system 122. The FFR exchanges may facilitate coordination of FFR resources for the FFR region (e.g., (L,H) and (H,L)) such that each cell radio determined to be neighbors of each other for uplink ICIC purposes (e.g., cell radios 210-212) may use the interference guarantees for $I_{LOW}$ and $I_{MED}$ to set interference levels on certain RBs, communicate the guarantees for these certain RBs to neighboring cells, and receive similar guarantees for other RBs scheduled by neighboring cells in order to schedule RBs for UE served by each corresponding cell in a manner that the interference guarantees promised for RBs, in particular for cell edge UE transmissions, are not violated between neighboring cells.

Although no FFR exchanges may occur for cell radio 213 with regard to UE1-UE3 in the present example, FFR exchanges could occur for cell radio 213 for any other UEs that could be served by any other cell radios that may cause interference to or receive interference from neighboring cell(s). However, even though cell radio 213 may not be involved in the FFR exchanges with regard to UE1-UE3, cell radio 213 would still provide scheduling to any UEs that it may serve according to the uplink ICIC parameters, particularly $I_{LOW}$ and $I_{MED}$, in order to not violate any RB guarantees that may be provided for any RBs for UE1-UE3.

Accordingly, as illustrated in example use case 200 that embodiments of the present disclosure can provide for a hybrid combination of centralized and distributed interference mitigation techniques using centralized exchanges between each cell radio and a central management entity, which can determine fractions of FFR resources and interference level guarantees for neighboring cell radios, and distributed exchanges between neighboring cell radios to provide uplink interference mitigation for the communication system. It should be noted that the order of operations with regard to comparisons against the relativeInterf threshold and ordering of relative interference values can be performed in any order. For example, in one embodiment the comparison could be performed first, followed by the ordering. In another embodiment, for example, the ordering could be performed first followed by the comparison. Thus, it should be understood that any order of operations for any operations described herein could be performed in any order within the scope of the present disclosure.

Turning to FIG. 3, FIG. 3 is a simplified flow diagram illustrating example operations 300 associated with providing uplink ICIC in a network environment in accordance with one potential embodiment of communication system 100. In various embodiments, the operations can be performed via a plurality of cell radios (e.g., cell radios 114a-114b) and central management system 122.

At any time, uplink transmissions can be scheduled for user equipment connected among one or more neighboring cells (e.g., cell radios 114a-114b) of communication system 100. Accordingly, the operations can begin at 302 in which one or more uplink ICIC parameters for multiple cells of the communication system can be determined by central management system based, at least in part, on feedback information associated with the cells. In certain embodiments, the feedback information for the cells can be associated with signal strength information (e.g., RSRP, CPICH Ec/Io, etc.) associated with the cells. In various embodiments, the RSRP information can include RSRP measurements for a serving cell and for one or more neighboring cells received by the serving cell from each of one or more UE connected to the serving cell. In various embodiments, the uplink ICIC parameters can include one or more of: a low interference PSD level ($I_{LOW}$), a medium interference PSD level ($I_{MED}$), a number of resources to be scheduled in FFR portions of the system bandwidth (e.g., frequency spectrum) available to the plurality of cells, and a fraction of total resources associated with each of one or more resource block portions of the system bandwidth.

At 304, the operations can include communicating the uplink ICIC parameters to each of the cells by central management system 122. At 306, the operations can include exchanging interference information between neighboring cells of the plurality of cells including, at least in part, interference guarantees for uplink transmissions to be scheduled between each neighboring cell according to a low interference PSD level ($I_{LOW}$) and a medium interference PSD level ($I_{MED}$) included in the uplink ICIC parameters. In certain embodiments, neighboring cells for each of the plurality of cells can be determined from signal strength information included in the feedback information by comparing the signal strength information to a predetermined threshold (e.g., a relative interference threshold, a RSRP threshold, etc.). In certain embodiments, the interference information can include HII messages exchanged between neighboring cells for scheduling uplink transmissions of user equipment for FFR portions of the system bandwidth available to the plurality of cells for scheduling uplink UE transmissions.

At 308, the operations can include scheduling uplink transmissions (e.g., scheduling RBs to be transmitted) for UE served by the neighboring cells based, at least in part, on the uplink ICIC parameters and the interference information exchanged between neighboring cells. In certain embodiments the uplink transmissions can be scheduled in both re-use one and FFR portions of the system bandwidth. In various embodiments, the operations can include communicating the scheduled uplink transmissions for the one or more UE (e.g., 112a-112d) served by each cell radio to one or more UE via one or more uplink grants communicated to the UE. Accordingly, communication system 100 can provides a hybrid combination of centralized and distributed interference mitigation techniques using exchanges between each cell radio 114a-114b and central management system 122 and exchanges between neighboring cell radios (e.g., cell radios 114a-114b) to provide uplink interference mitigation for the communication system.

Turning to FIG. 4, FIG. 4 is a simplified flow diagram illustrating example operations 400 associated with determining UE specific feedback for a particular serving cell (e.g., cell radio 114a serving UE 112a-112b and/or cell radio 114b serving UE 112c-112d), which can be used for uplink ICIC in accordance with one potential embodiment of communication system 100. In various embodiments, operations 400 can be performed by a given cell radio (e.g., cell radio 114a, cell radio 114b) serving one or more UE (e.g., UE 112a-112d).

Prior to performing operations for determining UE specific feedback, the operations can include enabling neighboring cell signal strength measurement reporting (e.g., RSRP measurement reporting, RSRQ measurement reporting, CPICH Ec/Io measurement reporting, etc.) at 402 for UE(s) in communication system 100. At any time, uplink transmissions can be scheduled for user equipment connected among one or more cell radios (e.g., cell radios 114a-114b) of communication system 100. Accordingly, at 404 the operations for determining UE specific feedback can include determining at a given serving cell (e.g., cell radio 114a) a number of UE(s) connected to the serving cell. At 406, the operations can include determining a number of UE(s) connected to the serving cell that have reported one or more neighboring cell signal strength value(s) (e.g., RSRP, CPICH Ec/Io, etc.) above a predetermined threshold.

At 408, the operations can include determining if no neighboring cell signal strength value(s) are above the threshold, for example, determining whether the number of UE(s) determined at 406 is equal to zero. If the number is equal to zero (e.g., there are no neighboring cell signal strength values above the threshold), the operations can continue to 410 in which the operations can involve including in UE specific feedback information for the cell: the number of UE(s) connected to the cell and an indication that no UE(s) reported neighboring cell signal strength value(s) above the threshold and the operations may end. In certain embodiments, such an indication could indicate to the serving cell and/or central management system 122 that no FFR interference coordination may be needed for the UEs served by the serving cell. Instead, uplink transmission(s) for the UE(s) may be scheduled in the re-use one portion according the uplink ICIC parameters, in particular, to satisfy $I_{LOW}$ and $I_{MED}$ so as not to violate any RB guarantees provided to any neighboring cells.

If at 408, the operations determine that the number of UE(s) reporting one or more neighboring cell signal strength value(s) is not equal to zero, the operations can continue to 412. At 412, the operations can involve including in UE specific feedback information for the serving cell one or more of: (1) the number of UE(s) connected to the serving cell; (2) the number of UE(s) reporting one or more neighboring cell signal strength value(s) above the threshold; and, (3) for each UE reporting one or more neighboring cell signal strength value(s) above the threshold, (a) the serving cell signal strength as reported by each UE can be included in the UE specific feedback along with (b) each of the one or more neighboring cell signal strength value(s) above the threshold as reported by each UE and a corresponding cell ID associated with each corresponding neighboring cell signal value included in the UE specific feedback. In various embodiments, the UE specific feedback can be communicated to central management system 122 to determine one or more uplink ICIC parameters, as discussed herein.

Figure 5:
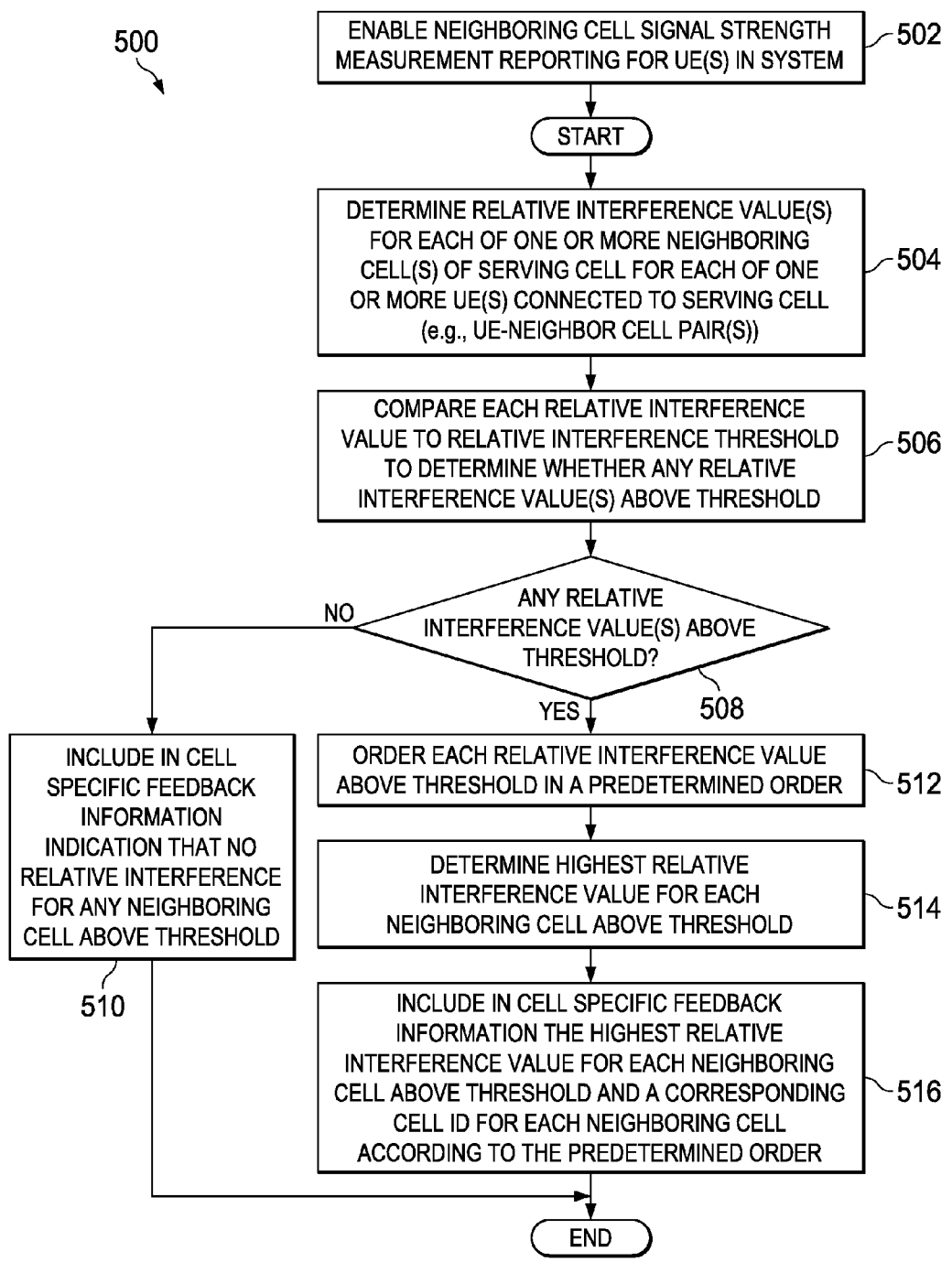
FIG. 5 is a simplified flow diagram illustrating example operations associated with determining cell specific feedback for uplink ICIC in accordance with one potential embodiment of the communication system.

Turning to FIG. 5, FIG. 5 is a simplified flow diagram illustrating example operations 500 associated with determining cell specific feedback for a particular serving cell (e.g., cell radio 114a serving UE 112a-112b and/or cell radio 114b serving UE 112c-112d), which can be used for uplink ICIC in accordance with one potential embodiment of communication system 100. In various embodiments, operations 500 can be performed by a given cell radio (e.g., cell radio 114a and/or cell radio 114b) serving one or more UE (e.g., UE 112a-112d).

Prior to performing operations for determining cell specific feedback, the operations can include enabling neighboring cell signal strength measurement reporting (e.g., RSRP measurement reporting, RSRQ measurement reporting, CPICH Ec/Io measurement reporting, etc.) at 502 for UE(s) in communication system 100. At any time, uplink transmissions can be scheduled for user equipment connected among one or more cell radios (e.g., cell radios 114a-114b) of communication system 100. Accordingly, at 504 the operations for determining UE specific feedback can include determining relative interference value(s) for each of one or more neighboring cell(s) of a given serving cell radio (e.g., cell radio 114a) for each of one or more UE(s) connected to the serving cell. In certain embodiments, the operations at 504 assume a minimum of one UE connected to the serving sell in order to determine the relative interference value(s) for one or more neighbor cell(s). In various embodiments, each relative interference value can be determined by subtracting the signal strength (e.g., RSRP, etc.) measured for the serving cell by a particular UE from a signal strength (e.g., RSRP, etc.) measured for a neighbor cell by the particular UE. Thus, each relative interference value can represent relative interference as determined for a UE-neighbor cell pair.

At 506, the operations can include comparing each relative interference value to a predetermined relative interference threshold (e.g., relativeInterf) to determine whether any relative interference value(s) that may be above the threshold. In certain embodiments, the relative interference threshold can be set to approximately −5 dB. At 508, the operations can include determining if there are any relative interference value(s) above the threshold. If there are no relative interference values above the threshold, the operations can continue to 510 in which the operations can involve including in the cell specific feedback for the serving cell an indication that no relative interference value for any neighboring cell is above the threshold and the operations may end. In certain embodiments, such an indication could indicate to the serving cell and/or central management system 122 that no FFR interference coordination may be needed for the UEs served by the serving cell. Instead, uplink transmission(s) for the UE(s) may be scheduled in the re-use one portion according the uplink ICIC parameters, in particular, to satisfy $I_{LOW}$ and $I_{MED}$ so as not to violate any RB guarantees provided to any neighboring cells.

If, however, the operations at 508 determine that there are any relative interference value(s) above the threshold, the operations can continue to 512 in which the operations can include ordering each of relative interference value above the threshold in a predetermined order. In certain embodiments, the predetermined order can be a descending order from the greatest relative interference to the lowest relative interference above the predetermined threshold. At 514, the operations can include determining a highest relative interference value for each neighboring cell above the threshold. At 516, the operations can involve including in the cell specific feedback information the highest relative interference value for each neighboring cell above the threshold and the corresponding cell ID for the neighboring cell according to the predetermined order. In various embodiments, the cell specific feedback can be communicated to central management system 122 to determine one or more uplink ICIC parameters, as discussed herein.

Turning to FIGS. 6A-6C, FIGS. 6A-6C are simplified flow diagrams illustrating example operations associated with setting interference power spectral density (PSD) levels, which can be used to mitigate interference between cell radios (e.g., cell radios 114a-114b) in accordance with one potential embodiment of communication system 100. FIG. 6A is a simplified flow diagram illustrating example operations 600A associated with setting a low interference PSD level $I_{LOW}$ in accordance with one embodiment of communication system 100. FIG. 6B is a simplified flow diagram illustrating example operations 600B associated with setting a medium interference PSD level $I_{MED}$ in accordance with one embodiment of communication system 100. FIG. 6C is a simplified flow diagram illustrating example operations 600C associated with setting a high interference PSD level $I_{HIGH}$ in accordance with one potential embodiment of communication system 100.

As discussed for the various embodiments described herein, the low interference PSD level $I_{LOW}$ and the medium interference PSD level $I_{MED}$ can be used as constraints for scheduling uplink transmissions for UE in both re-use one and FFR portions of the system bandwidth for cell radios (e.g., cell radios 114a-114b) which can be deployed in communication system 100. A high interference PSD level, while not typically used as a constraint for scheduling uplink transmissions, can in various embodiments, be used in operations involved optimizing the fraction of resources that are to be scheduled in re-use one and FFR portions of the system bandwidth, which are described in further detail below with respect to discussions of kappa 'κ'.

Referring to FIG. 6A for operations 600A associated with setting a low interference PSD level $I_{LOW}$, the operations can include determining at 610 SINR(s) for cell edge UE(s) served by cell radios in communication system (e.g., cell radios 114a-114b). In various embodiments, the determination of cell edge UEs and SINRs of the cell edge UEs can be determined from the feedback information received from the cells. For example, RSRP values or other similar signal strength values, which can included in UE specific feedback can be used to determine relative RSRP values based on serving cell RSRP values included in the UE specific feedback. The relative RSRP values can be then used to determine the SINRs of cell edge UEs. In another example, relative RSRP values or other similar signal strength values, which can be included in cell specific feedback can also be used to determine the SINRs of cell edge UEs.

At 612, the operations can include setting the low interference PSD level $I_{LOW}$ to a highest value such that a high percentage of cell edge UEs can achieve a predetermined SINR when transmitting over a predetermined number of RB(s) using the power control parameters assigned to the UEs. In certain embodiments, the high percentage can be set to approximately 90% or more. In certain embodiments, the predetermined number of RBs can be 1 or 2 RBs. In certain embodiments, the predetermined SINR for which the cell edge UEs are desired to achieve can be set within a range of approximately 5-7 dB and can be configured by a network operator and/or service provider. At 614, the operations can involve including the low interference PSD level in uplink ICIC parameters, which can be communicated to the cell radios in the system and the operations may end.

Referring to FIG. 6B for operations 600B associated with setting a medium interference PSD level $I_{MED}$, in certain embodiments, the operations assume that RSRP values (e.g., UE specific feedback) and/or relative interference values (referred to interchangeable as relative RSRP) values (e.g., cell specific feedback) have been communicated to central management system 122 by all cell radios (e.g., cell radios 114a-114b) in communication system 100.

Accordingly, at 630, the operations can include determining an average interference for each cell in the system based on signal strength and/or relative signal strength values received from each cell in the system (e.g., RSRP and/or relative RSRP). At 632, the operations can include calculating an average of the average interference for all cell radios in the system. At 634, the operations can include setting the medium interference PSD level equal to the average as calculated for all cell radios in the system. At 634, the operations can involve including the medium interference PSD level in uplink ICIC parameters, which can be communicated back to the cell radios in the system.

Referring to FIG. 6C for operations 600C associated with setting a high interference PSD level $I_{HIGH}$, in certain embodiments, the operations assume that RSRP values (e.g., UE specific feedback) and/or relative interference values (referred to interchangeable as relative RSRP) values (e.g., cell specific feedback) have been communicated to central management system 122 by all cell radios (e.g., cell radios 114a-114b) in communication system 100.

Accordingly, at 650 the operations can include determining the highest interference values reported by each cell based on UE specific feedback and/or cell specific feedback received from each cell radio in the system. In certain embodiments, the highest interference values for each cell can include signal strength values that have been determined to be above a predetermined signal strength threshold based on comparisons performed by each cell and/or relative signal strength values that have been determined to be above a relative signal strength threshold based on comparisons performed by each cell. As the reported signal strength or relative signal strength values are used to identify a number of neighbors for each cell, these values can also generally be related with the FFR region of the system bandwidth in which coordinated interference mitigation can be provided for between neighboring cells. Accordingly, at 652 the operations can include calculating an average of the highest interference vales for all cells in the system. At 654, the operations can include setting the high interference PSD level to the calculated average and the operations may end. In certain embodiments, such as, for example, embodiments in which resource adaptation can be provided by communication system 100, the operations can involve including the high interference PSD level in uplink ICIC parameters at 656 to be communicated to the cells.

Turning to FIG. 7, FIG. 7 is a simplified flow diagram illustrating example operations 700 associated with determining one or more uplink ICIC parameters including a number of resources to be scheduled in the FFR region of the frequency spectrum and determining fractions of resources that are to be scheduled in various RB regions of the frequency spectrum for providing uplink ICIC in accordance with one potential embodiment of communication system 100. In various embodiments, the operations can be performed via central management system 122 based on feedback information received from one or more cell radios (e.g., cell radios 114a-114b) of communication system 100.

At any time, uplink transmissions can be scheduled for user equipment connected among one or more neighboring cells (e.g., cell radios 114a-114b) of communication system 100. Accordingly, the operations can begin at 702 in which a number of neighbors for each cell in the system can be determined based on feedback information received from the cells in which the feedback information can include signal strength information associated with the cells in communication system 100. In various embodiments, the feedback information can include UE specific feedback information and/or cell specific feedback information, as described herein.

At 704, the operations can include determining a high percentile of the number of neighbors for the cells. In various embodiments, the high percentile can be a 90th percentile or more. At 706, the operations can include determining a number of resource blocks to be scheduled in the (H,L) and (L,H) regions combined (e.g., the FFR portion of the spectrum) and the fraction of resource blocks to be scheduled for the (H,L) region ($\rho_{HL}$), the fraction of resource blocks to be scheduled for the (L,H) region ($\rho_{LH}$), the fraction of resource blocks to be scheduled for the (M,M) region ($\rho_{MM}$) and the fraction of resource blocks to be scheduled for the (L,L) region ($\rho_{LL}$) using a system of equations relating the resource fractions, the system bandwidth and the high percentile number of neighbors for the cells. In various embodiments, the system of equations can be any combination of Equations 1-4, discussed above, including any manipulations, estimations, derivations and/or generalizations thereof to determine the number of RBs for the (H,L) and (L,H) regions (e.g., the FFR region) and the fraction of resource blocks to be scheduled for each region.

At 708, the operations can involve including the number of RBs for the FFR region and one or more of the fraction of RBs to be scheduled in each RB region in the uplink ICIC parameters, which can be communicated to the cell radios in the system. In various embodiments as discussed herein, the low and medium interference PSD levels can also be included in the uplink ICIC parameters.

Accordingly, as illustrated in FIGS. 6A, 6B and 7 and as further discussed through various embodiments described herein, uplink ICIC parameters can be provided to cell radios in communication system such that resource blocks can be scheduled between neighboring cell radios in both re-use one portions and FFR portions of system bandwidth in order to mitigate interference between neighboring cells. As noted previously, communication system 100 can also provide a method to enable resource adaptation for frequency domain uplink ICIC to provide for the dynamic allocation and re-allocation of system bandwidth between re-use one and FFR frequencies for scheduling resources for each cell radio in the system in order to optimize the sum of total utilities, as a function of UE throughput rates, across all cells in the system or in a given cluster of cells.

Figure 8:
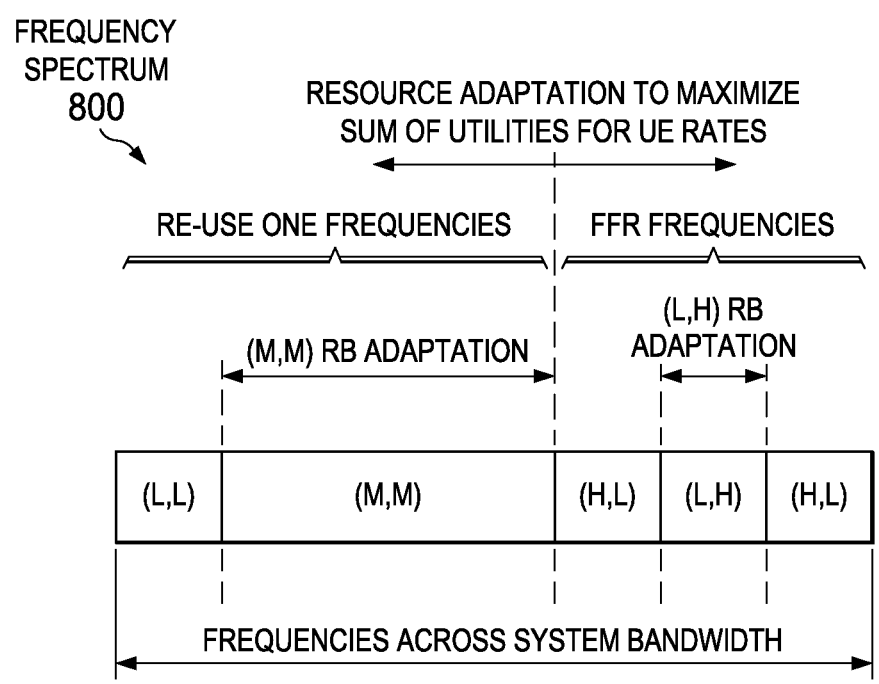
FIG. 8 is a simplified schematic diagram illustrating other example details associated with an example frequency spectrum that can be associated with the communication system in accordance with one potential embodiment of the communication system.

Referring to FIG. 8, FIG. 8 is a simplified schematic diagram illustrating other example details associated with another example frequency spectrum 800 that can be associated with communication system 100 in accordance with one potential embodiment of the communication system. Similar to example frequency spectrum 180 as shown in FIG. 1C, example frequency spectrum 800 can represent the spectrum of frequencies across the system bandwidth including four, two-tuple RB regions (L,L), (M,M), (H,L) and (L,H) with each region being associated with a fraction of resources $\rho_{LL}$, $\rho_{MM}$, $\rho_{HL}$, and $\rho_{LH}$, respectively. Example frequency spectrum 800 shown in FIG. 8 is similar in all respects to example frequency spectrum 180 shown in FIG. 1C, except that additional features related to resource adaptation, which can be provided by communication system 100 in various embodiments, are also illustrated in FIG. 8.

For example, FIG. 8 illustrates that the portions of frequency spectrum 800 allocated between re-use one frequencies and FFR frequencies can be adapted to maximize the sum of utilities for UE rates for all UEs (e.g., UE 112a-112d) served by cell radios (e.g., cell radios 114a-114b) in communication system 100. In various embodiments, resource adaptation between the re-use one frequencies and FFR frequencies can be provided by adapting the number of RBs that are to be scheduled in the (M,M) RB region and the number of resources that are to be scheduled in the (L,H) RB region.

In various embodiments, communication system 100 can provide techniques to maximize UE throughput rates for all UEs served by cell radios in communication system 100 by adapting the fraction of resources that are to be scheduled in the (M,M) and (L,H) regions. Generally, the resource adaptation techniques can include determining an optimal value of which maximizes UE throughput rates across all cell radios in the communication system for both interior UEs and cell edge UEs served by the cell radios.

In various embodiments, determining an optimized value of κ can include one or both of: (1) solving, by each cell radio, a low complexity optimization problem for different values of κ based on a selected utility function for UE throughput rates to determine an optimum value of κ that maximizes total network performance across all cell radios according to the selected utility function; and/or (2) determining, by each cell radio for each UE served by the cell radio, a number of RBs assigned to UEs in each of the (M,M) and (L,H) regions in association with an expected MCS determined for each UE for the (M,M) region compared to a minimum MCS threshold and adapting the value of κ towards an optimum value to maximize total network performance for UE throughput rates across all cell radios in the system.

As noted, the optimization problem can be associated with a selected utility function. In various embodiments, a utility function for UE rates can be expressed as $U(r_i)$, where 'i' represents a UE index and '$r_i$' is an average throughput rate for the associated UE. In various embodiments, the optimization may be solved to determine a maximum total sum of utilities for UE rates $U(r_i)$, which can be expresses as 'max. $\Sigma_i U(r_i)$' for all UE in the system. In various embodiments, the choice of utility function for the optimization problem can be selected by a network operator or service provider according to a desired outcome representing a tradeoff between fairness and system capacity.

In at least one embodiment, a total sum of a logarithmic function (LOG) of average UE throughput rates, which can be expressed as '$\Sigma_i LOG(r_i)$' for all UE in the system can be selected for the utility function if the desire is to maximize fairness of average UE throughput rates versus system capacity. This utility function is typically referred to as a proportional fair metric. In another embodiment, a total sum of average UE throughput rates, which can be expressed as '$\Sigma_i(r_i)$' can be selected for the utility function if the desire is to maximize average UE throughput rates. In another embodiment, a total sum of weighted exponentials of average UE throughput rates, which can be expressed as $\Sigma_i(1/r_i)^m$, can be selected if maximizing fairness of average UE throughput rates is most important. For the weighted exponentials utility function, increasing the value of 'm' can provide for more fair (e.g., more equal) UE throughput rates. In at least one embodiment, the utility function selected for optimizing κ can include maximizing the total sum of utilities for UE rates (e.g., max. $\Sigma_i U(r_i)$) across all UEs for all cell radios in the system to provide a tradeoff between fairness and capacity of total network performance. Thus, it should be understood that choice of utility function can be varied based on the desires of a network operator and/or service provider based on network fairness, capacity, throughput rates, combinations thereof or the like.

Accordingly, in certain embodiments, each cell radio can compute a solution to the optimization problem as represented as max. $\Sigma_i U(r_i)$ using different values of κ for a selected utility function, e.g., $\Sigma_i U(r_i) = \Sigma_i LOG(r_i)$, $\Sigma_i U(r_i) = \Sigma_i (1/r_i)^n$, $\Sigma_i U(r_i) = \Sigma_i (r_i)$ or other similar utility function. The different values of κ for which utility for achievable UE rates can be evaluated by each cell radio can be referred to herein as temporary values of κ. Generally during operation in at least one embodiment, each of a given cell radio of communication system 100 can compute a total sum of achievable UE rates for all UEs served by the cell radio using a weighted sum of each UEs rates for a corresponding temporary value of κ. For example, a given cell radio (e.g., cell radio 114a) can calculate, in an iterative manner, a sum of total utility of UE rates for different temporary values of κ for all UEs (e.g., UE 112a-112b) served by the cell radio. As κ effects the number of RBs in the (M,M), (L,H) and (H,L) regions as illustrated by the relationship shown in Equation 4, the utility of achievable UE throughput rates for each UE served by the cell radio can vary depending on the number of RBs allocated to each RB region.

For example, consider a certain temporary value of κ, which causes UEs served by one particular cell radio to be starved for resources. This could result in a low total sum of utility of UE throughput rates for the cell radio for the corresponding temporary value of κ. In contrast, consider an example in which a particular temporary value of κ results in UEs served by the cell radio to achieve average UE throughput rates. This could result in an increased total sum utility of UE throughput rates for the cell radio for the corresponding temporary value of κ. In this manner, each cell radio in communication system 100 can calculate a total sum of utility of UE throughput rates for different temporary values of κ in various embodiments.

In at least one embodiment, upon calculating a sum of total utility for achievable UE rates across all the temporary values of κ, each cell radio (e.g., cell radio 114a-114b) can determine a maximum total sum of utility of UE throughput rates and an associated temporary value of κ associated thereto. In effect, each cell determines an optimal feasible UE throughput rate for an optimal total sum of utility as a function of κ. Note, as used herein in this Specification, the terms 'effective', 'feasible' and 'achievable' can be used interchangeably in reference to 'UE rates' or 'UE throughput rates', which can also be used interchangeably.

In certain embodiments, each cell radio can communicate the maximum total sum of utility and corresponding temporary value of κ to central management system 122. In certain embodiments, central management system can search maximum total sum of utilities for each cell radio and each corresponding temporary value of κ to determine the optimal utility or optimal effective throughput rate for all UEs across all cell radios in order to maximize total network performance. Upon determining the optimal utility/optimal effective throughput rate for all UEs across all cell radios, central management system 122 can use the associated temporary value of κ to set the ratio of $(\rho_{HL}+\rho_{LH})/\rho_{MM}$ in order to determine corresponding uplink ICIC parameters that can then be communicated to the cell radios so that they can schedule uplink transmissions according to the uplink ICIC parameters. In various embodiments, maximizing total network performance may, in effect, provide a technique to balance the allocation of the number of RBs for each RB region such that no UEs receive all the resources for a cell or are starved for resources, thereby maximizing the total sum of utilities of UE throughput for communication system 100.

As an extension of the optimization operations discussed above, in certain embodiments, central management system 122 can determine various temporary values of κ (e.g., using UE specific feedback, cell specific feedback, deployment information, etc.) and can distribute each temporary value of κ to cell radios 114a-114b to compute a total sum of utility of achievable or effective UE rates for the temporary value of κ that can then be returned to central management system 122, which can update the value of κ accordingly based on a total sum of utilities received from the cell radios and can distribute a new temporary value of κ to each cell radio 114a-114b to compute an updated total sum of utility of achievable or effective throughput rates. Operations can continue in this manner until an optimal value of κ is found.

Illustrated below is a system of equations, Equations 5-12, which can be used to solve the optimization problem, in certain embodiments, to maximize the total sum of utilities of UE throughput rates for communication system 100. Before detailing the equations, a brief discussion of various notations is provided. For example, neighboring cells are expressed as $c_1, c_1, \ldots, c_M$ for M neighboring cells; a fraction of resources assigned to each UE i in each RB region are expressed as $\alpha^{LL}(i)$, $\alpha^{MM}(i)$, $\alpha^{LH}(i)$ and $\alpha^{HL}(i)$ [note that these are represented as averages over multiple 1 msec intervals since, over a given subframe, the set of assigned RBs is contiguous]; path loss (in dB), which can be based on signal strength values (e.g., RSRP, RSRQ, etc.) from a UE i to a neighboring cell $c_i$ as $PL^{neigh}(i,j)$; a function expressed as 'ρ', which maps SINR to spectral efficiency in bits/sec/Hz; open-loop power control parameters $P_0$ and α, as defined in 3GPP TS 36.213, which are assumed to be the same for all UEs i for notational convenience [note the transmit PSD for each UE=i is $P_0+\alpha PL^{serv}(i)$, assuming the UE has a small enough RB grant such that it is not power limited]; and the number of RBs in each RB region can be expressed, as noted above, as $N_{RB}^{LL}$, $N_{RB}^{MM}$, $N_{RB}^{LH}$, and $N_{RB}^{HL}$, which can be determined based on κ and the maximum number of neighbors per cell (or a percentile of the maximum number of neighbors per cell) using one or more combinations of Equations 1-4, as discussed above.

In various embodiments, each cell radio (e.g., cell radio 114a-114b) can compute a solution the optimization problem of maximizing the total the sum utilities for achievable UE rates as characterized by the utility function, max. $\Sigma_i U(r_i)$, for each UE served by the cell over $\alpha^{LL}(i)$, $\alpha^{MM}(i)$, $\alpha^{LH}(i)$, $\alpha^{HL}(i)$, $\forall i$ based on the interface PSDs $I_{LOW}$, $I_{HIGH}$ and $I_{MED}$ which can be communicated to each cell radio 114a-114b from central management system 122 for solving the optimization problem.

In certain embodiments, a first set of equations for the optimization problem, Equations 5-8, shown below, can relate $\alpha^{LL}(i)$, $\alpha^{MM}(i)$, $\alpha^{LH}(i)$, $\alpha^{HL}(i)$, such that the total sum of fractions in each RB region is equal to one across all UEs served by a particular cell radio.

$$\Sigma_i \alpha^{LL}(i)=1 \quad \text{Equation 5}$$

$$\Sigma_i \alpha^{MM}(i)=1 \quad \text{Equation 6}$$

$$\Sigma_i \alpha^{LH}(i)=1 \quad \text{Equation 7}$$

$$\Sigma_i \alpha^{HL}(i)=1 \quad \text{Equation 8}$$

In certain embodiments, a second set of equations for the optimization problem, Equations 9-11, shown below, provide constraints on the average interference PSD to each neighboring cell radio of a particular cell radio, where guarantees are made between neighboring cells to keep interference below $I_{LOW}$, $I_{MED}$ or $I_{HIGH}$. Recall, each UE index is represented by i and each neighboring cell radio index is represented as j.

$$\Sigma_i \alpha^{LL}(i)(P_0+\alpha PL^{serv}(i)-PL^{neigh}(i,j)) \leq I_L, \forall j \quad \text{Equation 9}$$

$$\Sigma_i \alpha^{MM}(i)(P_0+\alpha PL^{serv}(i)-PL^{neigh}(i,j)) \leq I_M, \forall j \quad \text{Equation 10}$$

$$\Sigma_i \alpha^{HL}(i)(P_0+\alpha PL^{serv}(i)-PL^{neigh}(i,j)) \leq I_L, \forall j \quad \text{Equation 11}$$

In certain embodiments, another equation for the optimization problem, Equation 12, shown below can represent the feasible UE throughput for each UE expressed as a weighted sum of throughput achievable by the UE in each RB region type (e.g., (L,L), (M,M), (L,H) and (H,L)) where the number of resource blocks that can be assigned to UEs in each region (M,M), (L,H) and (H,L) are effected by different temporary values of κ, as characterized by $\kappa=(\rho_{HL}+\rho_{LH})/\rho_{MM}$ and additional relationships as can be determined and/or deduced from Equations 1-4, above. Accordingly, for each UE i, an effective rate can be determined from Equation 12.

$$r_i \leq [N_{RB}^{LL}\alpha^{LL}(i)\rho(P_0+\alpha PL^{serv}(i)-I_L)+N_{RB}^{MM}\alpha^{MM}(i)\rho(P_0+\alpha PL^{serv}(i)-I_M)+N_{RB}^{LH}\alpha^{LH}(i)\rho(P_0+\alpha PL^{serv}(i)-I_H)+N_{RB}^{HL}\alpha^{HL}(i)\rho(P_0+\alpha PL^{serv}(i)-I_L)], \forall i \quad \text{Equation 12}$$

In certain embodiments, the optimal utility for each cell radio as a function of κ can be expressed as $U^*_{c_n}(\kappa)$ for each cell radio 'n' with the total effective UE rate for the cell radio being expressed as $R^*_{c_j} = U^{-1}(U^*_{c_n}(\kappa))$.

As noted above, an adaption of κ can also be provided by communication system 100 in various embodiments, in which the value of κ can be increased or decreased based on determining, by each cell radio for each UE served by the cell radio, a number of RBs assigned to UEs in each of the (M,M) and (L,H) regions in association with an expected MCS determined for each UE for the (M,M) region compared to a minimum MCS threshold and adapting the value of κ towards an optimum value to maximize total network performance for UE throughput rates across all cell radios in the system.

Before detailing various operations associated with the adaptation of κ, consider a discussion of various use cases, which can exemplify various reasons for adapting the value of κ. For example, consider a case in which there are lots of cell edge UEs served by cell radios 114a-114b of the communication system. In such a case, if the value of κ is increased, then each cell radio would likely indicate an increase in the sum of utilities as increasing κ would allow for more RBs to be allocated in the FFR region (e.g., (H,L) and (L,H) through which interference for the cell edge UEs could be mitigated between neighboring cells via FFR exchanges for schedule UE uplink transmissions. However, consider another case in which there are few cell edge UEs served by cell radios 114a-114b. In this case, increasing the value of κ could result an increase in the sum of utilities to a certain point and then it would begin to fall as more interior UEs, which may achieve higher throughput in the (M,M) region, would be unnecessarily scheduled in the FFR region as the number of RBs that could be scheduled in the (M,M) region decreases with increasing values of κ.

Generally, the adaptation of κ, as facilitated by communication system 100, can provide a technique to relate modulation and coding scheme (MCS) with SINR and UE throughput rate, as higher orders of MCS, which can be achieved at higher SINRs, can provide for higher UE throughput rates. In various embodiments, operations for adapting the value of κ can include each cell radio, for a current value of κ: (a) determining an expected MCS for each UE in the (M,M) region when assigned a nominal number of RBs expressed as, $N_{RB}^{nom}$, say for example, 10, in order to obtain a predetermined BLER for a first transmission, (b)(i) determining a first number of RBs, denoted as $N_{RB}^{low-MCS}$, which represents the number of RBs that would be assigned to UEs in the (M,M) region having an expected MCS below a minimum MCS threshold, $MCS^{MIN}$, averaged over a certain time period and (b)(ii) determining a second number of RBs, denoted as $N_{RB}^{high-MCS}$, which represents the number of RBs assigned to UEs in the (L,H) region having an expected MCS above MCS' averaged over a certain period of time. In various embodiments, the period of time for averaging can range within a few (e.g., 1-3) seconds. In various embodiments, $MCS^{MIN}$ can be associated with an MCS that might be selected by UEs having an SINR of approximately 5-10 dB. In various embodiments, the predetermined BLER can be set to approximately 10%.

Each cell radio 114a-114b can feed back their corresponding values of $N_{RB}^{low-MCS}$ and $N_{RB}^{high-MCS}$ to central management system 122. In various embodiments, central management system 122 can determine a high percentile number of $N_{RB}^{low-MCS}$ RBs as reported in the cell radio feedback and can compare the high percentile to a first threshold. If the high percentile number of $N_{RB}^{low-MCS}$ RBs is higher than the first threshold (e.g., indicating too many resources are being allocated to the (L,H) region), the current value of κ can be reduced. By reducing the current value of κ, UEs currently being scheduled in the (L,H) region, which may actually be interior UEs not needing coordinated interference mitigation (e.g., because not enough resources are being allocated to the (M,M) region) and which might result in these UEs having little to no increase in SINR or possibly even a decrease in SINR by being scheduled in the (L,H) region, can be moved to the (M,M) region to help maximize the sum of total utilities of UE throughput for communication system 100. In at least one embodiment, the high percentile can be approximately the 90th percentile. In at least one embodiment, the first (high) threshold can be set to the minimum SINR that a network operator or service provider desires to serve UEs plus a few (e.g., 1-2) dB, which can be expressed as 'high_threshold=min_SINR+few dB'.

Central management system 122 can also determine a low percentile number of $N_{RB}^{high-MCS}$ RBs as reported in the cell radio feedback and can compare the high percentile to a second threshold. If the low percentile number of $N_{RB}^{high-MCS}$ RBs is lower than the second threshold (e.g., indicating too few resources are being allocated to the (L,H) region), the current value of κ can be increased. By increasing the current value of κ, UEs currently being scheduled in the (M,M) region, which may actually be cell edge UEs needing coordinated interference mitigation (e.g., because not enough resources are being allocated to the (L,H) region) and which might result in these UEs having a degraded SINR by being scheduled in the (M,M) region, can be moved to the (L,H) region to help maximize the sum of total utilities of UE throughput for communication system 100. In at least one embodiment, the second (low) threshold can be set to the minimum SINR that a network operator or service provider desires to serve UEs minus a few (e.g., 1-2) dB, which can be expressed as 'low_threshold=min_SINR-few dB'.

Accordingly, communication system 100 can provide a method to determine a value of κ and update the value of κ by solving a low complexity optimization problem and/or providing an adaptation of the value of κ. Any combination of determining and/or updating the value of κ can be provided within the scope of the present disclosure. For example, in at least one embodiment the optimization problem can be solved to set the value of κ, which can thereafter be updated according to the adaptation operations according to one or more predetermined time intervals or at one or more predetermined times. For example, the adaptation operations could be triggered every hour, could be triggered at certain times of the day (e.g., to coincide with peak/minimal load periods), combinations thereof or the like.

In another example, in at least one embodiment a nominal value of κ can be set (e.g., depending on deployment scenario such as macro cell or small cell), which can thereafter be updated according to the adaptation operations according to one or more predetermined time intervals or at one or more predetermined times. In another example, in at least one embodiments, the optimization problem solved to determine an initial value of κ, which can thereafter be updated by re-solving the optimization problem according to one or more predetermined time intervals or at one or more predetermined times. Thus, it should be understood that any combination of determining or updating a value for κ based on a determined nominal value, a value determined by solving the optimization problem and/or a value determined through adaptation operations can be provided within the scope of the present disclosure.

Turning to FIG. 9, FIG. 9 is a simplified flow diagram illustrating example operations 900 associated with providing resource adaptation for interference mitigation in accordance with one potential embodiment of the communication system. In various embodiments, the operations can be performed via central management system 122 and one or more cell radios (e.g., cell radios 114a-114b).

At any time, uplink transmissions can be scheduled for user equipment (e.g., UE 112a-112d) connected among one or more cells (e.g., cell radios 114a-114b) of communication system 100. Accordingly, the operations can begin at 902 in which a ratio (e.g., κ) can be determined relating a first portion of a frequency spectrum in which FFR resources are to be assigned to a second portion of the frequency spectrum in which re-use one resources are to be assigned for one or more user equipment (e.g., UE 112a-112b) served by the cells. In certain embodiments, the first portion of the frequency spectrum can be associated with (L,H) and (H,L) RB regions of the spectrum and the second portion can be associated with the (M,M) region of the spectrum. In various embodiments, determining the ratio can include setting a value for the ratio to a nominal value based on a deployment characteristic of the cell radios, solving the optimization problem by each of the cell radios and determining a value of κ that maximizes a total sum of utilities of UE throughput rates.

At 904, the operations can include updating the ratio relating the first portion and the second portion of the frequency spectrum to optimize throughput rates for the user equipment across the plurality of cells and the operations may end. In various embodiments, updating the ratio can include solving the optimization problem by each of the cell radios and determining a value of κ that maximizes a total sum of utilities of UE throughput rates and/or adapting the value of κ through various adaptation operations to increase or decrease the value of κ based on various RB and/or MCS relationships, as discussed herein.

In certain embodiments, the operations can include waiting one or more predetermined time intervals, one or more predetermined times, combinations thereof or the like at 906 and can repeat the updating (return to 904). In various embodiments, total network performance can be maximized be determining and updating the ratio of resources to be allocated between the re-use one portions and FFR portions of the frequency spectrum.

Turning to FIG. 10, FIG. 10 is a flow diagram illustrating example operations 1000 associated with providing resource adaptation for interference mitigation by solving an optimization problem to maximize a total sum of utilities of UE throughput rates across all cell radios (e.g., cell radios 114a-114b) of communication system 100 in accordance with one potential embodiment of communication system 100. In various embodiments, the operations can be performed via central management system 122 and one or more cell radios (e.g., cell radios 114a-114b).

At any time, uplink transmissions can be scheduled for user equipment (e.g., UE 112a-112d) connected among one or more cells (e.g., cell radios 114a-114b) of communication system 100. Accordingly, the operations can begin at 1002 in which each cell radio of the communication system can calculate a total sum of utilities of achievable throughput rates for each UE served by the cell radio for each of one or more values of κ for a utility function, e.g., $\Sigma_i U(r_i) = \Sigma_i LOG(r_i), \Sigma_i U(r_i) = \Sigma_i (1/r_i)^n$, or $\Sigma_i U(r_i) = \Sigma_i (r_i)$. In various embodiments, the calculation can be based on the optimization problem as described above via Equations 5-12. In various embodiments, a given utility function can be selected based on the desires of a network operator and/or service provider, e.g., using a proportional fair metric, maximizing fairness, maximizing average throughput rate, combinations thereof or the like. With regard to the optimization problem, the one or more values of κ can be referred to as temporary values of κ.

At 1004, the operations can include communicating, by each cell radio, the total sum of utilities of achievable throughput for each value of κ to central management system 122. In various embodiments, the results of the calculations can be communicated at the end of each calculation for each value of κ or following the calculations for all values of κ. At 1006, the operations can include calculating, by central management system 122, a total sum of utilities of achievable throughput by accumulating the values as reported by each cell radio for each value of κ. At 1008, the operations can include determining a maximum total sum of utilities for a corresponding value of κ from the values reported to and accumulated by central management system. At 1010, the operations can include setting the value κ that is to be used in determining uplink ICIC parameters (e.g., according to Equations 1-4, setting $I_{LOW}$, $I_{MED}$, etc. as discussed herein) to the corresponding value of κ associated with the maximized or optimum total sum of utilities for all cell radios and the operations may end.

Accordingly, communication system 100 can provide a method for setting and/or updating the value of κ by solving an optimization problem by each cell radio and determining a maximum total sum of utilities of achievable throughput across all cell radios in the communication system.

Turning to FIG. 11, FIG. 11 is a flow diagram illustrating example operations 1100 associated with providing resource adaptation for interference mitigation through an adaptation of κ to maximize UE throughput rates across all cell radios (e.g., cell radios 114a-114b) of communication system 100 in accordance with one potential embodiment of communication system 100. In various embodiments, the operations can be performed via central management system 122 and one or more cell radios (e.g., cell radios 114a-114b).

At any time, uplink transmissions can be scheduled for user equipment (e.g., UE 112a-112d) connected among one or more cells (e.g., cell radios 114a-114b) of communication system 100. Accordingly, the operations can begin at 1102 in which each cell radio may determine an expected MCS for each user equipment served by the cell radio when assigned a nominal number of RBs in order to obtain a predetermined BLER for a first transmission by each UE served by the cell. In various embodiments, the nominal number of RBs can be approximately 10 and the predetermined BLER can be approximately 10%. However, it should be understood that these values can be adjusted accordingly within the scope of the present disclosure.

At 1104, the operations can include each cell determining a number of RBs in the (M,M) region of the frequency spectrum (e.g., system bandwidth) assigned to user equipment having an expected MCS below a minimum MCS threshold. In various embodiments, the determination of the number of RBs in the (M,M) region having an expected MCS below the minimum MCS threshold can be performed after scheduling uplink UE transmissions according to uplink ICIC parameters received from central management system 122. In various embodiments, the determination of the number of RBs in various regions (e.g., M,M) can be adapted in a time-scale of minutes, for example, ranging from approximately 1-60 minutes. In various embodiments, the minimum MCS threshold can be set to the MCS that is feasible at 5-10 dB.

At 1106, the operations can include each cell determining a number of RBs in the (L,H) region of the frequency spectrum assigned to user equipment having an expected MCS above the minimum MCS threshold. In various embodiments, the determination can be averaged over a similar time frame as discussed for the operations at 1104. At 1108, the operations can include reporting the number of RBs below/above the minimum MCS threshold for the (M,M) and (L,H) regions to central management system 122.

It should be noted that operations 1110, 1114, 1118 and 1122 and operations 1112, 1116, 1120 and 1124 described for the remainder of FIG. 11 can be performed in parallel with each other. At 1110, the operations can include determining a low percentile number of RBs below the MCS threshold as reported by the cell radios for the (M,M) region. In various embodiments, the low percentile number of RBs can correspond to approximately the bottom 10th percentile of the number of RBs below the minimum MCS threshold as reported by the cell radios for the (M,M) region. At 1112, the operations can include determining a high percentile number of RBs above the minimum MCS threshold as reported by the cell radios for the (L,H) region. In various embodiments, the high percentile number of RBs can correspond to approximately the top 90th percentile of the number of RBs above the minimum MCS threshold as reported by the cell radios for the (L,H) region.

At 1114, the operations can include comparing the low RB percentile number to a low RB number threshold to determine at 1118 whether the low percentile number determined at 1110 is less than a low RB threshold number of RBs. If so, the operations can continue to 1122 in which the value of κ can be increased and the operations can end. If not, the operations can continue to 1126 in which no κ value changes are carried out. At 1116, the operations can include comparing the high RB percentile number of RBs to a high RB number threshold to determine at 1120 whether the high RB percentile number of RBs is greater than the high RB number threshold. If so, the operations can include reducing the value of κ at 1124 and the operations may end. If not, the operations can continue to 1126 in which no κ value changes are carried out.

Accordingly, communication system 100 can provide a method for updating the value of κ by performing an adaptation of κ using RB assignment and MCS comparison information reported by each cell radio in order to maximize UE throughput across all cell radios by adjusting the ratio of RBs that can be allocated between the re-use one and FFR regions of the frequency spectrum.

Figure 12A:
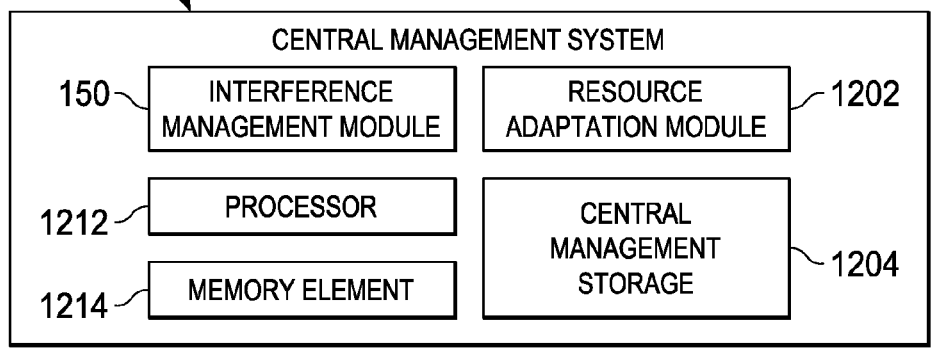
FIGS. 12A-12C are simplified block diagrams illustrating additional details associated with various potential embodiments of the communication system.
Figure 12B:
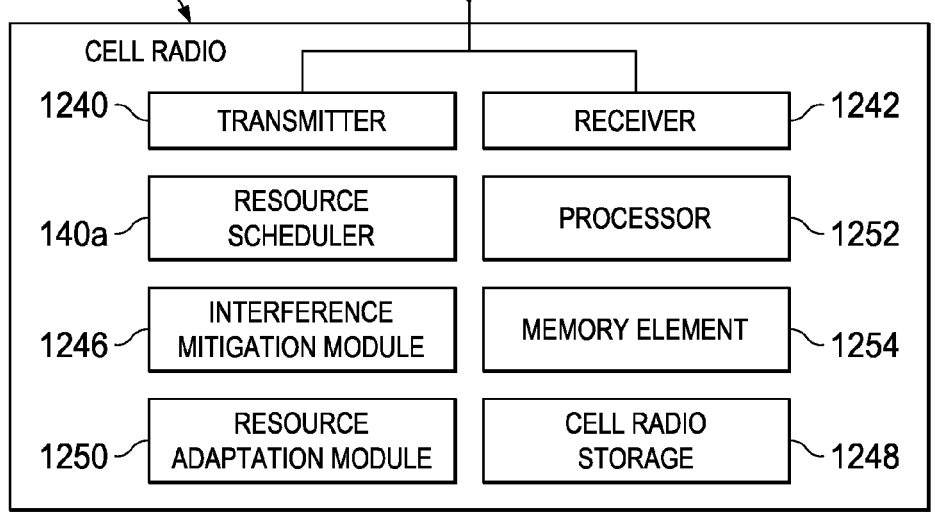
Figure 12C:
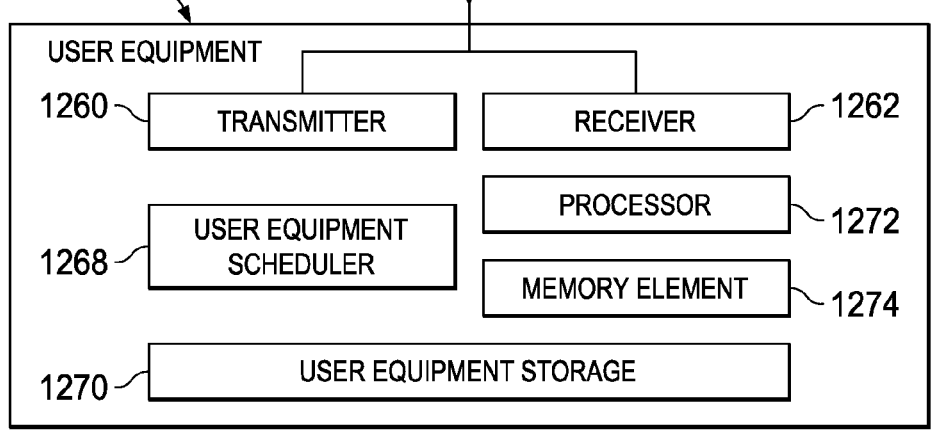

Turning to FIGS. 12A-12C, FIGS. 12A-12C are simplified block diagrams illustrating example details of various elements that can be associated with communication system 100 in accordance with one or more embodiments. FIG. 12A is a simplified block diagram illustrating example details that can be associated with central management system 122 in accordance with one embodiment of communication system 100. FIG. 12B is a simplified block diagram illustrating example details that can be associated with cell radio 114a in accordance with one embodiment of communication system 100. FIG. 12C is a simplified block diagram illustrating example details that can be associated with UE 112a in accordance with one embodiment of communication system 100. Although FIG. 12B describes features related to cell radio 114a, it should be understood that the features as described for cell radio 114a can also be provided with respect to cell radio 114b. Similarly, although FIG. 12C describes features related to UE 112a, it should be understood that the features as described for UE 112a can also be provided with respect to UE 112b-112d.

As shown in FIG. 12A, central management system 122 can include interference management module 150, a resource adaptation module 1202, a central management storage 1204, a processor 1212 and a memory element 1214. In at least one embodiment, processor 1212 is a hardware processor configured to execute various tasks, operations and/or functions of central management system 122 as described herein and memory element 1214 is configured to store data associated with central management system 122. In at least one embodiment interference management module 150 is configured to implement various interference mitigation operations as described herein for central management system 122, such as, for example, determining uplink ICIC parameters for cell radios 114a-114b. In various embodiments, resource adaptation module 1202 is configured to implement various resource adaptation operations as described herein for central management system 122, such as, for example, setting and/or updating a value for κ according to the optimization problem operations and/or updating a value of κ according the adaptation operations as described herein. In various embodiments, central management storage 1204 can be configured to store information associated with various interference mitigation and/or resource adaptation operations as described herein including, but not limited to, CRS power of cell radios in communication system 100, UE specific feedback received from cell radios, cell specific feedback received from cell radios, uplink ICIC parameters for cell radios, combinations thereof or the like.

As shown in FIG. 12B, cell radio 114a can include resource scheduler 140a, a transmitter 1240, a receiver 1242, one or more antenna(s) 1244, an interference mitigation module 1246, a cell radio storage 1248, a resource adaptation module 1250, a processor 1252 and a memory element 1254. In at least one embodiment, processor 1252 is a hardware processor configured to execute various tasks, operations and/or functions of cell radio 114a as described herein and memory element 1254 is configured to store data associated with cell radio 114a. In at least one embodiment, resource scheduler 140a and interference mitigation module 1246 are configured to implement various resource scheduling operations as described herein such as, for example, scheduling uplink transmissions for one or more UE (e.g., UE 112a-112b) in accordance with various interference mitigation operations, including, but not limited to, FFR exchanges via the X2 interface to coordinate uplink transmissions for the FFR region of the frequency spectrum and/or scheduling re-use one resources in the re-use one region of the frequency spectrum. In various embodiments, resource scheduler 140a can also be configured to schedule downlink resources for transmitting downlink resources to one or more UE. In at least one embodiment, resource adaptation module 1250 is configured to implement various resource adaptation operations as described herein for cell radio 114a, such as, for example, solving an optimization problem, as described herein, to determine a total sum of maximized utilities of throughput rates for one or more UE (e.g., UE 112a-112b) served by cell radio 114a for a selected utility function across various temporary values of κ, communicating the maximized utilities to central management system 122 and/or providing RB information associated with various MCS information, which can be communicated to central management system 122. In various embodiments, cell radio storage 1248 can be configured to store information associated with various resource scheduling, interference mitigation and/or resource adaptation operations including, but not limited to, CRS power of neighboring cell radios, UE specific and/or cell specific feedback for communicating to central management system 122, uplink ICIC parameters received from central management system 122, interference mitigation FFR scheduling information obtained via HII messages exchanged with neighboring cell radios, combinations thereof or the like. In various embodiments, transmitter 1240 and receiver 1242 can be connected to one or more antennas 1244 to facilitate the transmission and/or reception of cellular data and/or information to/from one or more UE (e.g., UE 112a-112b) served by cell radio 114a using one or more over-the-air control channels, data channels, combinations thereof or the like as prescribed by 3GPP standards.

As shown in FIG. 12C, UE 112a can include a user equipment scheduler 1268, a transmitter 1260, a receiver 1262, one or more antenna(s) 1264, a user equipment storage 1270, a processor 1272 and a memory element 1274. In at least one embodiment, processor 1272 is a hardware processor configured to execute various tasks, operations and/or functions of UE 112a as described herein and memory element 1274 is configured to store data associated with UE 112a. In at least one embodiment, user equipment scheduler 1268 is configured to implement various operations as described herein such as, for example, preparing uplink transmissions according to uplink grant(s) received from cell radio 114a for scheduled uplink transmissions that can provide interference mitigation between one or more neighboring cell radios. In various embodiments, user equipment storage 1270 can be configured to store information associated with UE 112a for the operation of UE 112a. In various embodiments, transmitter 1260 and receiver 1262 can be connected to one or more antennas 1264 to facilitate the transmission and/or reception of cellular data and/or information to/from one or more cell radios (e.g., cell radio 114a) using one or more over-the-air control channels, data channels, combinations thereof or the like as prescribed by 3GPP standards.

In regards to the internal structure associated with communication system 100, each of UE 112b-112d and cell radio 114b may each also include a respective processor and a respective memory element. Cell radio 114b can additionally include one or more transmitters, receivers and/or antennas to facilitate over-the-air communications. Hence, appropriate software, hardware and/or algorithms are being provisioned in UEs 112a-112d, cell radios 114a-114b and central management system 122 in order to facilitate interference mitigation and/or resource adaptation across cell radios 114a-114b of communication system 100 using a hybrid of centralized and distributed interference mitigation techniques for uplink UE transmissions. Note that in certain examples, certain databases (e.g., for storing information associated with interference control and/or management for communication system 100) can be consolidated with memory elements (or vice versa), or the storage can overlap/exist in any other suitable manner.

In one example implementation, UE 112a-112d, cell radio 114a-114b and central management system 122 are network elements, which are meant to encompass network appliances, servers, routers, switches, gateways, bridges, load-balancers, firewalls, processors, modules, or any other suitable device, component, element, or object operable to exchange information that facilitates or otherwise helps coordinate interference mitigation operations and/or resource adaptation operations (e.g., for networks such as those illustrated in FIGS. 1 and 2). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these devices may include any suitable algorithms, hardware, software, components, modules, interfaces, or objects that facilitate the operations thereof. This may be inclusive of appropriate algorithms and communication protocols that allow for the effective exchange of data or information.

In various embodiments, UE 112a-112d, cell radios 114a-114b and central management system 122 may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element'. The information being tracked or sent to UE 112a-112d, cell radio 114a-114b and central management system 122 could be provided in any database, register, control list, cache, or storage structure: all of which can be referenced at any suitable timeframe. Any such storage options may be included within the broad term 'memory element' as used herein. Similarly, any of the potential processing elements, modules, and machines described herein should be construed as being encompassed within the broad term 'processor'. Each of the network elements and user equipment can also include suitable interfaces for receiving, transmitting, and/or otherwise communicating data or information in a network environment. It should be noted that each cell radio 210-213, as shown in FIG. 2, can be configured similarly to each cell radio 114a-114b, as shown in FIG. 1, in all respects with regard to the operations, tasks and/or or functions described herein as well as including a respective processor, a respective memory element, a respective cell radio storage, a respective resource scheduler, a respective resource adaptation module, a respective transmitter, a respective receiver and one or more respective antenna(s) as described herein.

Note that in certain example implementations, the interference mitigation functions and/or resource adaptation functions as outlined herein (e.g., for providing for uplink ICIC) may be implemented by logic encoded in one or more tangible media, which may be inclusive of non-transitory media (e.g., embedded logic provided in an ASIC, in digital signal processing (DSP) instructions, software [potentially inclusive of object code and source code] to be executed by a processor, or other similar machine, etc.). In some of these instances, memory elements [as shown in FIGS. 12A-12C] can store data used for the operations described herein. This includes the memory elements being able to store software, logic, code, or processor instructions that are executed to carry out the activities described herein. A processor can execute any type of instructions associated with the data to achieve the operations detailed herein. In one example, the processors [as shown in FIGS. 12A-12C] could transform an element or an article (e.g., data, information) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP processor, an EPROM, an electrically erasable PROM (EEPROM) or an ASIC that includes digital logic, software, code, electronic instructions, or any suitable combination thereof.

Note that in this Specification, references to various features (e.g., elements, structures, modules, components, steps, operations, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module as used herein this Specification, can be inclusive of an executable file comprising instructions that can be understood and processed on a computer, and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 100 may be applicable to other exchanges or routing protocols. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   determining a ratio relating a first portion of a frequency spectrum in which fractional frequency re-use (FFR) resources are to be assigned to a second portion of the frequency spectrum in which re-use one resources are to be assigned, wherein the FFR resources and the re-use one resources are associated with uplink transmissions for a plurality of user equipment across a plurality of cells in a communication system;
   updating the ratio relating the first portion and the second portion of the frequency spectrum to optimize throughput rates for the plurality of user equipment across the plurality of cells, wherein at least one of determining the ratio or updating the ratio includes maximizing a total sum of utilities of throughput rates for the user equipment across the plurality of cells for a particular utility function, wherein the maximizing further comprises:
      calculating, by each cell of the plurality of cells, a per cell total sum of utilities for achievable throughput rates for a plurality of user equipment served by each cell for each of a plurality of possible values of the ratio;
      communicating, by each cell of the plurality of cells, the per cell total sum of utilities for achievable throughput rates to a central management system for each of the plurality of possible values of the ratio;
      calculating a total sum of utilities across the plurality of cells based on the per cell total sum of utilities for each of the plurality of possible values of the ratio;
      determining, by the central management system, a maximum total sum of utilities and a particular value of the ratio associated with the maximum total sum of utilities; and
      setting the ratio equal to the particular value of the ratio associated with the maximum total sum of utilities;
   determining one or more uplink inter cell interference coordination (ICIC) parameters for the plurality of cells based on the ratio; and
   scheduling uplink transmissions for user equipment served by the plurality of cells based, at least in part, on the uplink ICIC parameters.

2. The method of claim 1, wherein the particular utility function is based on one of:
   a total sum of a logarithmic function of average throughput rates for the user equipment;
   a total sum of a weighted exponential function of average throughput rates for the user equipment; and
   a total sum of average throughput rates for the user equipment.

3. The method of claim 1, wherein calculating the per cell total sum of utilities for achievable throughput rates for the plurality of user equipment served by a particular cell further comprises:

calculating a weighted sum of throughput rates achievable for each user equipment served by the particular cell in relation to a number of resource blocks that can be allocated in a plurality of resource block regions of the frequency spectrum and wherein the number of resource blocks that can be allocated in one or more of the resource block regions is varied according to each of the plurality of possible values of the ratio; and accumulating weighted sums of throughput rates achievable for all user equipment served by the particular cell according to each of the plurality of possible values of the ratio to determine a total sum of utility of throughput rates for all user equipment served by the cell for each of the plurality of possible values of the ratio.

4. The method of claim 1, wherein updating the ratio further comprises:
determining, by each cell of the plurality of cells, a first modulation and coding scheme (MCS) for each of a plurality of user equipment served by each cell in a first resource block region of the frequency spectrum.

5. The method of claim 4, further comprising:
determining, by each cell of the plurality of cells, a first number of resource blocks in the first resource block region assigned to user equipment that have a corresponding first MCS below a predetermined MCS threshold; and
determining, by each cell of the plurality of cells, a second number of resource blocks in a second resource block region assigned to user equipment that have a corresponding first MCS above the predetermined MCS threshold.

6. The method of claim 5, further comprising:
communicating, by each cell of the plurality of cells, the first number of resource blocks and the second number of resource blocks to a central management system;
increasing the ratio based on a determination that a low percentile of the first number of resource blocks communicated by each of the plurality of cells is below a first predetermined resource block threshold; and
reducing the ratio based on a determination that a high percentile of the second number of resource blocks communicated by each of the plurality of cells is above a second predetermined resource block threshold.

7. The method of claim 5, wherein the predetermined MCS threshold is associated with a predetermined signal-to-interference-noise ratio (SINR) associated with interference between neighboring cells of the plurality of cells in the communication system.

8. One or more non-transitory tangible media encoding logic that includes instructions for execution by a processor, wherein the execution causes the processor to perform operations, comprising:
determining a ratio relating a first portion of a frequency spectrum in which fractional frequency re-use (FFR) resources are to be assigned to a second portion of the frequency spectrum in which re-use one resources are to be assigned, wherein the FFR resources and the re-use one resources are associated with uplink transmissions for a plurality of user equipment across a plurality of cells in a communication system;
updating the ratio relating the first portion and the second portion of the frequency spectrum to optimize throughput rates for the plurality of user equipment across the plurality of cells, wherein at least one of determining the ratio or updating the ratio includes maximizing a total sum of utilities of throughput rates for the user equipment across the plurality of cells for a particular utility function, wherein the maximizing further comprises:
calculating, by each cell of the plurality of cells, a per cell total sum of utilities for achievable throughput rates for a plurality of user equipment served by each cell for each of a plurality of possible values of the ratio;
communicating, by each cell of the plurality of cells, the per cell total sum of utilities for achievable throughput rates to a central management system for each of the plurality of possible values of the ratio;
calculating a total sum of utilities across the plurality of cells based on the per cell total sum of utilities for each of the plurality of possible values of the ratio;
determining, by the central management system, a maximum total sum of utilities and a particular value of the ratio associated with the maximum total sum of utilities; and
setting the ratio equal to the particular value of the ratio associated with the maximum total sum of utilities;
determining one or more uplink inter cell interference coordination (ICIC) parameters for the plurality of cells based on the ratio; and
scheduling uplink transmissions for user equipment served by the plurality of cells based, at least in part, on the uplink ICIC parameters.

9. The media of claim 8, wherein calculating the per cell total sum of utilities for achievable throughput rates for the plurality of user equipment served by a particular cell further comprises:
calculating a weighted sum of throughput rates achievable for each user equipment served by the particular cell in relation to a number of resource blocks that can be allocated in a plurality of resource block regions of the frequency spectrum and wherein the number of resource blocks that can be allocated in one or more of the resource block regions is varied according to each of the plurality of possible values of the ratio; and
accumulating weighted sums of throughput rates achievable for all user equipment served by the particular cell according to each of the plurality of possible values of the ratio to determine a total sum of utility of throughput rates for all user equipment served by the cell for each of the plurality of possible values of the ratio.

10. The media of claim 8, wherein updating the ratio further comprises:
determining, by each cell of the plurality of cells, a first modulation and coding scheme (MCS) for each of a plurality of user equipment served by each cell in a first resource block region of the frequency spectrum.

11. The media of claim 10, wherein the execution causes the processor to perform further operations, comprising:
determining, by each cell of the plurality of cells, a first number of resource blocks in the first resource block region assigned to user equipment that have a corresponding first MCS below a predetermined MCS threshold; and
determining, by each cell of the plurality of cells, a second number of resource blocks in a second resource block region assigned to user equipment that have a corresponding first MCS above the predetermined MCS threshold.

12. The media of claim 11, wherein the execution causes the processor to perform further operations, comprising:

communicating, by each cell of the plurality of cells, the first number of resource blocks and the second number of resource blocks to a central management system;

increasing the ratio based on a determination that a low percentile of the first number of resource blocks communicated by each of the plurality of cells is below a first predetermined resource block threshold; and reducing the ratio based on a determination that a high percentile of the second number of resource blocks communicated by each of the plurality of cells is above a second predetermined resource block threshold.

13. The media of claim 8, wherein the particular utility function is based on one of:
   a total sum of a logarithmic function of average throughput rates for the user equipment;
   a total sum of a weighted exponential function of average throughput rates for the user equipment; and
   a total sum of average throughput rates for the user equipment.

14. The media of claim 11, wherein the predetermined MCS threshold is associated with a predetermined signal-to-interference-noise ratio (SINR) associated with interference between neighboring cells of the plurality of cells in the communication system.

15. A system comprising:
   at least one memory element for storing data; and
   at least one processor for executing instructions associated with the data, wherein the executing causes the system to perform operations, comprising:
      determining a ratio relating a first portion of a frequency spectrum in which fractional frequency re-use (FFR) resources are to be assigned to a second portion of the frequency spectrum in which re-use one resources are to be assigned, wherein the FFR resources and the re-use one resources are associated with uplink transmissions for a plurality of user equipment across a plurality of cells in a communication system;
      updating the ratio relating the first portion and the second portion of the frequency spectrum to optimize throughput rates for the plurality of user equipment across the plurality of cells, wherein at least one of determining the ratio or updating the ratio includes maximizing a total sum of utilities of throughput rates for the user equipment across the plurality of cells for a particular utility function, wherein the maximizing further comprises:
      calculating, by each cell of the plurality of cells, a per cell total sum of utilities for achievable throughput rates for a plurality of user equipment served by each cell for each of a plurality of possible values of the ratio;
      communicating, by each cell of the plurality of cells, the per cell total sum of utilities for achievable throughput rates to a central management system for each of the plurality of possible values of the ratio;
      calculating a total sum of utilities across the plurality of cells based on the per cell total sum of utilities for each of the plurality of possible values of the ratio;
      determining, by the central management system, a maximum total sum of utilities and a particular value of the ratio associated with the maximum total sum of utilities; and
      setting the ratio equal to the particular value of the ratio associated with the maximum total sum of utilities;
      determining one or more uplink inter cell interference coordination (ICIC) parameters for the plurality of cells based on the ratio; and
      scheduling uplink transmissions for user equipment served by the plurality of cells based, at least in part, on the uplink ICIC parameters.

16. The system of claim 15, wherein calculating the per cell total sum of utilities for achievable throughput rates for the plurality of user equipment served by a particular cell further comprises:
   calculating a weighted sum of throughput rates achievable for each user equipment served by the particular cell in relation to a number of resource blocks that can be allocated in a plurality of resource block regions of the frequency spectrum and wherein the number of resource blocks that can be allocated in one or more of the resource block regions is varied according to each of the plurality of possible values of the ratio; and
   accumulating weighted sums of throughput rates achievable for all user equipment served by the particular cell according to each of the plurality of possible values of the ratio to determine a total sum of utility of throughput rates for all user equipment served by the cell for each of the plurality of possible values of the ratio.

17. The system of claim 15, wherein updating the ratio further comprises:
   determining, by each cell of the plurality of cells, a first modulation and coding scheme (MCS) for each of a plurality of user equipment served by each cell in a first resource block region of the frequency spectrum.

18. The system of claim 17, wherein the executing causes the system to perform further operations, comprising:
   determining, by each cell of the plurality of cells, a first number of resource blocks in the first resource block region assigned to user equipment that have a corresponding first MCS below a predetermined MCS threshold; and
   determining, by each cell of the plurality of cells, a second number of resource blocks in a second resource block region assigned to user equipment that have a corresponding first MCS above the predetermined MCS threshold.

19. The system of claim 18, wherein the executing causes the system to perform further operations, comprising:
   communicating, by each cell of the plurality of cells, the first number of resource blocks and the second number of resource blocks to a central management system;
   increasing the ratio based on a determination that a low percentile of the first number of resource blocks communicated by each of the plurality of cells is below a first predetermined resource block threshold; and
   reducing the ratio based on a determination that a high percentile of the second number of resource blocks communicated by each of the plurality of cells is above a second predetermined resource block threshold.

20. The system of claim 19, wherein the predetermined MCS threshold is associated with a predetermined signal-to-interference-noise ratio (SINR) associated with interference between neighboring cells of the plurality of cells in the communication system.

* * * * *

UNITED STATES PATENT AND TRADEMARK OFFICE
CERTIFICATE OF CORRECTION

PATENT NO. : 9,839,035 B2
APPLICATION NO. : 14/691260
DATED : December 5, 2017
INVENTOR(S) : Ritesh K. Madan et al.

It is certified that error appears in the above-identified patent and that said Letters Patent is hereby corrected as shown below:

On the Page 3, in Column 1, under "U.S. Patent Documents", Line 45, after "Zhang" insert -- et al. --.

On the Page 5, in Column 1, under "Other Publications", Line 15, delete "T525.367" and insert -- TS25.367 --, therefor.

On the Page 5, in Column 1, under "Other Publications", Line 21, delete "(HNG)" and insert -- (HNB) --, therefor.

On the Page 5, in Column 2, under "Other Publications", Line 5, delete "Specificaton:" and insert -- Specification: --, therefor.

On the Page 5, in Column 2, under "Other Publications", Line 59, delete "Specificaton:" and insert -- Specification: --, therefor.

On the Page 6, in Column 2, under "Other Publications", Line 58, delete "(HNG);" and insert -- (HNB); --, therefor.

On the Page 7, in Column 1, under "Other Publications", Line 29, after "Cedex;" insert -- France; --.

On the Page 7, in Column 1, under "Other Publications", Line 68, delete "reselction" and insert -- reselection --, therefor.

On the Page 7, in Column 2, under "Other Publications", Line 51, delete "Frmto" and insert -- Femto --, therefor.

On the Page 8, in Column 1, under "Other Publications", Lines 64-65, delete "Mitiation" and insert -- Mitigation --, therefor.

On the Page 9, in Column 1, under "Other Publications", Line 35, delete "etal:" and insert -- et al: --, therefor.

Signed and Sealed this
Twelfth Day of June, 2018

Andrei Iancu
*Director of the United States Patent and Trademark Office*

CERTIFICATE OF CORRECTION (continued)
U.S. Pat. No. 9,839,035 B2

On the Page 9, in Column 1, under "Other Publications", Line 46, delete "Trhoughput" and insert -- Throughput --, therefor.

On the Page 9, in Column 2, under "Other Publications", Line 46, delete "Febuary" and insert -- February --, therefor.

On the Page 10, in Column 1, under "Other Publications", Line 43, delete "Evoluation" and insert -- Evolution --, therefor.

On the Page 10, in Column 1, under "Other Publications", Line 52, delete "Netework" and insert -- Network --, therefor.

On the Page 10, in Column 2, under "Other Publications", Line 20, delete "Celllular" and insert -- Cellular --, therefor.

On the Page 10, in Column 2, under "Other Publications", Line 67, delete "Foordination" and insert -- Coordination --, therefor.

In Column 12, Line 16, delete "Chanel" and insert -- Channel --, therefor.

In Column 12, Line 22, delete "(loT)," and insert -- (IoT), --, therefor.

In Column 13, Line 45, delete "loT" and insert -- IoT --, therefor.

In Column 13, Line 46, delete "loT" and insert -- IoT --, therefor.

In Column 14, Line 18, delete "loT" and insert -- IoT --, therefor.

In Column 14, Line 22, delete "loT" and insert -- IoT --, therefor.

In Column 15, Line 4, after "cells" insert -- . --.

In Column 15, Line 43, delete "can by" and insert -- can be --, therefor.

In Column 20, Line 3, delete "$\Sigma_{LL}$," and insert -- $\rho_{LL}$, --, therefor.

In Column 20, Line 15, delete "'$\rho_0$'" and insert -- '$P_0$' --, therefor.

In Column 20, Line 32, delete "$\Sigma_{LH}$" and insert -- $\rho_{LH}$ --, therefor.

In Column 24, Line 39, delete "ID 1," and insert -- ID1, --, therefor.

In Column 33, Line 66, delete "$\alpha^{MM}$ (i)," and insert -- $\alpha^{MM}(i)$, --, therefor.

CERTIFICATE OF CORRECTION (continued)
U.S. Pat. No. 9,839,035 B2

In Column 34, Lines 46-50, delete "
$$\sum_i \alpha^{LL}(i)(P_0 + \alpha PL^{serv}(i) - PL^{neigh}(i,j)) \leq I_L, \forall j$$
$$\sum_i \alpha^{MM}(i)(P_0 + \alpha PL^{serv}(i) - PL^{neigh}(i,j)) \leq I_M, \forall j$$
$$\sum_i \alpha^{HL}(i)(P_0 + \alpha PL^{serv}(i) - PL^{neigh}(i,j)) \leq I_L, \forall j$$
" and insert --
$$\sum_i \alpha^{LL}(i)(P_0 + \alpha PL^{serv}(i) - PL^{neigh}(i,j)) \leq I_L, \forall j$$
$$\sum_i \alpha^{MM}(i)(P_0 + \alpha PL^{serv}(i) - PL^{neigh}(i,j)) \leq I_M, \forall j$$
$$\sum_i \alpha^{HL}(i)(P_0 + \alpha PL^{serv}(i) - PL^{neigh}(i,j)) \leq I_L, \forall j$$
--, therefor.

In Column 35, Line 52, delete "MCS'" and insert -- $MCS^{MIN}$ --, therefor.

In Column 37, Lines 61-62, delete "$\Sigma_i U(r_i) = \Sigma_i LOG(r_i), \Sigma_i U(r_i) = \Sigma_i (1/r_i)^n$," and insert -- $\Sigma_i U(r_i) = \Sigma_i LOG(r_i), \Sigma_i U(r_i) = \Sigma_i (1/r_i)^n$, --, therefor.